United States Patent [19]

Bolton et al.

[11] 4,233,661
[45] Nov. 11, 1980

[54] COMPUTER CONTROLLED REGISTRATION AND INQUIRY SYSTEM

[76] Inventors: Edgar A. Bolton, 22051 Capistrano La., Huntington Beach, Calif. 92646; Larry D. Dallen, 4806 Darien St., Torrance, Calif. 90503

[21] Appl. No.: 929,100

[22] Filed: Jul. 31, 1978

Related U.S. Application Data

[63] Continuation of Ser. No. 443,422, Feb. 19, 1974, abandoned, which is a continuation of Ser. No. 278,540, Aug. 8, 1972, abandoned.

[51] Int. Cl.$^3$ .............................. G06F 9/00; B41J 1/54
[52] U.S. Cl. .................................. 364/300; 364/900; 400/127
[58] Field of Search ... 364/200 MS File, 900 MS File, 364/300; 235/380, 448, 454; 101/18; 400/6, 63, 76, 127, 130

[56] References Cited

U.S. PATENT DOCUMENTS

| | | | |
|---|---|---|---|
| 3,235,055 | 2/1966 | Pagenkopf | 197/6.1 X |
| 3,306,416 | 2/1967 | Dahlin et al. | 197/6.6 |
| 3,624,615 | 11/1971 | Lippold et al. | 364/900 |
| 3,638,563 | 2/1972 | Drillick | 101/18 |
| 3,663,800 | 5/1972 | Myer et al. | 235/61.11 E |
| 3,665,164 | 5/1972 | Beveridge et al. | 235/61.11 E |
| 3,686,637 | 8/1972 | Zachar et al. | 340/172.5 |
| 3,716,699 | 2/1973 | Eckert et al. | 235/61.11 E |
| 3,744,031 | 7/1973 | Avery et al. | 364/200 |
| 3,752,961 | 8/1973 | Torrey | 235/61.11 E |
| 3,774,179 | 11/1973 | Wiegland et al. | 340/174 ZB |
| 3,820,455 | 6/1974 | Hencley et al. | 101/18 |
| 3,861,299 | 1/1975 | Drillick | 101/18 |
| 3,880,269 | 4/1975 | Carbonneau | 197/6.1 |
| 3,895,354 | 7/1975 | Kish | 364/900 |

*Primary Examiner*—Leo H. Boudreau
*Attorney, Agent, or Firm*—Nilsson, Robbins, Dalgarn, Berliner, Carson & Wurst

[57] ABSTRACT

A method of operating a hardware system, including a computer, for use in registering attendees at large gatherings, such as trade shows or conventions, and producing embossed identification and inquiry cards for each attendee. A plurality of data input terminals are used to supply information concerning each attendee to the programmed computer. Entered data is edited under software control before being stored by the computer. Appropriate portions of the entered data are transmitted to one of a plurality of card embossers where an identification and inquiry card is prepared. The entered data is retrieved from storage as desired to provide statistical information concerning attendance at the trade show or convention.

3 Claims, 17 Drawing Figures

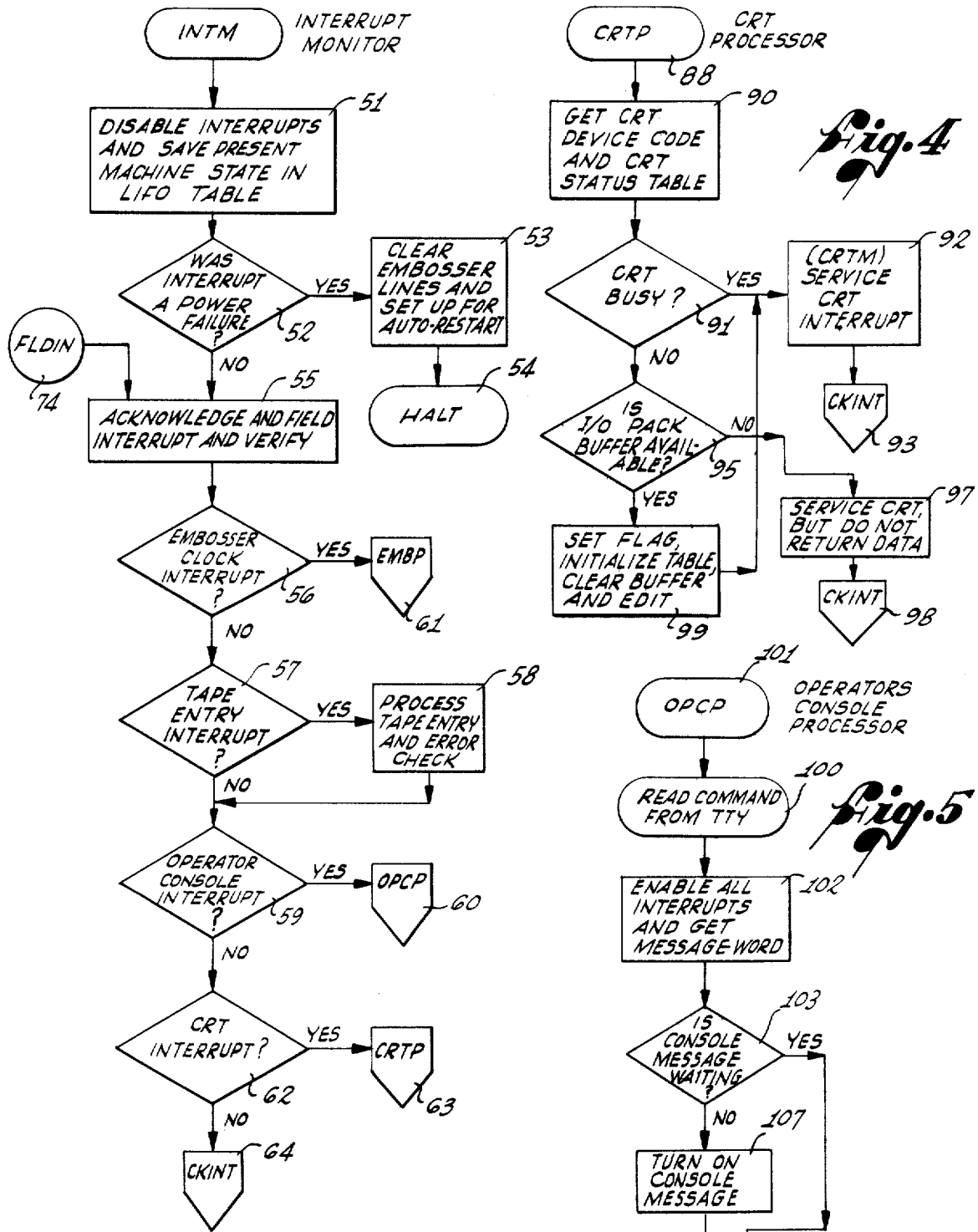

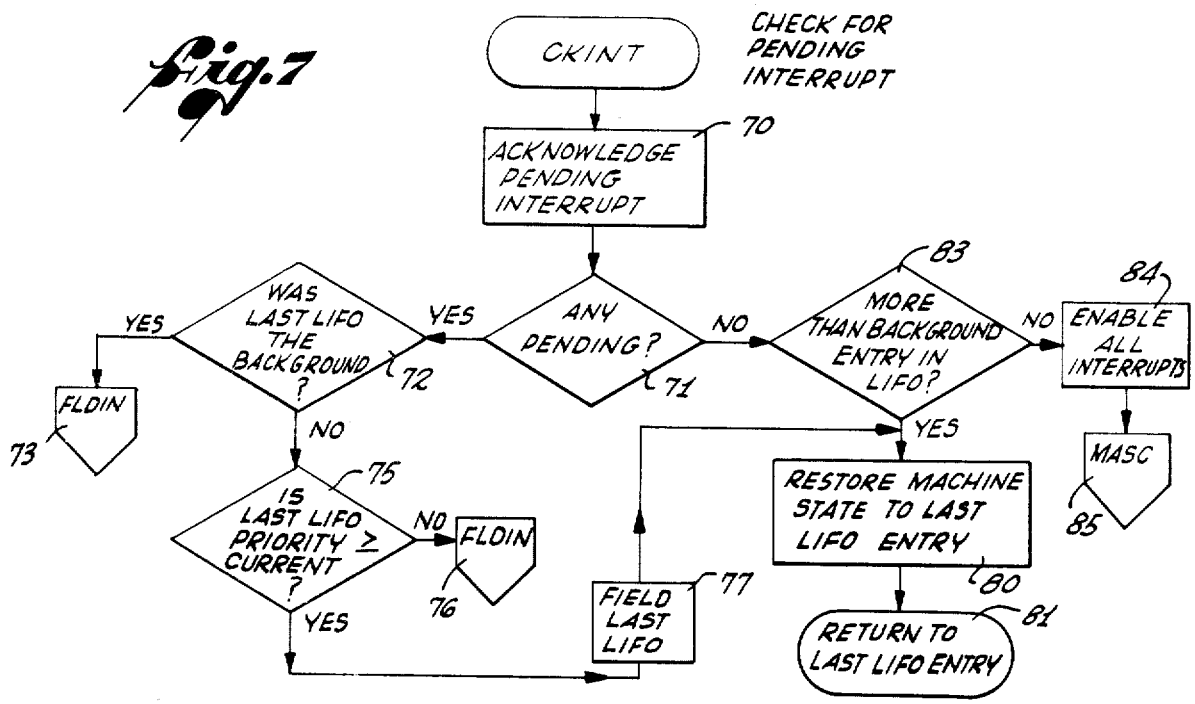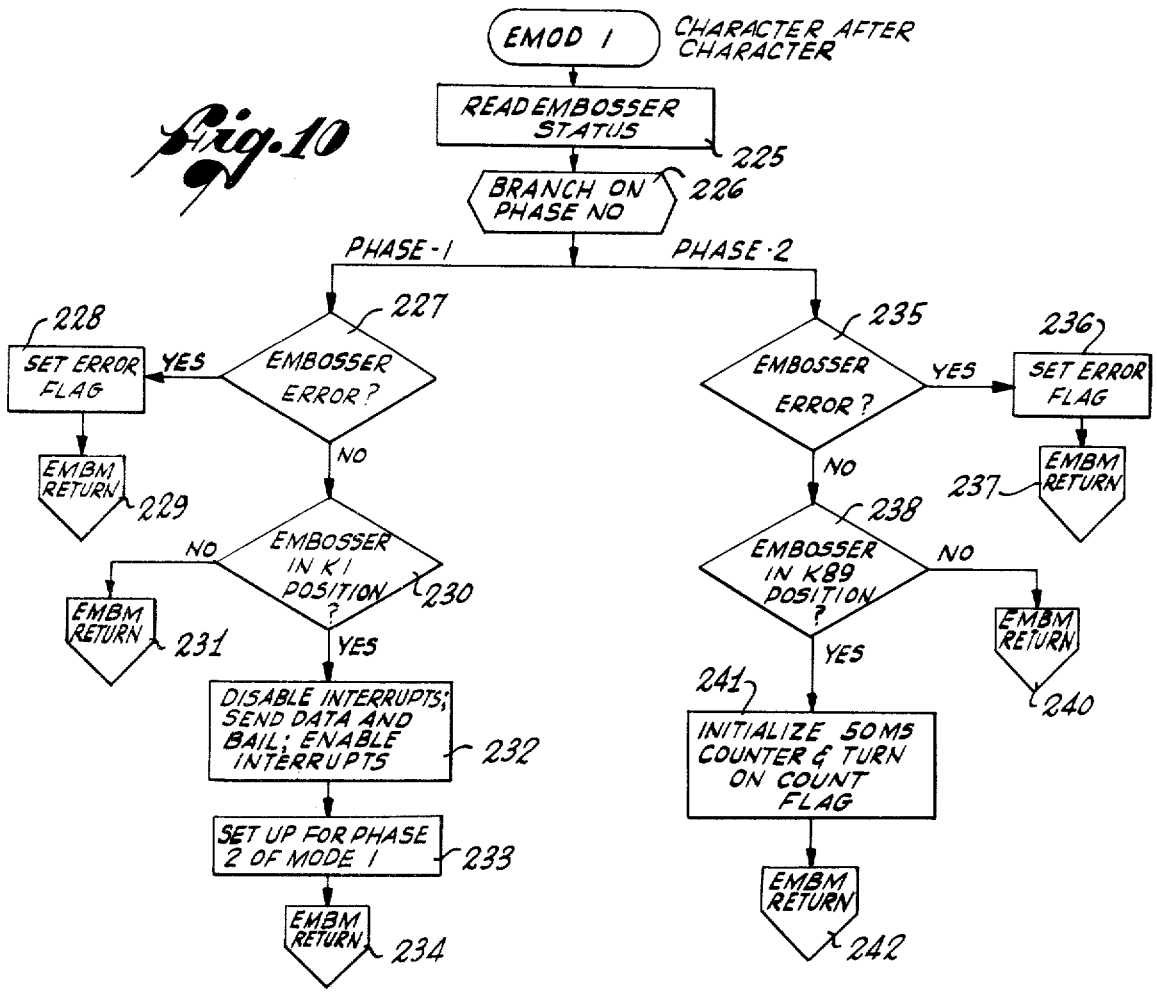

COMPUTER CONTROLLED REGISTRATION AND INQUIRY SYSTEM

This is a continuation of application Ser. No. 443,422 filed Feb. 19, 1974, now abandoned, which is a continuation of application Ser. No. 278,540, filed Aug. 8, 1972, now abandoned.

BACKGROUND OF THE INVENTION

This invention relates to computer controlled data systems and, more particularly, to a programmed computer system for the production of embossed cards and retrievable data.

The primary application for the methods of this invention is the registration of attendees at large gatherings, such as trade shows or conventions. In many fields, periodic gatherings of large numbers of persons with the same interests or for same purpose are very common. For example, a trade association of companies in some particular field may stage each year a trade show of selected products manufactured or sold by its exhibiting member companies. Such a trade show is an important marketing method for the participating firms. New products may be introduced, old products advertised, and so forth.

Attendance at such gatherings may total many thousands of persons. Generally, the organization sponsoring the event wishes to have detailed information concerning the many attendees. This may include, for example, such usual data as attendee name, company name and address and such statistical information as company size, job title, area of interest, type of company and so forth. This data is of interest to both the sponsoring organization and the participating or exhibiting companies.

In order to collect the desired information, large meetings such as conventions and trade show generally utilize an attendee registration procedure. The registration procedure is the first of the two principal functions of the preferred embodiment of this invention. Current registration practices require an attendee to fill out a written document with the information desired by the sponsoring organization. The documents are then sorted and collated, quite often by hand, to obtain the desired information. Quite often, usually because of the time required to sort the data, the information is not available to the interested parties until after the conclusion of the meeting.

Many trade shows and conventions are used by exhibitors to provide information to attendees about their products or services. While some information may be obtained about a product or service at an exhibitor's booth, it very often is necessary for an attendee to give his name to an exhibitor so that requested information may be supplied to him at a later data. Traditionally, the information necessary to answer such an inquiry has been obtained from an attendee and copied out by hand by an exhibitor. As may be readily appreciated, such handling of an attendee inquiry is very time consuming. The practical result often is that many otherwise interested attendees never request information of an exhibitor because of the necessary wait at a busy exhibit. This is, of course, advantageous for both the exhibitor and the attendee.

An improvement in the traditional inquiry system described above has been used at some shows and conventions in recent years. Embossed plastic cards are produced, similar to the familiar credit card, which bear the attendee's name and address. Each exhibitor is provided with preprinted forms and a card imprinter. When an inquiry is received, the exhibitor imprints a form with the inquiring attendee's card and writes in only the requested information. The inquiry card procedure saves great amounts of the exhibitor's time, reduces the number of personnel necessary at the exhibit and reduces the time that each attendee must wait to record his inquiry. Production of the embossed card used in the inquiry procedure is the second of the two principal functions of the preferred embodiment of this invention.

While the inquiry card procedure described above is a considerable improvement over the traditional hand written method, there are many problems in its use. Each card must be embossed from data entered by hand. Since this process requires personnel to operate each card embosser, it is quite expensive. While the inquiry cards may be embossed for those persons who are expected at a show or convention, often the attendee must visit in a second line, following his registration, for his manually embossed card to be produced. If the line becomes too long, the attendee may be asked to return later to obtain his inquiry card. This is very unsatisfactory, since the attendee cannot make any inquiries during this period or the exhibitors must be prepared to record written inquiries.

In summary, the present registration and inquiry sytem in use at most trade shows and conventions is unsatisfactory for a number of reasons. Satistical data concerning attendees is often unavailable for considerable lenths of time after the conclusion of the show or convention. Since the data handling, both for registration and inquiry, must be performed by hand, it is both slow and expensive for the organizers and exhibitors. Finally, the very considerable periods of waiting required by the attendees is unsatisfactory to them.

SUMMARY OF THE INVENTION

In accordance with this invention, provision is made for a computer controlled process which combines the registration procedure for large trade shows or conventions and the production of embossed inquiry cards for attendees. Registration data is entered from terminal devices, which may take several forms but are cathode ray tube terminals in the preferred embodiment. A programmed general purpose computer edits and formats the entered data and transfers it to storage. Under computer control, selected statistical information may be retrieved from storage and read out to provide up-to-the-minute attendance statistics. Further, under computer control, certain of the entered registration information is extracted and transferred to card embossers which automatically produce inquiry cards under computer control.

Since registration information is retrievably stored in a computer system, desired statistics may be retrieved at will. Unlike the prior methods in which the information often does not become available for long periods of time, this invention provides for virtually instantaneous production of statistical information concerning attendees.

Except for the initial data input, all data handling in this invention is under computer control. As a result, fewer persons are required to operate the system which saves considerably on the costs of registration and inquiry card production as compared to the manual methods currently in use.

Finally, since show and convention attendees are registered and presented with their inquiry cards in a very short time, most of the previously experienced waiting is reduced or removed. For example, it has been found that in use of this invention at a large trade show, the total waiting time of each attendee after he presented his registration information to the operator of an input terminal device until he received his inquiry card was about thirty seconds. In that thirty second time period, registration information concerning the attendee was retrievably stored, certain data extracted and transferred to an automatic card embosser which produced his inquiry card.

Accordingly, it may be seen that the many problems attendant to the present method of trade show and convention registration and inquiry system have been alleviated by this invention. Further, the cost of operating such systems have been considerably reduced.

It should be noted at this point that the primary purpose of this invention is the handling of entered data and the production of embossed cards. The practical embodiment of this invention has been used in the registration and inquiry system described above. However, it should be realized that this is only an example of the application of the methods of this invention. Another very useful application of the invention is found in the production of embossed credit cards used in consumer credit businesses. Accordingly, while this invention will be described in connection with the operation of a registration and inquiry system, it is pointed out that the use of the invention is not limited to such an application.

BRIEF DESCRIPTION OF THE DRAWINGS

FIG. 3 is a flowchart of the initial portion of the Interrupt Monitor software module.

FIG. 4 is a flowchart of the cathode ray tube (CRT) Processor portion of the Interrupt Monitor module.

FIG. 5 is a flowchart of the Operator's Console Processor ((OPCP) portion of the Interrupt Monitor module.

FIG. 7 is a flowchart of the portion of the Interrupt Monitor module to which the flowcharts of FIGS. 4, 5 and 6 return in order to determine whether there are pending interrupts from any portion of the system.

FIG. 10 is a flowchart of a portion of the Embosser Monitor software module showing the first mode (EMOD 1) of operation (character after character) of the embosser hardware.

DESCRIPTION OF THE PREFERRED EMBODIMENT

A. Introduction

Figure 1:
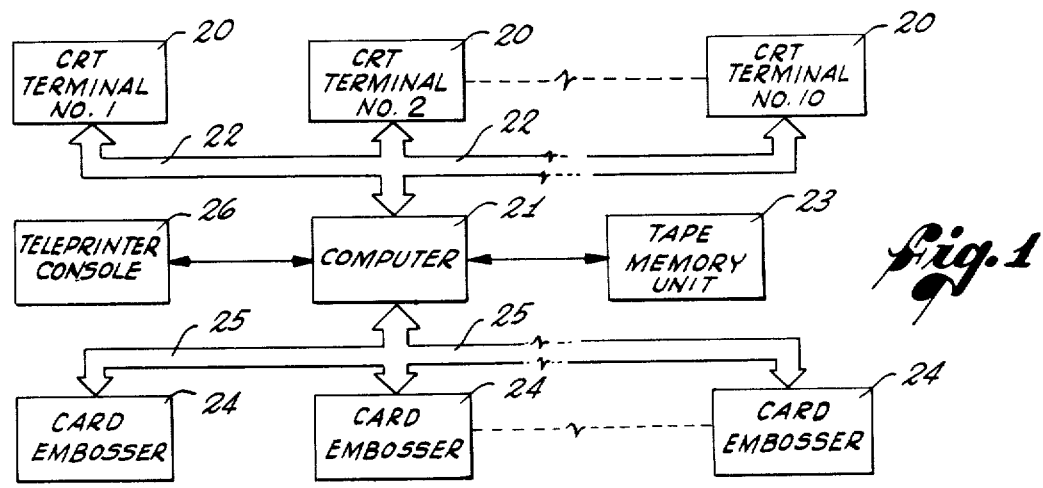
FIG. 1 is a block diagram of the hardware system of this invention, illustrating three of the maximum of ten input terminals and three of the maximum of five automatic card embossers, as well as the computer and peripheral equipment.

In the use of the methods of this invention as a registration and inquiry system, the hardware is arranged generally as shown in FIG. 1. Up to ten cathode ray tube terminals 20, in the preferred embodiment, are positioned at points of attendee entry into the convention or trade show sight. An operator is positioned at each terminal to accept information from each attendee. As the information is provided, the operator types the data into the terminal in the usual fashion. Before the information is displayed on the entering terminal display screen, it is routed to a central computer 21 where the entered characters are edited. As will be explained in detail in connection with the flowchart section herein, certain characters are not accepted by the card embossers and certain characters may not be used in designated locations on the embossed card. For example, the first line of data is generally the name of attendee and may not include a numeral. If the characters entered from the terminal are found acceptable by the computer, the data is routed back to the entering terminal 20 over the same connecting line 22. It should be noted here that while a terminal operator does not enter data directly onto the terminal screen, the data is written under computer control so quickly that it would appear to the operator that the data is directly written on the screen.

When the returned data is displayed at the terminal, both the terminal operator and the attendee may inspect it for accuracy. Any change in entered data, as, for example, the correction of a misspelling, is rerouted to the computer 21 for editing before the correct character is replaced at the terminal. When the attendee and the terminal operator are both satisfied that the entered data is accurate, an entry command is made at the terminal. The computer 21 transfers the entered data to a tape memory unit 23 and into buffer storage for CRT terminal entries, as will be explained below. When a CRT buffer is full and a card embosser 24 found to be available, the portion of the entered information which is to be embossed on a card is transferred a character at a time via parallel lines 25 to a specific embosser. The embosser accepts the transferred data characters and produces the inquiry card. The attendee then obtains his card at the embosser outlet and proceeds into the convention or trade show exhibit area.

A standard teleprinter console 26, which utilizes a Teletype device in the preferred embodiment is used by a system operator to give commands to the computer 21 and receive requested statistical information from the computer. While a Teletype console is used in the preferred embodiment, as may be readily appreciated, any standard keyboard device will suffice.

B. The Hardware System

Registration data supplied to the system of this invention is entered through up to ten cathode ray tube terminals. In the preferred embodiment, a Model VISTA-1, manufactured by Inforton, Inc., Burlington, Mass., is usd as the terminal device. The Infoton cathode ray tube terminal is equipped with the usual alphanumeric display screen and a keyboard for character and function entry. In the operation mode used in the preferred embodiment, as discussed previously, there is no direct communication between the terminal keyboard and the display screen. Each keyboard entry is immediately transmitted to the computer where it is edited. If the editing function determines that the entered character is one acceptable for display on the terminal screen and use in the system, the character is returned for display by the terminal. The time lapse between keyboard character entry and screen display is quite short so that an operator is not aware of the editing intervention of the computer. There is no buffer storage in the terminal utilized in the preferred embodiment. Accordingly, characters are transmitted to the computer as it may receive them.

While the particular terminal described above has been utilized in the preferred embodiment, it may be readily appreciated that any number of different alphanumeric display terminals or even non-displaying terminals, such as Teletype devices, may be utilized.

The teleprinter console utilized in the system of FIG. 1 is a Model 33 Teletype device manufactured by Teletype Corporation, Skokie, Ill. The console is a standard device and will not be described in detail here. All that is necessary for understanding of the operation of the system of FIG. 1 is to recognize that the Teletype console is a keyboard device capable of both sending and receiving data.

The programmable general purpose computer utilized in the preferred embodiment of the system illustrated in FIG. 1 is a NOVA 1200 minicomputer, manufactured by Data General Corporation, Southboro, Mass. The computer utilizes a sixteen bit word and includes a four thousand word core memory. Since the computer and descriptive information is readily available, no structural or programming details concerning it will be given. In the event further information is required about the computer, reference is made to manual DG NM-5, published by Data General Corporation in 1971.

It is understood, however, that virtually any make and type of programmable computer may be employed in this invention. Changes in the make and type of computer would necessitate only minor program language and structure changes, well within the skill of an average programmer.

Bulk memory utilized in the preferred embodiment of the system of FIG. 1 is a magnetic tape unit, Model 6X40, manufactured by Peripheral Equipment Corporation, Chatsworth, Calif. Data is stored on a twelve inch magnetic tape reel. Operation of the tape unit is standard. If further information concerning the details of the tape is necessary, reference is made Manual No. 100884, published by the Peripheral Equipment Corporation. As with the other hardware units employed herein, other makes of tape storage units or even other types of storage devices, such as discs, could be readily employed in this system.

A maximum of five card embossers may be utilized with the preferred embodiment of the system illustrated in FIG. 1. The embosser utilized in the preferred embodiment is a Model 6800 embosser manufactured by the Addressograph-Multigraph Corporation, Cleveland, Ohio.

As the embosser is used in this system, it automatically loads a plastic card from a supply of such cards. As characters are transferred to it from buffer storage under control of the computer, the characters are embossed in the plastic card. Since embossers utilize a special data code, the internal code used in the system is translated into a form acceptable to the card embossers under software control.

c. Software

1. Introduction

All functions of the hardware system which constitute this invention are performed under software control. The program listing is included herein following the descriptive portion of this specification. FIGS. 2–17 of the drawings contain flowcharts of the principal portions of the software according to this invention. In order that the methods of this invention be clearly understood, this specification will describe the software flowcharts illustrated in the drawings.

Before describing in detail the methods controlled by the software of this invention, it is believed that it would be helpful to understand the exact nature of the data entered in the preferred embodiment. Generally, five types of information are entered via a CRT terminal concerning each attendee. These are the attendee's name, company name, attendee and company address. In addition, statistical information such as title, company size, area of interest, types of products manufactured, and so forth, may be entered. In the preferred embodiment, up to five lines of information is embossed by the card embossers on a plastic inquiry card. This information consists of the attendee's name, title, company name and address. In the preferred embodiment, the card may contain a maximum of 132 characters. An additional twenty characters may be entered from the CRT terminal for statistical information.

Accordingly, a maximum entry for a single attendee would comprise 152 characters of data. The 152 characters comprises, on the magnetic tape memory unit, a logical record. The logical record size remains constant on the magnetic tape regardless of the actual number of characters entered concerning an attendee.

Generally, the software disclosed herein operates an interrupt system. The software processes interrupts from cathode ray tube terminals, the operator's console, the magnetic tape memory unit, the power failure automatic restart device and the computer real time clock.

Upon detection of an interrupt, the software classifies the interrupt and calls the appropriate software module. On each machine interrupt, the machine's state is saved in a last-in-first-out table. After all higher priority interrupts are serviced, control is returned to the last entry in the table so that operation of the machine may take up at the point it was interrupted.

As in most interrupt systems, the interrupts are serviced by the system according to a previously determined priority schedule. The priority schedule, in descending order, is the CRT terminals, the operator's console, the embossers and the magnetic tape unit.

There are six primary modules in the software listing included in this specification: Interrupt Monitor; Master Controller; CRT Monitor; Tape Monitor; Operator's Console Monitor; and, Embosser Monitor. Of the six in the software listing, the four principal modules are represented in the flowcharts. The Interrupt Monitor module is disclosed in FIGS. 3–7; the CRT Monitor module is disclosed in FIG. 8; the Embosser Monitor module is disclosed in FIGS. 9–14; and, the Master Controller module is disclosed in FIGS. 15–17.

Figure 2:
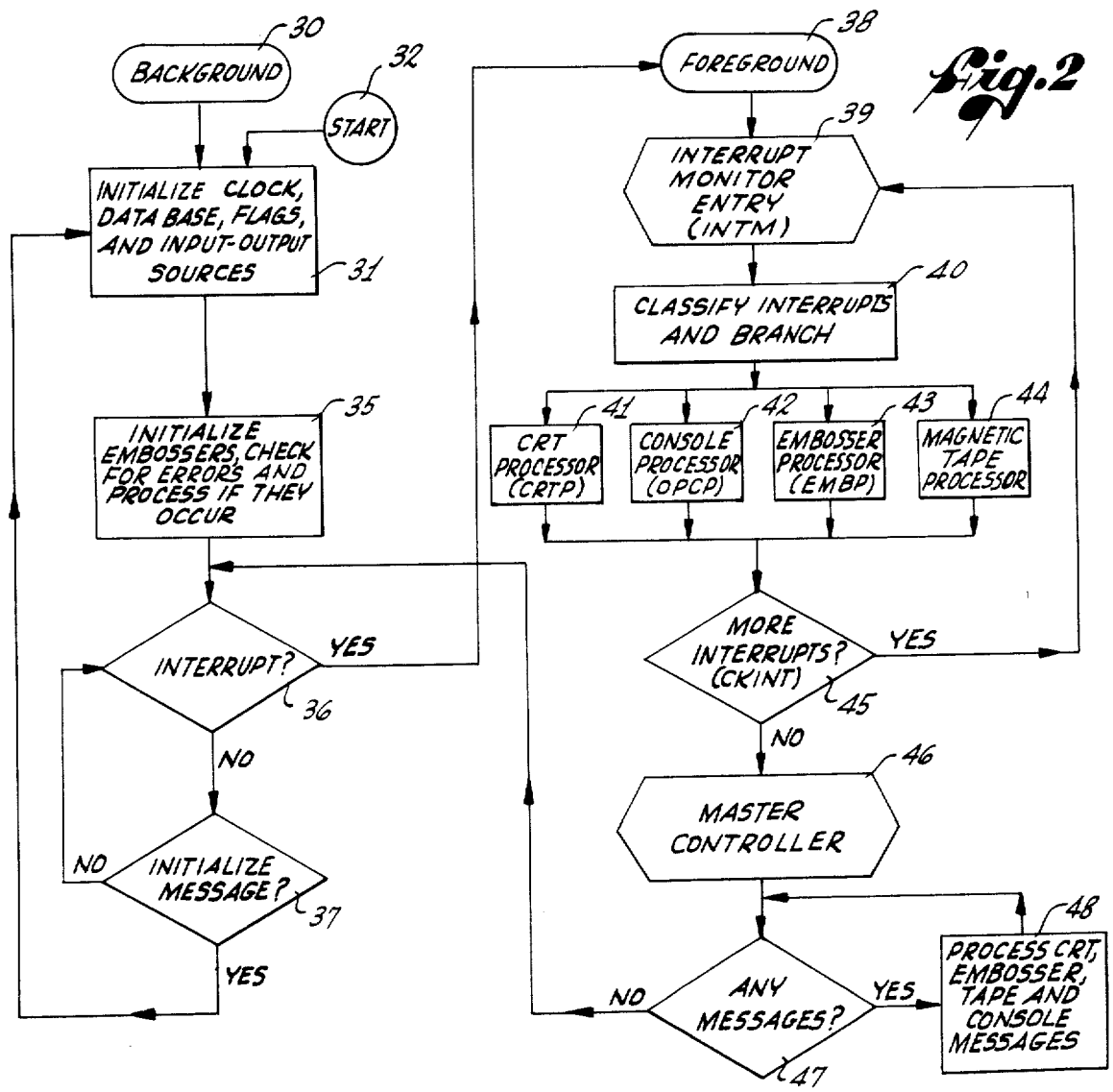
FIG. 2 is a high level flowchart of the system, showing the interconnection of the various software modules of this invention.

2. FIG. 2 Flowchart

An understanding of the overall method controlled by the software of this invention may be had by referring to FIG. 2 which illustrates, on a high level, the interrelationship of the various software modules. The background step 30 is the entry point into the software method. The first initialization step 31 is reached by a startup of the system from the operator's console via step 30 or an automatic restart of the system via start step 32 following a power failure. The first initialization step 31 controls such functions as initializing the computer's ten millisecond clock, which is utilized as an embosser interrupt, setting all code words in core to their initial values, zeroing the contents of the various buffers and enabling all interrupts.

The second initialization step 32 tends the start-up requirements of the embossers. The buffers and data lines on the embossers are cleared and a check is made for any pending embosser error. At this point, the system is prepared to operate, that is, to service interrupts from any of the four possible sources.

Following the two initialization steps, an interrupt decision step 36 checks the four possible sources of interrupts to determine if one is pending. If not, control is transferred to an initialization message decision step 37 which determines whether there is an input requiring re-initialization from the operator's console 26 (FIG. 1). If there is no such console message, the initialization message decision step 37 retransfers control to the interrupt decision step 36. If the initialization message decision step 37 finds wording initialization input from the operator's console, control is passed to the first initialization step 31 and the initialization procedure repeated.

In general, the software controls a two step looping operation between interrupt decision step 36 and initialization message decision step 37 until either an initialization message is received from the operator's console or an interrupt is detected from one of the four possible sources. When an interrupt is detected, control is immediately transferred via a foreground entry point 38 to the Interrupt Monitor module entry (INTM) 39.

The Interrupt Monitor software module is called whenever an interrupt is detected from any of the four possible sources of interrupts. The function of the Interrupt Monitor module is to disable all other interrupts, save the machine state at the time of the interrupt, determine which of the four types of interrupts has been received and pass control to the proper software module determined by the source of the interrupt. Finally, the Interrupt Monitor determines whether any interrupts are received during the processing of a previously received interrupt.

This process is broadly shown in FIG. 2 by a classification and branch step 40 which identifies the type of interrupt and transfers control to one of four processor branches 41, 42, 43, 44 dependent upon the prior identification. For example, if the interrupt detected by the interrupt decision step 36 had been an embosser interrupt, control would be passed to embosser processor step 43. It should be understood at this point that an "embosser interrupt" does not originate with an embosser. The interrupt is generated by a ten millisecond clock which is part of the computer. By software, the computer interprets the ten millisecond clock interrupt as one requiring servicing of the embossers.

It should also be noted here that the flowcharts in the following figures disclose details of the program steps for the CRT processor 41, the operator's console processor 42 and the embosser processor 43. The magnetic tape processor is operated in the usual fashion common to transfer of data to such memory devices. While the instructions for transfer of data to the magnetic tape memory unit are included in the program listing herein, no flowchart statement of the program is given.

Following the servicing of the device originating the interrupt detected by the interrupt decision step 36, control is transferred to more interrupts decision step 45. Basically, the purpose of decision step 45 is to determine whether further interrupt servicing is necessary. For example, an interrupt may have been received during the processing time of the prior interrupt detected by the interrupt decision step 36. In that event, decision step 45 will transfer control to the Interrupt Monitor entry step 39 and the above process will be repeated. Also, if a low priority interrupt is in the process of being serviced when a higher priority interrupt is received, the Interrupt Monitor will first service the higher priority interrupt. In such cases, more interrupt decision step 45 will also retransfer control to the Interrupt Monitor entry step 39.

As explained above, the four possible sources of interrupts according to this invention are assigned a relative priority. If, for example, the software is in the process of controlling transfer of a data record to the magnetic tape memory unit and a CRT terminal interrupt is received, the address of the next tape transfer instruction is saved in the last-in-first-out table, In such cases, the more interrupts decision step 45 controls the computer to return to the last table entry and complete servicing the prior but lower priority interrupt. In those instances where no intermediate interrupts nor any prior interrupts require servicing, control is transferred to the Master Controller Monitor module 46.

Generally, it is the function of the Master Controller module to examine a system status word to determine if data requires moving. The status word informs the Master Controller whether any cathode ray tube terminal buffers are full, whether any teleprinter console messages are waiting to be printed on the teleprinter, whether data is ready for transfer to the magnetic tape memory, or whether data is ready for transfer to one of the embossers for the production of an embossed card.

The Master Controller module determines in a messages decision step 47 whether any such data transfers are necessary and, if so, which data transfer is ready. When a data transfer is found to be appropriate by the message decision step 47, control is transferred to a processing step 48 which calls the proper message transfer routine to accomplish the transfer. Thereafter, control is retransferred to the any messages decision step 47 to determine whether further data transfers are ready. Finally, the Master Controller Monitor updates the system status word to reflect the data transfer which has just taken place.

In those instances where the any messages decision step 47 finds no data transfers ready, control is transferred to the background portion of the software to await the next interrupt or initialization message from the operator's console.

The above description concerning the steps of FIG. 2 describes the operation of the methods of this invention on a high level. FIGS. 3-17 will explain the software steps in more detail.

3. Interrupt Monitor

Referring to FIG. 3, the initial portions of the flowchart of the Interrupt Monitor software module is shown. When the background interrupt-initialization message loop (FIG. 2) finds an interrupt, control is transferred to an initial step 51 of the Interrupt Monitor. The initial step 51 first disables the other interrupts for the duration of the present Interrupt Monitor control. In addition, the initial step 51 enters the present machine state in the last-in-first-out table so that control may be returned to the proper point in those cases where a lower priority interrupt was stopped.

The first determination made in the Interrupt Monitor module is whether the interrupt was a system power failure by a power failure decision step 52. In those instances where a power failure occurs, control is transferred to a clearing step 53 which removes any data on the embosser input lines and sets the system for automatic restart. Thereafter, all operations are halted as commanded by a halt step 54.

In those instances when the background software steps detect an interrupt which is not a power failure, a fielding step 55 receives the interrupt flag and transfers contol to clock interrupt decision step 56. In the method according to this invention, a clock interrupt is generated in the system by the computer every ten milliseconds for the purpose of scanning and timing the embossers. Upon occurrence of each clock interrupt, a scanning of the condition of all embossers is initiated. Determinations are made during the embosser scanning of the condition of each embosser and whether card embossing commands are necessary. Also, as will be explained below in detail, operation of the embossers require numerous timed delays. All such delays controlled by software steps are based on counts of the number of ten millisecond clock interrupts.

Clock interrupt decision step 56 determines whether the sensed interrupt originated with the embosser ten millisecond clock. If so, the embossers must be serviced and control is transferred to the software steps of FIG. 6 via a transfer step 61.

If the interrupt sensed in the software background steps is found not to be a ten millisecond clock embosser interrupt, control is transferred to a tape entry interrupt decision step 57 which determines whether the interrupt was caused by a command to transfer stored data from the tape to the operator's console. If so, control is transferred to a tape processing step 58. The tape processing step controls transfer of the entered attendee registration information to the operator's console to provide attendance information. As the data is transferred, an error check is also controlled by processing step 58.

If the detected interrupt was neither a ten millisecond clock interrupt nor a tape entry interrupt or, following the processing of a tape entry interrupt, control is transferred to an operator's console interrupt decision step 59. If the interrupt is found to have originated with the operator's console, control is transferred to the software steps of FIG. 5 via a transfer step 60.

Finally, if the fielded interrupt is neither a power failure, ten millisecond clock, tape or operator's console interrupt, control is transferred to a CRT terminal interrupt decision step 62. As with the above classification steps, the decision step 62 determines whether the detected interrupt is from one of the CRT terminals. If it is found to be from one of the terminals, control is transferred to the software steps of FIG. 4 via transfer step 63.

Following the determination by decision step 62 of whether a CRT terminal interrupt is present, control is transferred to the software of FIG. 7 via a transfer step 64, labeled CKINT in FIG. 3, when no CRT terminal interrupt is found.

The steps of FIG. 7 are entered upon the completion of all interrupt determinations of FIG. 3 except when an interrupt is caused by a power failure. The basic purpose of the steps of FIG. 7 is to check for a pending interrupt which occurred during the processing of the last interrupt or which was in process when a higher priority interrupt occurred.

Referring to FIG. 7, after any pending interrupt is acknowledged by step 70, control is transferred to a decision step 71 which determines whether any interrupts are pending for any reason. If a pending interrupt is found, control is transferred to background decision step 72 which determines whether the last entry in the last-in-first-out table was a background step. The significance of the table entry being found to be background step is that the interrupt last serviced occurred while the software was controlling a background wait and, therefore, the pending interrupt occurred in the interim. In such an instance, the interrupt must be classified and serviced as previously described in connection with FIG. 3. Accordingly, if the last table entry was a background step, control is transferred via transfer a transfer step 73, labeled FLDIN in FIG. 7, to entry transfer step 74, similarly labeled, of FIG. 3. Thereafter, the interrupt which occurred after the servicing of the last interrupt started is classified by the steps of FIG. 3 as previously explained.

When the steps of FIG. 7 find a pending interrupt and find also that the last-in-first-out table entry was not in the backgound, control is transferred to a priority decision step 75 which determines whether the priority of the table entry, according to the interrupt priority schedule, was equal to or greater than the priority of the current interrupt. If the priority of the current interrupt is equal to or higher than the last table entry, control is again transferred to the software steps of FIG. 3 via a transfer step 76, labeled FLDIN in FIG. 7. As before, this serves to transfer control to the classification steps of FIG. 3 via an entry, transfer step 74.

In those cases where the priority of a pending interrupt found by the steps of FIG. 7 in higher or equal to that of the current interrupt, step 77 controls the fielding of the last table entry. Since the table entry contains, as is usual, the address of the interrupted procedure, restoring steps 80, 81 control the computer to return to the interrupted sequence. At the same time, the current interrupt and its assigned priority is entered in the last-in-first-out table so that it will be handled in the proper priority sequence.

If the software steps of FIG. 7 find no pending interrupt, control is transferred to a table decision step 83 to determine whether more than background entries are in the last-in-first-out table. If not, the current interrupt is determined to have been completely serviced and step 84 enables all interrupts. The purpose of this step is to offset the effect of the interrupt disabling which occurred in step 51 of FIG. 3. After the interrupts are enabled, all sources of interrupts, regardless of their priority, are capable of immediately interrupting operation of the system. After the interrupts are enabled, control is transferred to the Master Controller software module via a transfer step 85. The Master controller software flowcharts are disclosed in FIGS. 15-17 and will be described below.

If the table decision step 83 determines that there are more than background entries in the last-in-first-out table, the significance is that a prior processing sequence, not involving interrupts, was stopped and should be restarted. In order to accomplish this result, control is transferred to restoring steps 80 and 81 and proceeds as previously described.

As may be readily understood, the primary purpose of the software steps of FIG. 7 is to determine whether any pending interrupts are present and to set up the assigned priority schedule for the four possible sources of interrupts. It should be noted that, except for the tape entry process step 58 of FIG. 3, control is retransferred to the steps of FIG. 7 following the servicing of all interrupts.

Returning to FIG. 3, it is recalled that the software steps were for the purpose of classifying the type of current interrupt and transferring control to the proper device processor. For example, if the CRT interrupt decision step 62 determines that the origin of the current interrupt is one of the CRT terminal devices, control is transferred to the CRT processor step of FIG. 4 via transfer steps 63 and 88 (FIG. 4).

4. CRT Processor

The primary purposes of the steps of the CRT processor shown in FIG. 4 are to control the necessary buffer checks for transfer of entered data and to call the CRT Monitor software module.

Each CRT terminal device is assigned a code and has associated with it an input buffer. As each character or function key on the CRT keyboard is depressed, a CRT terminal interrupt is generated. When the interrupt is found to be the first following an enter code, the steps of FIG. 4 assign a packed buffer location to eventually receive the terminal entries. As each following interrupt occurs, control is transferred to the CRT Monitor steps of FIG. 8 which first identifies the type of input. If the input is a character, it is edited to ensure that it is a character acceptable to an embosser. If it is found acceptable, the character is returned to the entering terminal for display on its screen. At the same time, the character is entered into the terminals input buffer. When the terminal operator has completed the entries concerning a single attendee, an enter command causes the input buffer to transfer its contents to the assigned packed buffer. The Master Controller is then notified that data is ready for an embosser. These steps will be explained in detail in connection with the software steps of FIGS. 4 and 8.

Returning to FIG. 4, if a terminal decision step 91 determines that the CRT terminal is not busy, which would occur only upon the entry of the first character, a buffer decision step 95 determines whether a CRT packed buffer location is available. If not, the CRT terminal entry is not transferred to the entering terminal for display. The data entry, however, is saved. Thereafter, return is made via a transfer step 98 to the steps of FIG. 7.

When the buffer decision step 95 determines that a buffer location is available in the packed CRT buffer, step 99 controls the buffer locations to be cleared and the buffer flag set after which control is transferred to CRT Monitor calling step 92.

5. Operator's Console Processor

As explained in connection with FIG. 3, operator's console decision step 59 determines whether a detected interrupt originated with the operator's control console. If so, control is transferred to the Operator's Console Processor steps of FIG. 5 via a transfer step 60.

FIG. 5 illustrates the software steps of the Operator's Console Processor. Briefly, the purpose of the Operator's Control Processor is to transfer Teletype data and to notify the Master Controller module that a command is waiting to be processed.

Referring to FIG. 5, control is transferred to a read step 100 via transfer step 60 of FIG. 3 and entry step 101 of FIG. 5. Step 102 enables all interrupts from the various interrupt sources and transfers control to message waiting step 103. If it is determined that a console message is waiting, all other interrupts are disabled by step 104 after which transfer step 105 returns control to the steps of FIG. 7. After the FIG. 7 steps occur, the Master Controller module, as will be discussed below, controls the transfer of the waiting console message. If no console message is found to be waiting by decision step 103, control is transferred to step 107 which turns on a console message flag. Thereafter, control is transferred ultimately to the Master Controller module via transfer steps 105 and the software steps of FIG. 7, as above described.

6. Embosser Processor

As discussed in connection with the steps of FIG. 3, an embosser interrupt is generated in the system by a real time clock every ten milliseconds. When the ten millisecond interrupt occurs, interrupt decision step 56 of FIG. 3 detects the clock interrupt and transfers control to the Embosser Processor of FIG. 6 via transfer a step 61.

Figure 6:
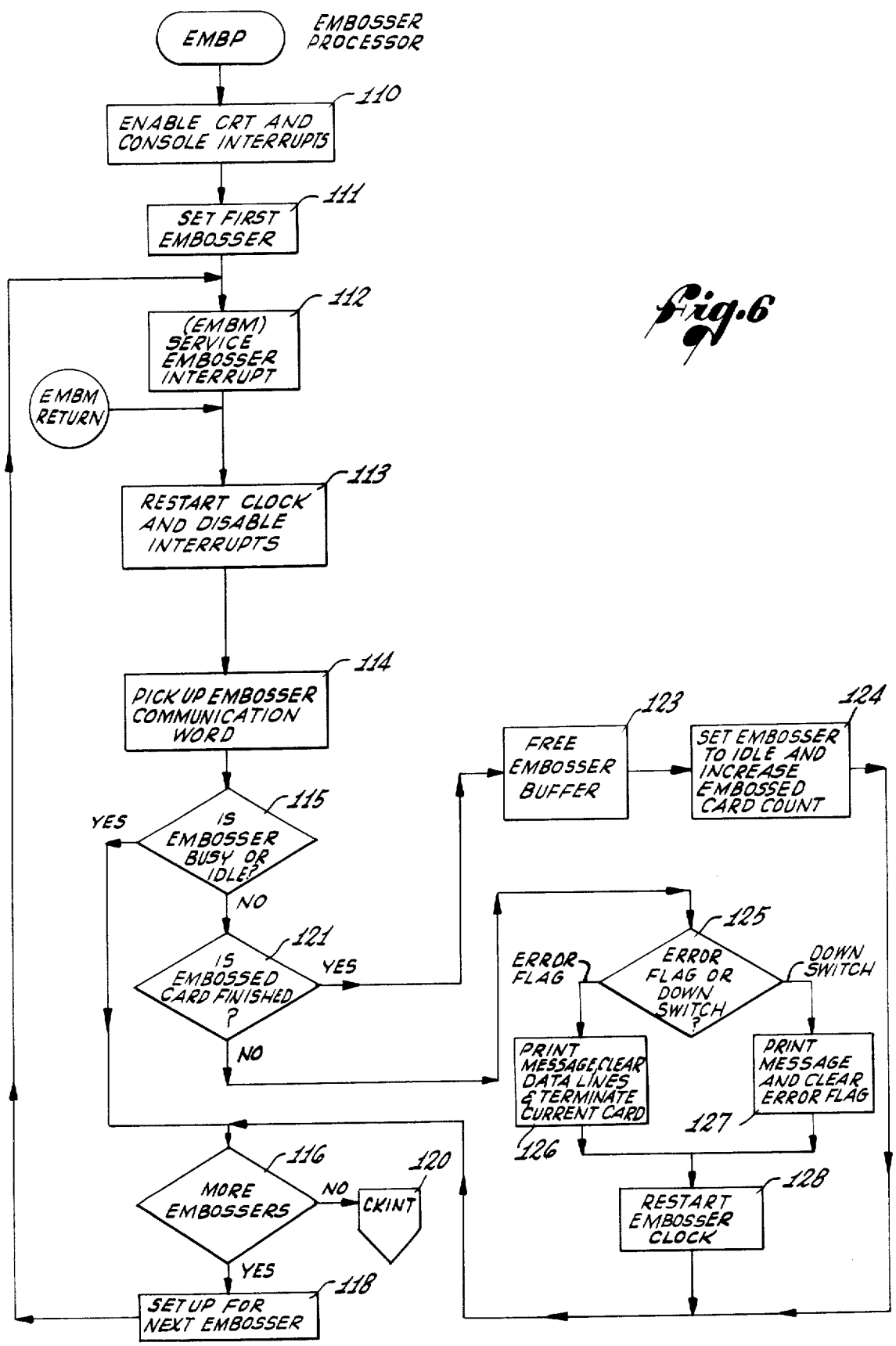
FIG. 6 is a flowchart of the Embosser Processor (EMBP) portion of the Interrupt Monitor module.

The primary purpose of the Embosser Processor steps of FIG. 6 are to call the Embosser Monitor software module, enable only the proper interrupts and control a scanning of each of the embossers in turn. Referring to FIG. 6, step 110 enables the CRT and Operator's Console interrupts. Step 111 identifies the first embosser to be checked after which step 112 calls the Embosser Monitor software module of FIGS. 9-14. The Embosser Monitor module controls the transfer of data from an embosser buffer to the corresponding embosser. Following the Embosser Monitor steps, which will be described in connection with those figures, restart step 113 of FIG. 6 causes the ten millisecond clock to be restarted and all interrupts to be disabled. Word step 114 then picks up the embosser communication word which states the status of the embosser just serviced and, via pointers, the present condition of the embosser.

Decision step 115 determines whether the embosser being looked at is busy, that is, embossing a card, or is idle. If the embosser is found to be either busy or idle, control is transferred to decision step 116 which determines whether there are more embossers in the system which must be serviced as a result of the current ten millisecond embosser interrupt. If decision step 116 determines that there are more embossers to be serviced, the above described process is repeated by transferring control back to the Embosser Monitor call step 112 via embosser set-up step 118. As may be readily appreciated, each time a ten millisecond embosser clock interrupt is received, the software steps of FIG. 6 are looped through until decision step 116 determines that all embossers connected to the system have been serviced. When step 116 determines that all embossers have been serviced, the steps of FIG. 6 is exited to the steps of FIG. 7 via transfer step 120. Each embosser in the system, is serviced every ten milliseconds or one hundred times each second.

Returning to the embosser busy or idle decision step 115, control is transferred to card finished decision step 121 if it is determined that the embosser being looked at is neither busy nor idle. In such a case, the embosser is either in an error condition, is turned off or has just completed embossing a card. Step 121 determines whether the embosser has finished embossing a card. If the embosser is finished, control is transferred to step 123 which frees the embosser buffer. This removes the embosser from a reference list of embosser buffers being utilized and frees it for receipt of further data. Thereafter, step 124 sets the embosser flag to idle and increments the embossed card count by one count. Control is then returned to step 116 which determines, as before, whether all embossers have been serviced. Again, if not, the looping process continues. If they have been serviced, the steps are exited via transfer step 120.

If the embosser busy and card finished decision steps 115, 121 determine that an embosser is neither busy nor idle and has not just completed the embossing of a card, control is transferred to decision step 125 which determines whether an error condition exists or the down switch is on. The down switch simply indicates that the system operator has turned the embosser off. In either case, message steps 126, 127 send the appropriate message to the operator's console. Following both of the message steps 126, 127, the embosser clock is restarted by step 128. Thereafter, control is retransferred to step 116 which, as described above, determines whether all embossers have been checked. When all embossers have been checked, control is transferred to the steps of FIG. 7 for a check of pending interrupts via transfer step 120.

7. CRT Monitor Module

Figure 8:
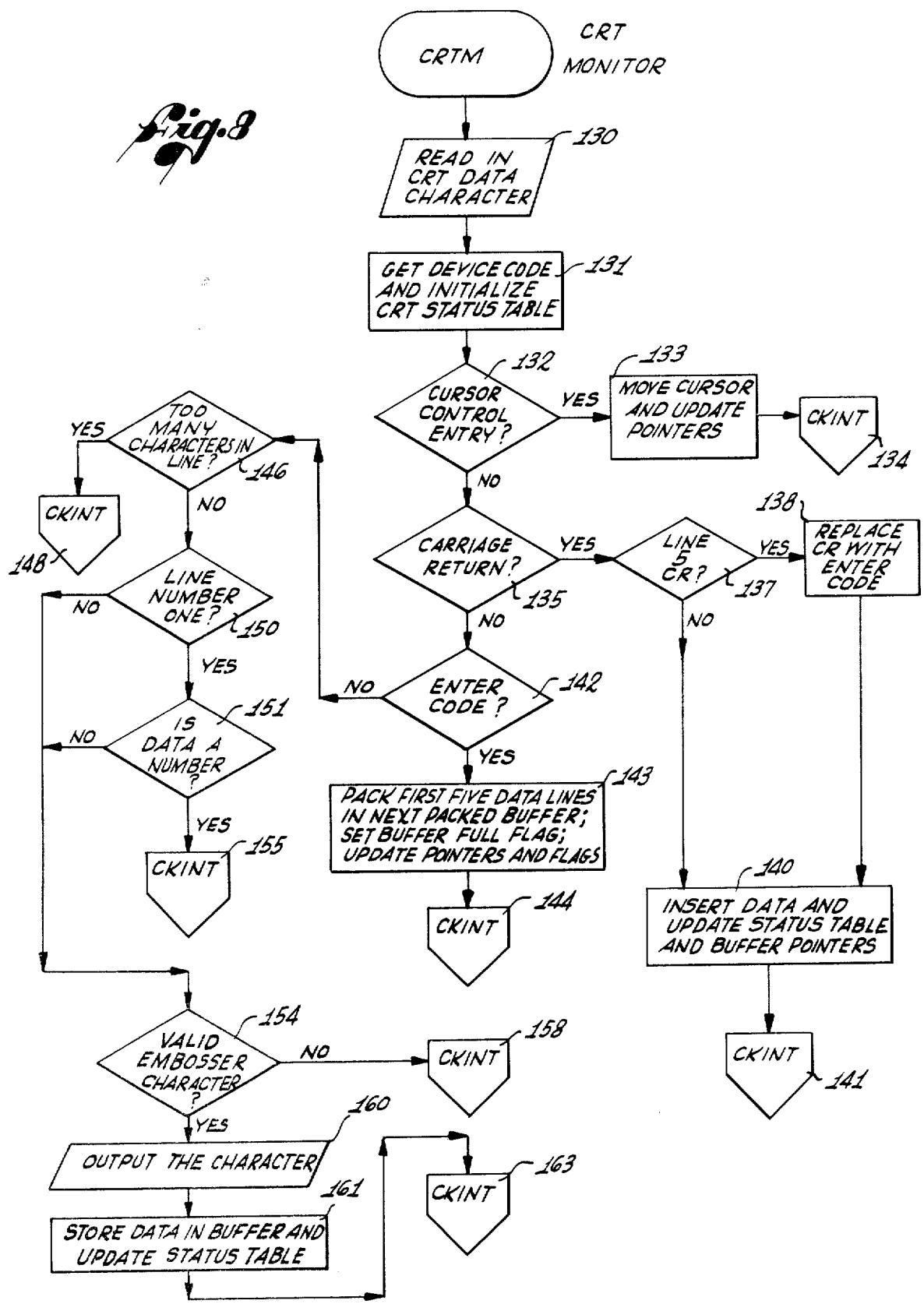
FIG. 8 is a flowchart of the Cathode Ray Tube Monitor (CRTM) software module which is called by the flowchart of FIG. 4 to service interrupts from the cathode ray tube terminals.

As described above, interrupts from one of the CRT terminal devices may be detected in the background software. When a terminal interrupt is detected, control is transferred to the CRT Processor of FIG. 4. The steps of the processor, as described above, perform certain preliminary functions prior to calling the CRT Monitor module. The CRT Monitor steps, called by step 92 of FIG. 4, are shown in FIG. 8. Accordingly, the FIG. 8 steps occur each time a character or function key is depressed on one of the CRT terminals.

Referring to FIG. 8, step 130 causes the one data entry to be read from the terminal. After the appropriate table entries controlled by step 131, a cursor entry decision step 132 determines whether the entry is a cursor movement command. If so, cursor movement step 133 causes the cursor to be moved as directed and for cursor pointers to be updated, after which control is returned to the steps of FIG. 7 via transfer step 134.

If the cursor entry decision step 132 determines the current entry is not a cursor movement command, carriage return entry decision step 135 then determines whether the entry is a carriage return command. If the entry is a carriage return, decision step 137 determines whether it is a line 5 carriage return. The significance of a fifth line carriage return is that the end of the data destined for an embossed card has been reached upon the occurrence of the five lines of data which may be embossed on a card according to this invention; further statistical data entries relating to the same attendee are simply transferred to the magnetic tape memory along with the first five lines. In those cases where the entry is determined to be a fifth line carriage return, step 138 causes the entry to be replaced with an enter code. This is done to cause the block of data destined for the embossed card to be entered at that point. If the entered character is found to be a carriage return code, but not the fifth line carriage return, or following the replacement of a fifth line carriage return code with an enter code, control is transferred to data step 140 which causes data to be inserted and pointers and the status table to be updated. Following step 140, control is retransferred to the steps of FIG. 7 via transfer step 141.

If the entry is found to be neither a cursor control nor a carriage return command, enter code decision step 142 determines whether the character entered is an enter command. If so, control is transferred to step 143 which controls a transfer of the data from the CRT input buffer to the selected CRT packed buffer. Also, the appropriate flags are set and pointers are updated. After the data transfer control by step 143, control is retransferred to the steps of FIG. 7 via transfer step 144. If the first three entry decision steps 132, 135, 142 determine that the current entry is neither a cursor movement command, a carriage return command nor an enter code command, the only possibility remaining is that the current entry is a data character. Accordingly, step 146 then checks to determine whether the current entry results in too many characters in the line being currently entered. If so, control is transferred to the steps of FIG. 7 via a transfer step 148. If not, first line decision step 150 determines whether the current character is in the first line to be embossed. In view of the adopted convention that no numbers may appear in the first line of an embossed card, a number decision step 151 determines if the entered character is a number. If so, the convention is violated and control is transferred to the steps of FIG. 7. If the entered character is acceptable, control is transferred to validity checking step 154 which determines whether the entered character is a valid embosser character. This check is necessary because only certain alphanumeric characters may be utilized by an embosser. The decision is made by a table look-up procedure which refers to a list of acceptable embosser entries. If the validity decision step 154 finds an invalid character, control is transferred back to the steps of FIG. 7 via transfer step 158. In such a case, the character is not displayed on the terminal screen. If, on the other hand, the validity decision step 154 finds the entered character to be a valid embosser character, control is transferred to step 160 which causes the character to be transferred to the terminal screen for display. Storage step 161 enters the valid character into the CRT input buffer, after which control is returned to the steps of FIG. 7 via a transfer step 163.

8. Embosser Monitor Module

As described in connection with the Interrupt Monitor steps of FIG. 3, the system according to this invention generates a clock interrupt every ten milliseconds. The clock interrupt causes the Interrupt Monitor to call the Embosser Processor steps of FIG. 6, which, in turn, call the Embosser Monitor software module, disclosed herein in FIGS. 9-14.

The basic purpose of the Embosser monitor is to supply data to the system card embossers. The data is obtained from embosser buffers located in core which were filled from CRT terminal data entries. In response to each of the ten millisecond clock interrupts, the Embosser Monitor is called to check the status of each embosser connected to the system. The status of an embosser may be either busy embossing a card, finished with a card, completely idle or in an error condition. As will be explained in connection with the flowcharts of FIGS. 9-14, the steps taken by the Embosser Monitor are determined by the status of the checked card embosser.

Figure 9:
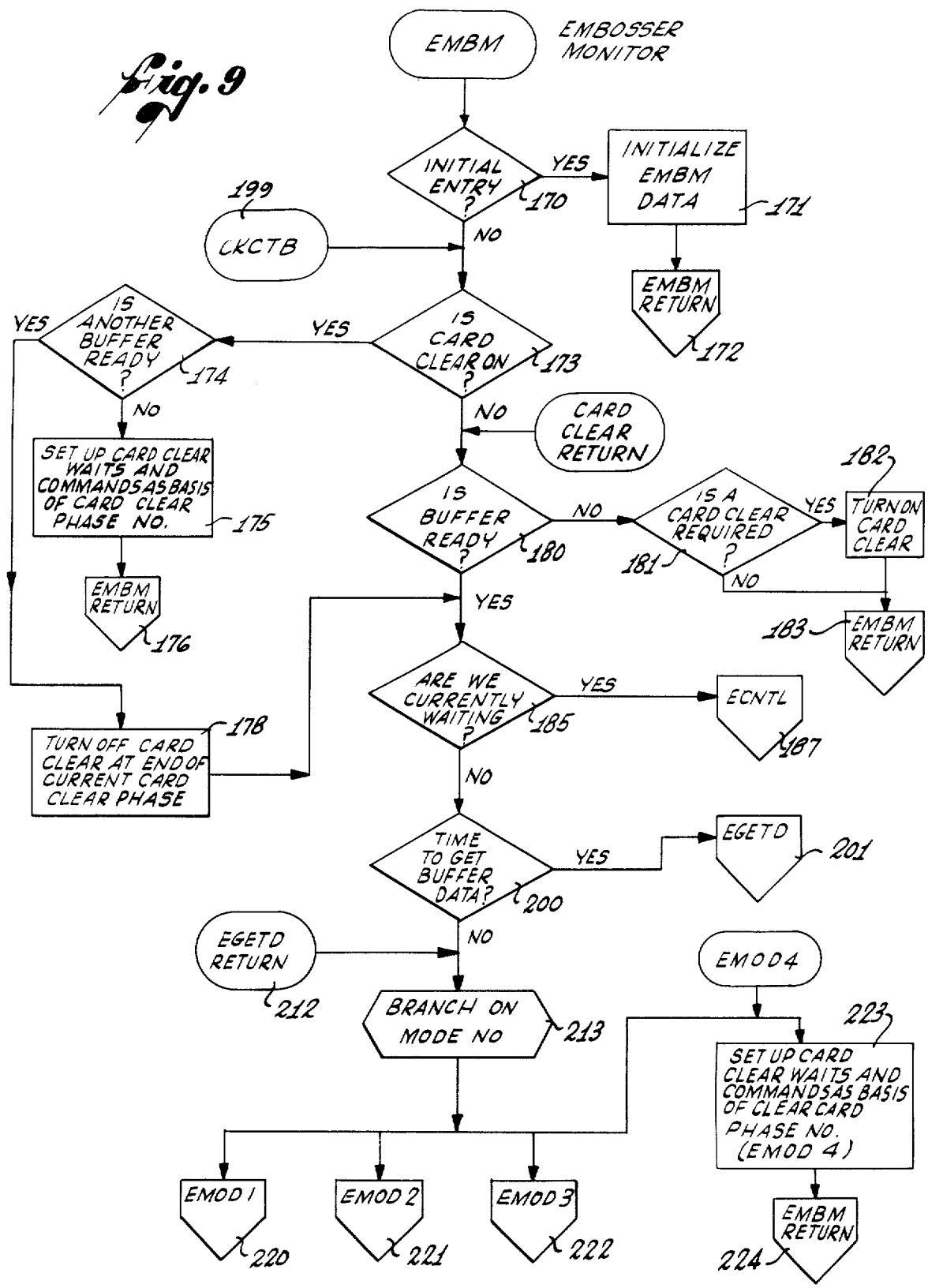
FIG. 9 is a flowchart of the initial portion of the Embosser Monitor (EMBM) software module which is called by the flowchart of FIG. 6 to service interrupts originating from the automatic card embossers.

Referring to FIG. 9, the initial entry decision step 170 first determines whether or not the current entry is the first since the system was set in operation. If so, initialize step 171 sets certain embosser control words to their proper values. Thereafter, via a transfer step 172, control is returned to step 113 of FIG. 6. It should be noted at this point that throughout the figures relating to the Embosser Monitor steps, the general return is via a transfer step and is labeled EMBM RETURN. In each case, the return is made to step 113 of FIG. 6. Hereafter, the return will be simply referred to as the Embosser Monitor return.

In those cases where the initial entry decision step 170 finds that the current entry into the Embosser Monitor steps is not the initial entry, card clear decision step 173 determines whether the card embosser presently being looked at is in its card clear stage. This refers to the operation in an embosser following the completion of an embossed card. If the decision step 173 determines that the card clear mode is on for the embosser being serviced, further buffer decision step 174 determines whether another buffer is ready. If not, step 175, the mode of operation referred to in the software listing as Mode 4, sets up card clear waits and commands on the basis of the card clear phase number. This refers to the timing requirements of the particular embosser used. Since the cards must be physically transported through the embosser, time delays of various lengths are required in the embossing operation. In the particular embosser utilized in the preferred embodiment, the card clear module consists of eight phases. One phase is controlled each time the embosser in card clear mode is addressed. That is, after each ten millisecond embosser interrupt, each embosser in the card clear mode will be stepped through one phase. One of the steps of each phase is to set up for the next phase following the next ten millisecond interrupt. At the end of each phase in the card clear mode, the usual Embosser Monitor return is made via transfer step 176.

If further buffer decision step 174 determines that another buffer is ready, step 178 turns off the card clear flag at the end of the current card clear mode phase.

If the card clear decision step 173 determines that the embosser being serviced is not in its card clear mode, then the Embosser Monitor software will switch to one of three other modes of operation. In such a case, buffer ready decision step 180 determines whether an embosser output buffer is ready to deliver data. If not, step 181 determines if a card clear routine is necessary. If so, step 182 turns on the software card clear flag. If no card clear is found to be required by step 181 or following the card clear flag being turned on by step 182, the usual Embosser Monitor return is made via transfer step 183.

If the buffer ready decision step 180 finds that data is ready for delivery to an embosser from the associated buffer location, waiting decision step 185 determines whether the Embosser Monitor is currently in a waiting stage. There are a number of instances where the timing requirements of the card embosser require that certain delays be set up between controlled steps. These are requirements of the card embosser itself and will vary as different embossers are used or embosser designs are changed. For example, in the first phase of the card clear mode described above, there is a requirement that a 520 millisecond wait be made. Instead of stopping the operation of the system during this wait, the system is programmed to count successive ten millisecond interrupts until 52 have been counted. Accordingly, all of the machine timing waits are set up as multiples of ten milliseconds. The waiting decision step 185 determines whether a waiting count has been begun on a prior operation of the Embosser Monitor for the embosser being serviced. If so, control is transferred to count done decision step 186 of FIG. 13 via transfer steps 187 and 188 (FIG. 13).

Figure 13:
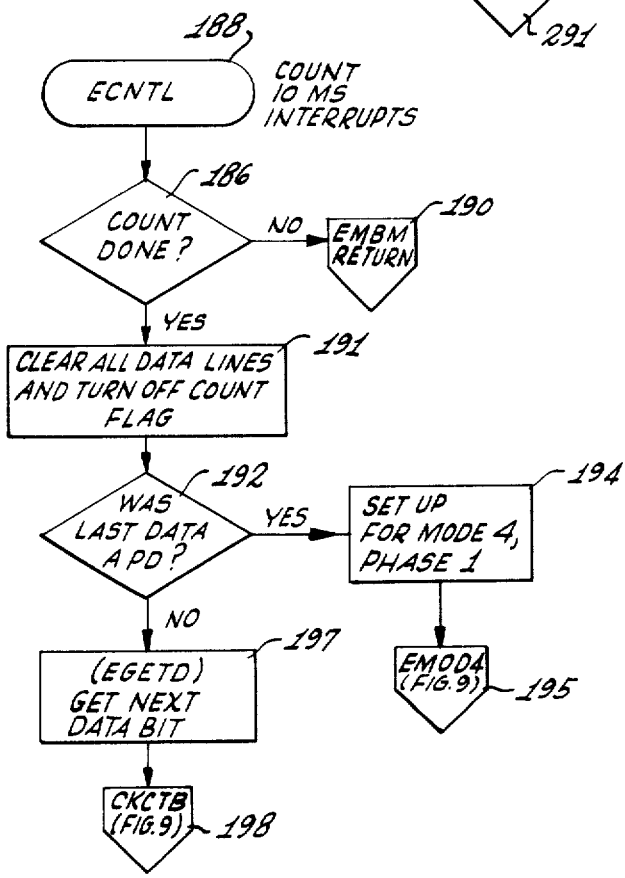
FIG. 13 is a flowchart of a portion (ECNTL) of the Embosser Monitor software module which is called from the flowchart of FIG. 9 for the purpose of counting ten millisecond interrupts to provide operation timing for the automatic card embossers.

FIG. 13 discloses the flowchart for the ECNTL routine. The purpose of the routine is to count the number of ten millisecond interrupts for the timing requirements described above. Referring to FIG. 13, count done decision step 186 determines whether the previously commanded wait period has been completed. For example, in the case of the 520 millisecond wait described above, the count done decision step 186 would generate a NO answer for 51 consecutive ten millisecond interrupts. Following a NO answer, an Embosser Monitor return is made via transfer step 190. It is pointed out that until the count is found to be finished by count done decision step 186, the Embosser Monitor routine may be exited for the embosser being serviced.

If the count done decision step 186 determines that the count is done, that is, that the total waiting time has elapsed, control is transferred to step 191 which clears all data lines and turns off the count flag. Thereafter, plate discharge decision step 192 determines whether the last data entered was a plate discharge command. The function of a plate discharge command is to advance all cards within the card embosser one position each time a command is entered. Note that this differs from a card clear command in that the latter advances only cards which are within the card embosser. If the plate discharge decision step 192 finds that the last data step received was a plate discharge command, control is transferred to step 194 which is the eight phase card clear mode described in connection with step 175 of FIG. 9. As before, at the end of each phase an Embosser Monitor return is made via transfer step 195.

Figure 14:
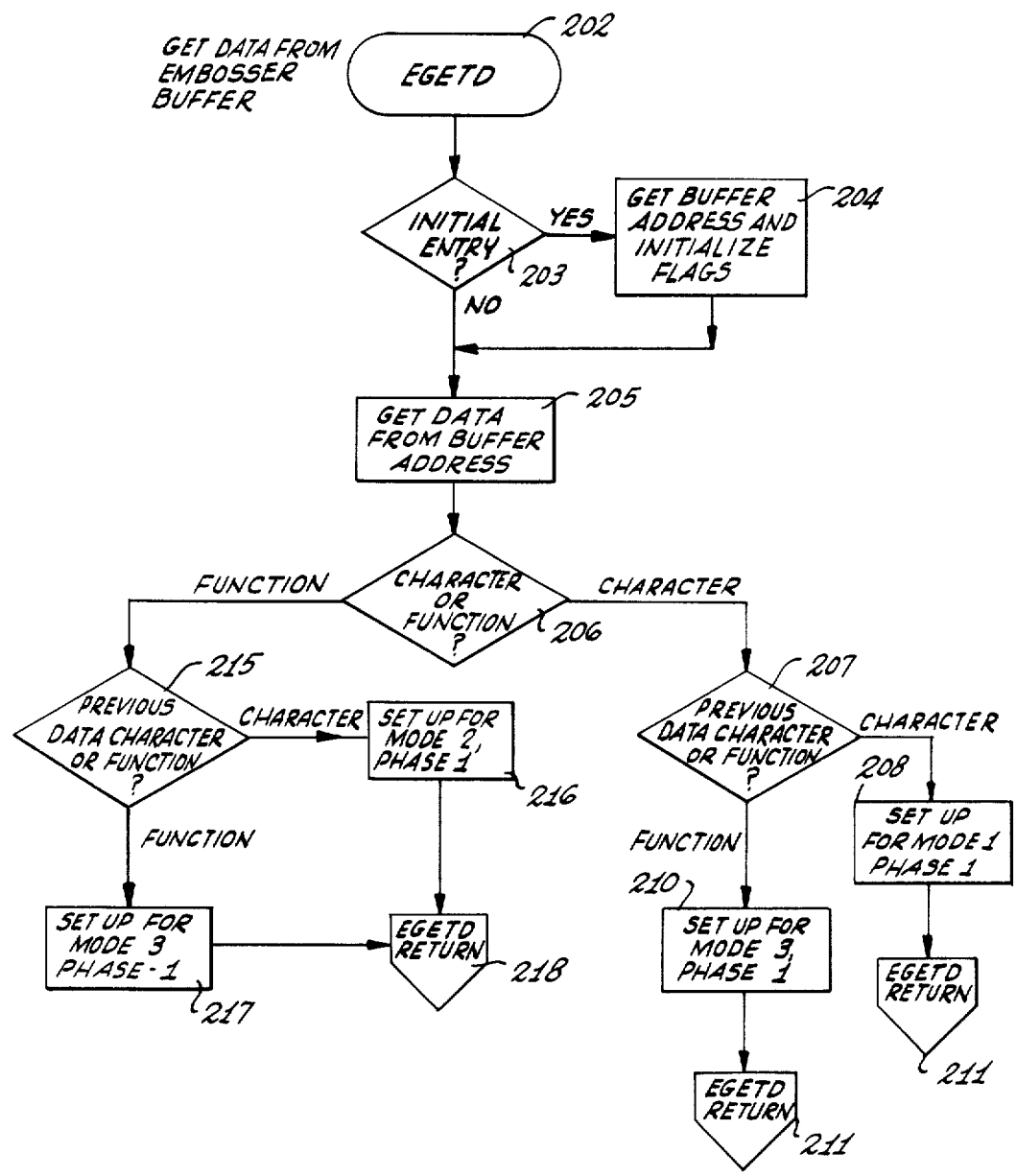
FIG. 14 is a flowchart of a portion (EGETD) of the Embosser Monitor software called from the flowchart of FIG. 9 for the purpose of transferring data from an embosser buffer for use by an automatic card embosser.

If the plate discharge decision step 192 determines that the last-received data entry was not a plate discharge, step 197 calls the procedure of FIG. 14 to obtain the next data bit from the embosser buffer. The data transfer steps of FIG. 14 will be described in connection with its entry from FIG. 9. Following the transfer of the next data bit from the embossed buffer, transfer step 198

(labeled CKCTB in FIG. 13) transfers control to step 173 of FIG. 9 via control entry step 199. Thereafter, the card clear, buffer ready and waiting decisions of FIG. 9 are made as before.

If the waiting decision step 185 of FIG. 9 determines that the embosser being looked at is not currently in a time delay, that is, is not currently waiting, control is transferred to data decision step 200 to determine whether a next data entry should be obtained from the embosser buffer. If so, control is transferred to the software steps of FIG. 14 via transfer steps 201 and 202 (FIG. 14) for the purpose of obtaining a data entry from the embosser buffer.

As before, the first step in the procedure is an initial entry decision step 203 which determines whether the current data entry is the initial entry for the embosser being serviced. If so, control is transferred to step 204 for the appropriate initialization procedure. If the current data transfer is not an initial entry or, following the intial entry initialization of step 204, control is transferred to data step 205 to transfer data from the address embosser buffer.

When the data is obtained, identification decision step 206 determines whether the data entry is a character or a function. If a character is found, prior decision step 207 determines whether the preceding data entry was a character or a function. This decision is necessary as a different procedure is followed when, for example, a function follows a character as opposed to a character following a character on an embossed card. If the prior entry decision step 207 determines that the prior entry was a character, control is transferred to step 208 which sets the proper flags for eventual transfer via the steps of FIG. 9 to the first phase of Mode 1. (FIG. 10) If the prior entry decision step 207 finds that the previous entry was a function, control is transferred to step 210 which sets the necessary flags for later entry into the first phase of Mode 3. (FIG. 12) After each set up, control is returned via transfer steps 211 and 212 (FIG. 9) to step 213 which transfers control to the mode previously set up.

Returning to FIG. 14, if entry identity decision step 206 determines that the entered data is a function, control is transferred to the second prior entry decision step 215 to determine, as in the case of the first prior entry step 207, the type of entry immediately proceeding. If it is found that the prior data entry was a character, control is transferred to step 216 which sets the necessary flags for later entry into the first phase of Mode 2. (FIG. 11) If the second prior entry decision step 215 finds that the prior entry was a function, control is transferred to step 217 for setting flags for later entry into the first phase of Mode 3. (FIG. 12) After either set up, control is transferred via transfer step 218 and entry 212 (FIG. 9) to branching step 213.

Referring to FIG. 9, it is noted that branching step 213 may be reached one of two ways. If the embosser being serviced after the current ten millisecond clock interrupt is in the process of embossing a card, the steps of FIG. 14 are entered via data decision step 200 (FIG. 9) to obtain the next piece of data. Thereafter, branching step 213 will transfer control to one of the first three modes determined by the comparison of the present and immediate prior data entry. On the other hand, if the embosser being serviced as a result of the current ten millisecond clock interrupt is found to be in a machine timing wait sequence, control is transferred to the steps of FIG. 13 via currently waiting decision step 185 of FIG. 9. The steps of FIG. 13 set up the flags for branching into the first phase of Mode 4 by branching step 213 of FIG. 9.

Referring to FIG. 9, branching step 213 determines which of the four modes have been previously set up. Dependent thereon, control is transferred to the Mode 1 steps of FIG. 10 via transfer step 220, the Mode 2 steps of FIG. 11 via transfer step 211, the Mode 3 steps of FIG. 12 via the transfer step 222 or into step 223 which defines the steps of Mode 4.

As described in connection with step 175 of FIG. 9, the card clear mode consists of eight phases. Each ten millisecond interrupt steps through one of the eight phases. The method controlled by step 223 and step 175 of FIG. 9 is identical.

In those cases where the steps of FIG. 14 determine that the current data entry is a character and the prior data entry was a character, control is transferred to the steps of Mode 1. Referring to FIG. 10, the character after character mode steps are divided into two phases. Accordingly, two successive ten millisecond clock interrupts are required to complete the steps of Mode 1. When Mode 1 is first entered during each pair of entries, steps 225 and 226 transfer control to phase 1 embosser error decision step 227. If an error has been previously made by the embosser, an error flag is set by step 228 and an Embosser Monitor return made via transfer step 229. The fact of an error is later sent to the operator's console via the Master Controller module as will be discussed below.

If no embosser error is encountered, K-1 decision step 230 determines whether the embosser has reached a timing position referred to as the K-1 position. The K-1 position occurs when the embosser's keyboard timing shaft is in its home position. If not, an Embosser Monitor return is made via transfer step 231. If so, control is transferred to step 232 which disables all interrupts and transfers the single character of data to the embosser. Thereafter, the interrupts are enabled and step 233 sets the flags for the second phase of Mode 1 when the current card embosser is next serviced after the following ten millisecond interrupt. Thereafter, an Embosser Monitor return is made via transfer step 234.

When the second phase of Mode 1 is entered by branching step 226, second embosser error decision step 235 determines whether an embosser error has been made. If so, step 236 sets the error flag and an Embosser Monitor return is made via transfer step 237.

If no embosser error is found, position decision step 238 determines whether the embosser has advanced to a time position termed the K-89 position. When the K-89 position is reached, all embosser functions, such as head move and hammer strike, have been completed. If not, an Embosser Monitor return is made via transfer step 240. If so, a fifty millisecond wait is commanded by waiting step 241 and the count flag is turned on. As explained before, this will result in the software steps of FIG. 13 being entered for the current card embosser following the next five ten millisecond interrupts. In this way, the current machine will be allowed to pause fifty milliseconds for the embossing of the currently entered character before new data is transferred to it. Following the fifty millisecond count started by step 241, an Embosser Monitor return is made via transfer step 242.

Figure 11:
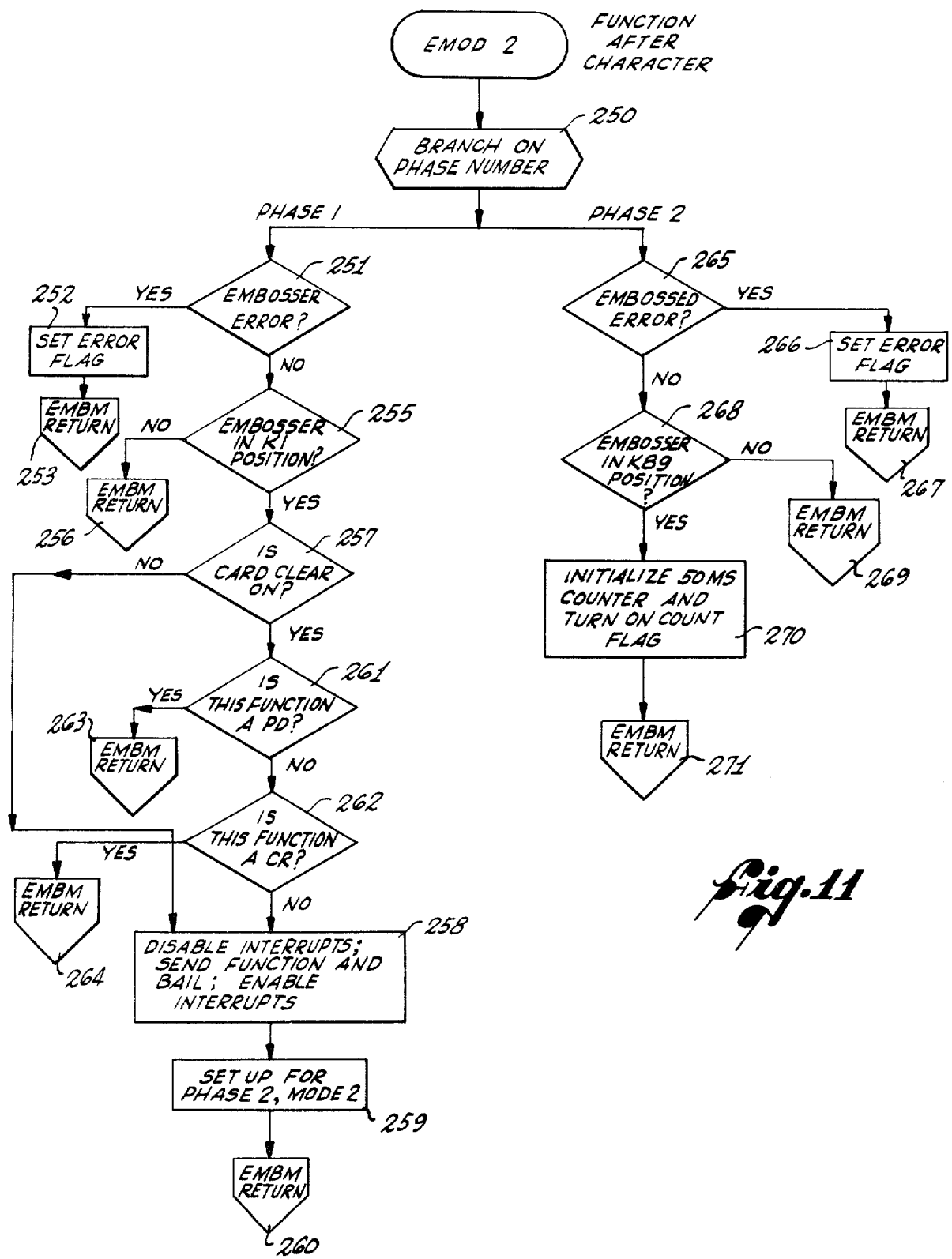
FIG. 11 is a flowchart of a portion of the Embosser Monitor software module showing the second mode (EMOD 2) of operation (function after character) of the embosser hardware.

Referring again to FIG. 9, it will be recalled that branching step 213 transfers control to the Mode 2 function after character steps of FIG. 11 when the current data entry is a character and the prior data entry was a function. As with Mode 1, the second mode is divided into two phases and requires, therefore, two successive ten millisecond clock interrupts to complete.

Referring to FIG. 11, upon the first entry, branching step 250 transfers control to the first phase embosser error decision step 251. As before, an embosser error will cause flag step 252 to turn on the embosser error flag after which an Embosser Monitor return is made via transfer step 253. If no embosser is found, time decision step 255 determines whether the embosser is in the previously described K-1 position. If not, an Embosser Monitor return is made via transfer step 256. If the K-1 position is found currently, card clear decision step 247 determines whether the card clear command is currently in force. If not, control is transferred to step 258 which disables all interrupts and initiates the function in the card embosser. Thereafter, the interrupts are enabled and step 259 controls the flags to be set up for the second phase of Mode 2.

Upon the next entry into the Embosser Monitor for the card embosser currently being looked at, that is, following the next ten millisecond clock interrupt, the branching step 250 will transfer control to the second phase steps. After the second phase set up is made by step 259, an Embosser Monitor return is made via transfer step 260.

If card clear decision step 257 determines that a card clear command is in effect, decision steps 261 and 262 determine, respectively, whether the received function is a plate discharge or a carriage return. If either, an Embosser Monitor return is made via transfer steps 263, 264. If neither are found, control is transferred to step 258 and the process continues as described above.

When the Embosser Monitor steps are next entered after the first phase entry, branch step 250 transfer control to the second phase embosser error step 265. If an embosser error is found, step 266 sets the proper flag after which an Embosser Monitor return is made via transfer step 267. If no embosser error is found, timing step 268 determines whether the embosser is in the previously described K-89 timing position. Since the embosser must be in that position for the second phase of Mode 2 to continue, if it is found not to be in the K-89 position, an Embosser Monitor return is made via transfer step 269. Absent an error, the K-89 timing position should be reached upon the next ten millisecond clock interrupt for the embosser being serviced. If the embosser is found to be in the K-89 position control is transferred to step 270 which begins a fifty millisecond waiting period in order to allow the entered function to be carried out by the embosser. As described above, the waiting period is determined by counting the number of intervening ten millisecond clock interrupts. After the fifty millisecond clock is started, an Embosser Monitor return is made via transfer step 271.

Figure 12:
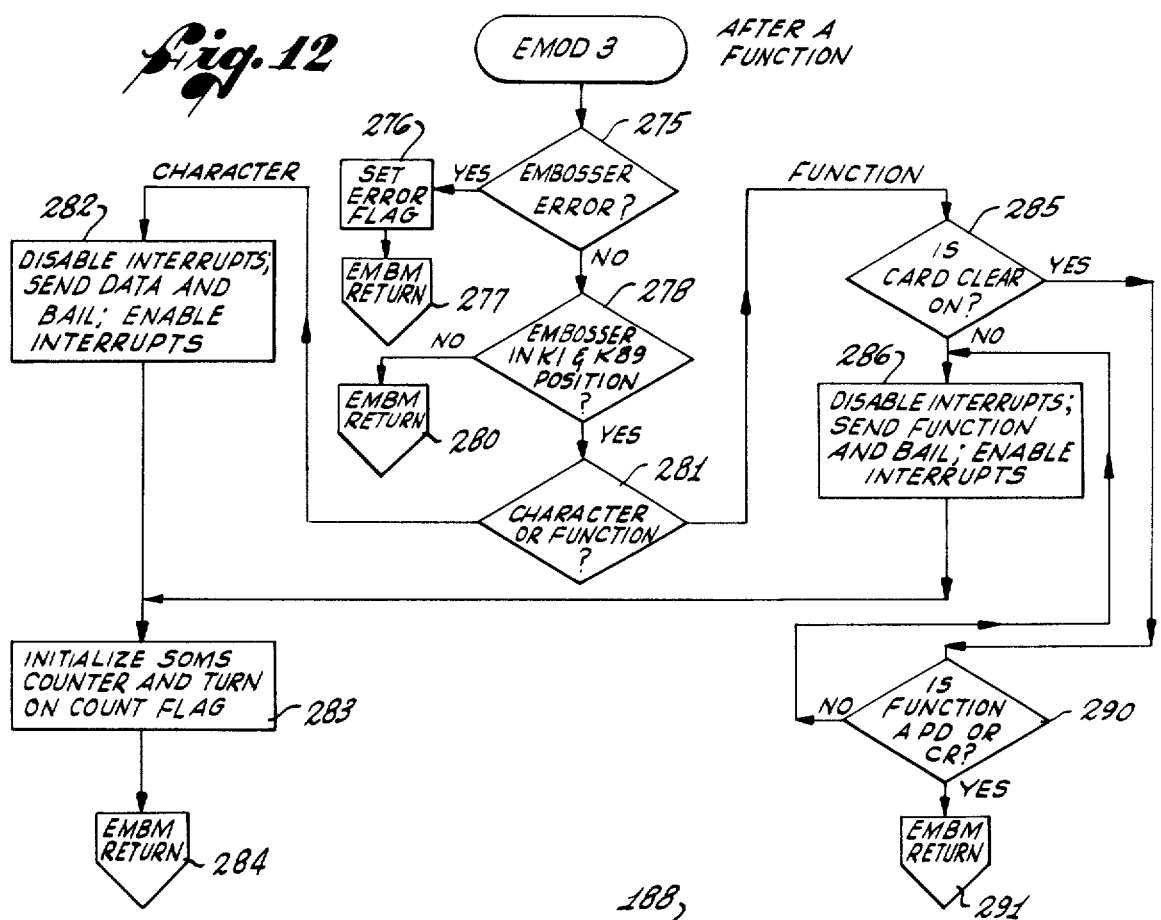
FIG. 12 is a flowchart of a portion of the Embosser Monitor software module showing the third mode (EMOD 3) of operation (character or function after function) of the embosser hardware.

Finally, as described above in connection with FIG. 9, branching step 213 calls the software steps of FIG. 12 for Mode 3 when a function is entered following a function. Referring to FIG. 12, entries into the Mode 3 steps first require an embosser error decision step 275. As before, if an error is found, the error flag is set by step 276 and an Embosser Monitor return made via transfer step 277. If no embosser error is found, a timing decision step 278 determines whether the embosser timing is in the K-1 and K-80 position. It is necessary that the embosser be in this condition for the Mode 3 step to continue. Accordingly, if the condition is not found, an Embosser Monitor return is made via transfer step 280.

If the timing step 278 finds the embosser in the proper timing position, entry identity decision step 281 determines whether the entered data is a character or a function. If a character, control is transferred to step 282 which disables the interrupts and sends the data character to the embosser. Thereafter, the interrups are enabled and control transferred to counter step 283 which initiates a fifty millisecond wait as described above. Thereafter, an Embosser Monitor return is made via transfer step 284.

If the entry identification step 281 determines that the entry is a function, control is transferred to step 285 which determines whether card clear is in effect. If it is not, step 286 sends the entered function code to the embosser after which counter step 283 initiates a fifty millisecond wait as before. If the card clar is found to be on, control is transferred to function decision step 290 for determination of whether the entered function is a plate discharge or carriage return command. If it is, an Embosser Monitor return is made via transfer step 291. If it is not, control is transferred to step 286 which functions as previously described.

9. Master Controller Module

Figure 15:
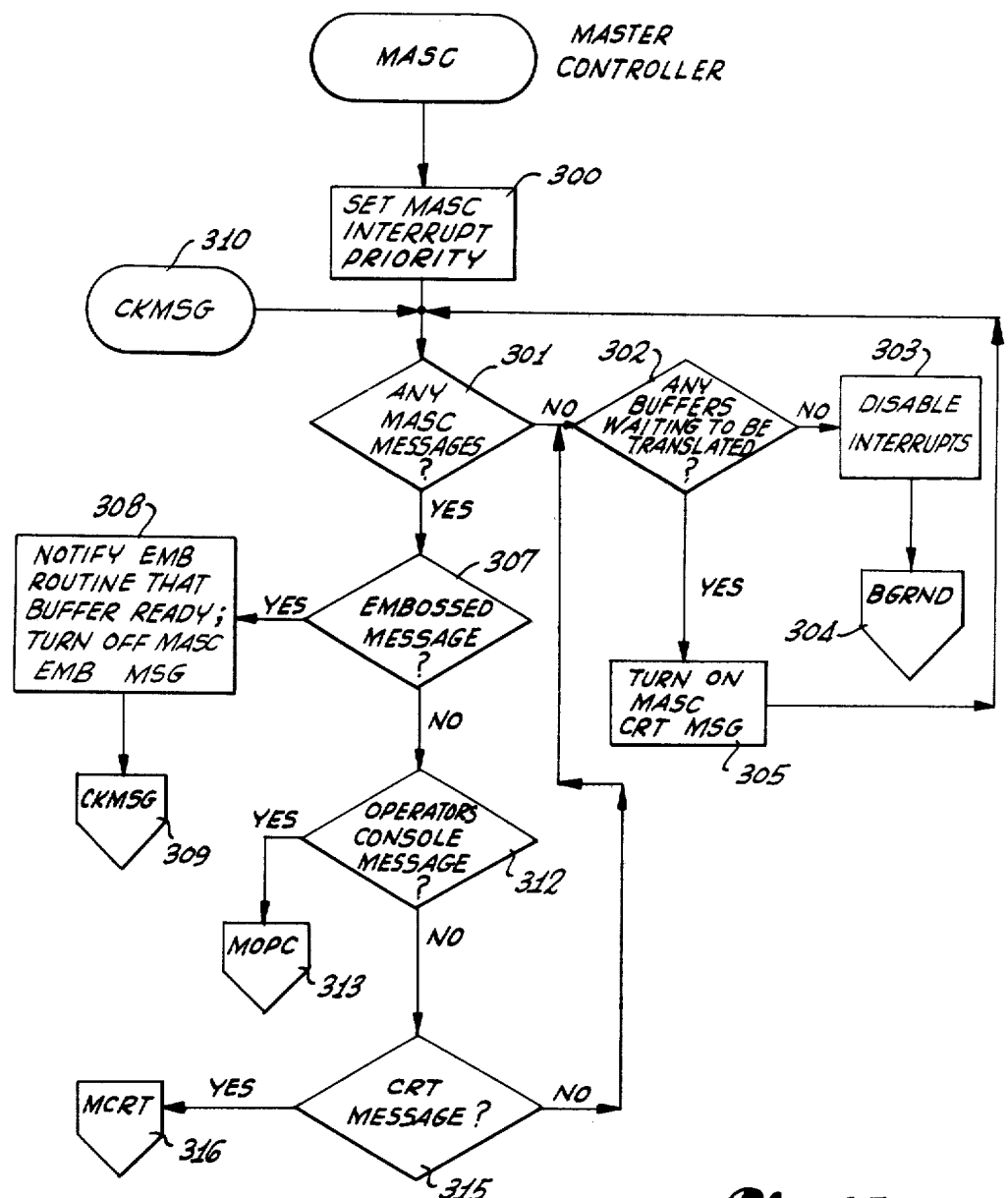
FIG. 15 is a flowchart of the initial portion of the Master Controller software module which controls the transfer of data within the system and controls translation of the entered data to the proper embosser code.
Figures 16, 17:
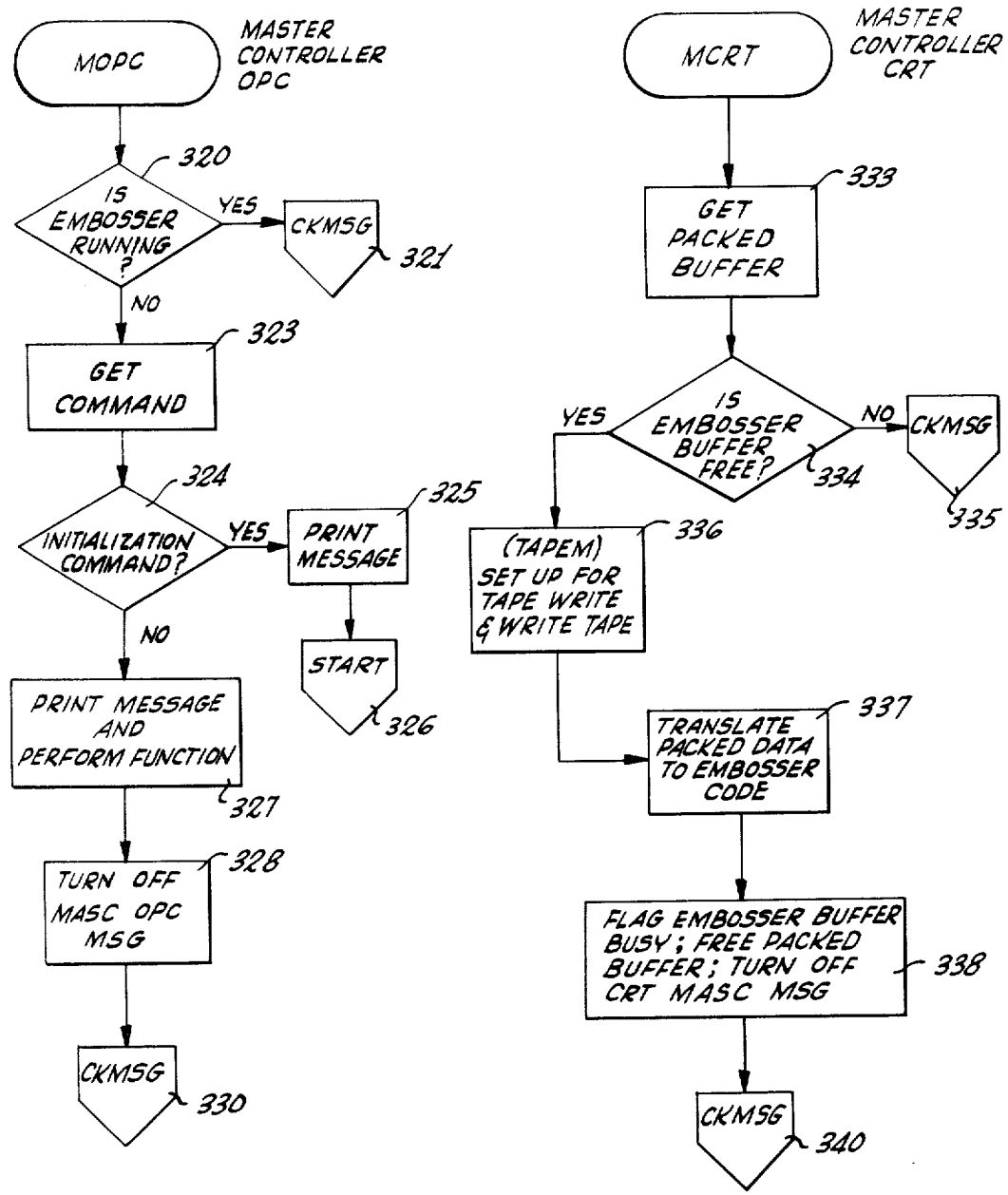
FIG. 16 is a flowchart of a portion of the Master Controller software module called from the flowchart of FIG. 15 for the purpose of accepting inputs from the operator's control console.
FIG. 17 is a flowchart of a portion of the Master Controller software module called from the flowchart of FIG. 15 for the purpose of accepting data from input terminal storage buffers.

FIGS. 15, 16 and 17 disclose the flowcharts for the Master Controller software module. As illuatrated in the high level flowchart of FIG. 2, the Master Controller steps are entered from the last routine (FIG. 7) of the Interrupt Monitor module. Data entered at a CRT terminal is stored in core under control of the CRT Monitor portion of the Interrupt Monitor software module. Except for this data transfer, the Master Controller handles all data flow within the system.

There are two inputs to the Master Controller software. Data inputs originate in core buffers which contain information entered concerning each attendee. In addition, the Master Controller monitors a system status word which contains a plurality of bits, each bit showing the status of a device in the system. As will be discussed in connection with FIGS. 15-17, the Master Controller continually checks for the readiness of the system to transfer data by examining individual bits in the system status word. Finally, the Master Controller software module calls a routine for translating the data code used within the system to a special code accepted by the card embossers. This translation is, of course, dependent upon the particular card embosser used.

Referring to FIG. 7, it is recalled that the Interrupt Monitor, as a last step, checks for pending interrupts following the servicing of each single interrupt. When all pending interrupts at one time have been serviced, and no further interrupts are pending, the steps of FIG. 7 transfer control to the Master Controller entry steps shown in FIG. 15.

Referring to FIG. 15, step 300 sets the appropriate interrupt priority and transfers control to message decision step 301. Decision step 301 examines the system status word to determine whether there are any Master Controller messages, that is, whether any data is ready for transfer. If there are no messages, control is transferred to translation decision step 302 for a determination of whether there are any embosser buffers with data ready for translation to the required embosser code. If not, a disabling step 303 disables the interrupts set by step 300 and exits the Master Controller software via transfer step 304. Step 304 is labeled BGRND for Background and transfers control to step 36 of the background program steps (FIG. 2). As described in connection with FIG. 2, at this point the looping begins between the decision steps awaiting an initialization message from the operator's console or an interrupt from one of the four interrupt sources.

If translation decision step 302 finds that buffer data is awaiting translation, control is transferred to step 305 which turns on an appropriate bit in the system status word. Control is then transferred to message decision step 301 which will recognize the change in status word controlled by step 305. Since a Master Controller message then exists, control is transferred to embosser message decision step 307. The embosser decision step 307 determines whether an embosser buffer is ready to deliver data to a card embosser. If so, control is transferred to step 308 which sets a flag recognizable by the Embosser Monitor buffer ready decision step (step 180 of FIG. 9) so that the next time the Interrupt Monitor steps are entered, the appropriate data transfer to the card embossers will begin. Also, step 308 turns off the bit in the system status word that was examined by embosser message decision step 307 to determine whether an embosser buffer was ready to deliver data. Thereafter, control is retransferred to Master Controller message decision step 301 via transfer steps 309 and 310.

If embosser message decision step 307 finds no embosser buffers ready to deliver data to a card embosser, control is transferred to console message decision step 312 which looks at the status word bit concerning the operator's console. If the console has data for entry, control is transferred to the software steps of FIG. 16 for acceptance of the message via transfer step 313.

If console message decision step finds no console message ready for transfer, control is transferred to CRT message decision step 315 which looks at the system status word bit corresponding to the CRT data packed buffers. If any of the packed buffers are ready to deliver data to an embosser buffer, control is transferred to the steps of FIG. 17 via a transfer step 316. IF there is no CRT message, control is transferred to step 302 which, as explained above, determines whether there are embosser buffers awaiting translation. If not, the Master Controller module is exited and the background looping is begun.

As described above, if console message decision step 312 finds that a message is ready for entry from the operator's console, control is transferred to the steps of FIG. 16. Referring to that FIGURE, an embosser running decision step 320 determines initially whether there is a card embosser running. If so, the message ready from the operator's console will not be accepted and control is retransferred to step 301 of FIG. 15 via transfer steps 321, 310.

If embosser running decision step 320 finds no embosser running, command step 323 causes the command from the operator's console to be loaded into core. A command decision step 324 determines whether the entered command relates to initialization. If so, an appropriate reply message is printed on the console by step 325 and the background steps started via START STEP 326 (step 32 FIG. 2).

When command decision step 324 finds that the command entered from the operator's console is not an initialization command, control is transferred to step 327 which causes an appropriate reply message to be sent to the console and the instructed function to be performed. Thereafter, the status word bit relating to the Master Controller's operator's console is turned off by step 328 and control is retransferred to step 301 of FIG. 15 via transfer steps 330, 310.

It will be recalled that step 315 of FIG. 15 examines the bit in the system status word relating to the CRT packed buffers to determine whether any buffer is ready to transfer data. In those cases where a buffer is found ready for data transfer, control is transferred via step 316 to the steps of FIG. 17. The function of the steps of FIG. 17 is to transfer attendee information from one of the CRT packed buffers to an embosser buffer in translated form. As described above, the translation that must take place is the change in the data to a form which is acceptable by the card embossers.

Referring to FIG. 17, data transfer step 333 transfers data from a packed CRT buffer. Thereafter, embosser decision step 334 determines whether an embosser buffer is available for receiving the packed buffer data after its translation. If not, the FIG. 17 routine is exited through transfer step 335 to step 301 of FIG. 15.

If embosser buffer decision step 334 finds an available embosser buffer, control is transferred to tape writing step 336. Step 336 represents the TAPEM instructions contained in the program listing herein. The purpose of the steps is to transfer the data obtained from the packed CRT buffer to the system magnetic tape storage. As discussed above, this storage is utilized as a data source for attendee statistics. Since the tape writing steps are standard, no detailed flowchart explanation is given herein.

Following the transfer of the attendee data to tape, translation step 337 controls the translation of the packed data to embosser code. Step 337 operates in a familiar table look up fashion. As with the tape transfer steps, instructions for the embosser code data translation are contained herein in the program listing. Since they comprise a standard table look up procedure, a detailed flowchart explanation concerning the translation will not be made.

Following the translation of the data to embosser code, step 338 sets a flag denoting a full embosser buffer, notes the change in status of the now empty CRT packed buffer and turns off the Master Controller CRT message which initiated the entry into the steps of FIG. 17. Thereafter, transfer step 340 transfers control to Master Controller message decision step 301 of FIG. 15.

Accordingly, it is noted that the Master Controller software module, when entered, performs a looping operation until all current data transfers have been accomplished. Thereafter, via transfer step 304 of FIG. 15, the background steps are entered for the interrupt and initialization message loop.

10. Program Listing

Following is the source listing of the entire program according to this invention.

```
                ;
                ;               DATA BLOCK -- 4 MODULE REGIS
                ;
        000000  .LOC 0
00000   000000                  0
00001   000444          INTH
        000020  .LOC 20
00020   000000  HINC1:          0
00021   000000  HINC2:          0
00022   000000  HINC3:          0
00023   000000  HINC4:          0
00024   000000  HINC5:          0
00025   000000  HINC6:          0
00026   000000  HINC7:          0
00027   000000  HINC8:          0
00030   000000  HDEC1:          0
00031   000000  HDEC2:          0
00032   000000  HDEC3:          0
00033   000000  HDEC4:          0
00034   000000  HDEC5:          0
00035   000000  HDEC6:          0
00036   000000  HDEC7:          0
00037   000000  HDEC8:          0
        000040  .LOC 40
00040   006156  CCB:    6156
00041   006035          6035
00042   005714          5714
00043   005573          5573
00044   005452          5452
00045   005331          5331
00046   005210          5210
00047   005067          5067
00050   004746          4746
00051   004625          4625
00052   004504          4504
00053   004363          4363
00054   000000          0
                ;
00055   000014  TDVCD:          14
00056   000016                  16
00057   000022                  22
00060   000030                  30
00061   000040                  40
00062   000042                  42
00063   000044                  44
00064   000046                  46
00065   000050                  50
00066   000052                  52
00067   000054                  54
00070   000000                  0
                ;
00071   000002  RTCP:           2       ;DEVICE PRIORITIES
00072   000004  TPEP:           4
00073   000001  TTYP:           1
00074   000003  CRTPR:          3
                ;
                ;
00075   007630  C30S:           7630    ;STATUS, BUFFER
00076   000000                  0       ;BUF CRN1
00077   000000                  0       ;L1, L2
00100   000000                  0       ;L3, L4
00101   000000                  0       ;L5, L6
00102   000000                  0       ;HLF PNTR, LINCT
00103   007507  C40S:   7507
        000005          .BLK 5
00111   007366  C42S:   7366
        000005          .BLK 5
00117   007245  C44S:   7245
        000005          .BLK 5
```

```
00125  007124  C465:   7124
       000005          .BLK 5
00133  007003  C505:   7003
       000005          .BLK 5
00141  006662  C525:   6662
       000005          .BLK 5
00147  006541  C545:   6541
       000005          .BLK 5
                ;
00155  000000  NCBT7:  0
00156  000000          0
00157  000000          0
00160  000000          0
00161  000000          0
00162  000000          0
00163  000000          0
00164  000000          0
00165  000000          0
00166  000000          0
00167  000000          0
00170  000000          0
00171  177777          177777
00172  000000  NCBT6:  0
00173  000000          0
00174  000000          0
00175  000000          0
00176  000000          0
00177  000000          0
00200  000000          0
00201  000000          0
00202  000000          0
00203  000000          0
00204  000000          0
00205  000000          0
00206  177777          177777
00207  000000  NCBT5:  0
00210  000000          0
00211  000000          0
00212  000000          0
00213  000000          0
00214  000000          0
00215  000000          0
00216  000000          0
00217  000000          0
00220  000000          0
00221  000000          0
00222  000000          0
00223  177777          177777
00224  000000  NCBT4:  0
00225  000000          0
00226  000000          0
00227  000000          0
00230  000000          0
00231  000000          0
00232  000000          0
00233  000000          0
00234  000000          0
00235  000000          0
00236  000000          0
00237  000000          0
00240  177777          177777
                ;
00241  160037  CTAB7:  160037
00242  000000          0
00243  160036  CTAB6:  160036
00244  000000          0
00245  160035  CTAB5:  160035
00246  000000          0
00247  160034  CTAB4:  160034
```

```
00250 000000              0
        ;
00251 000000 LASTP:       0
00252 000002 RTCH:        2
00253 000000 MSGAD:       0
00254 000000 CHMSK:       0
00255 000000 DEVLO:       0
00256 000000 LIFOH:       0
00257 000000 LIFOC:       0
00260 000000 RETRN:       0
00261 177730 LTMSK:  177730    ;ALL
00262 177734 LXMSK:  177734    ;ALL BUT CLOCK
00263 000015 CKINK:  CKINT
00264 000044 MMSGK:  CKMSG
00265 000032 MRKST:  RLIFO
00266 000000 RGCNT:       0
00267 000000              0
00270 000000 .           0
00271 000000              0
00272 000000              0
00273 000000              0
00274 000000              0
00275 000000              0
00276 000000              0
00277 000000              0
00300 000000 OMESS:       0
00301 000000 CRTF1:       0
00302 000000              0
00303 000000              0
00304 000000 CRTF2:       0
00305 000000              0
00306 000000              0
00307 000000 CRTF3:       0
00310 000000              0
00311 000000              0
00312 000000 CRTF4:       0
00313 000000              0
00314 000000              0
00315 000000 CRTF5:       0
00316 000000              0
00317 000000              0
00320 000000 CRTF6:       0
00321 000000              0
00322 000000              0
00323 000000 CRTF7:       0
00324 000000              0
00325 000000              0
00326 000000 CRTF8:       0
00327 000000              0
00330 000000              0
        ;
00331 177777 M1:         -1
00332 177776 M2:         -2
00333 177774 M4:         -4
00334 177772 M6:         -6
00335 177767 M9:        -11
00336 000343 ACHCT:  CHCNT-1
00337 177400 LHM:    177400
00340 160000 NULL:   160000
00341 000377 C377:      377
00342 177760 IUMSK:  177760
        ;
00343 000000 LINCT:       0
00344 000000 CHCNT:       0
      000005           .BLK 5
00352 000000 HLFPT:       0
00353 000000 ASTAB:       0
00354 000000 BUFIN:       0
        ;
```

```
00355 000000 MSGFL:  0
00356 000000 MSGBF:  0
00357 000357 RRCTB:  RCTB-1
              ;RGCNT ADDR  ONE CH TYPE  ADDR CNG IF DATA CHG********
00360 133702 RCTB:  133702  ;B 267,302
00361 134303         134303  ;C 270,303
00362 134704         134704  ;D 271,304
00363 135305         135305  ;E 272,305
00364 135707         135707  ;G 273,307
00365 136315         136315  ;M 274,315
00366 136717         136717  ;O 275,317
00367 137322         137322  ;R 276,322
00370 000000         000000  ;END-O-TBL
              ;
00371 000000 CTHB:  0
00372 000000        0
00373 102037 EDSW9: 102037
00374 100437 EERR9: 100437
00375 140037 EDON9: 140037
00376 100037 EIDL9: 100037
00377 000037 EBUS9: 000037
              ;
      006540  .LOC 6540
06540 000000 LIFO:  0          ;6540 - 6300 = LIFO TBL
              .EOT
              ;
              ;EMBOSSER DRIVER DATA
              ;
      006300  .LOC 6300
06300 000155 EAMBT: NCBT7
06301 000241        CTAB7
06302 000267        267
06303 000037        37
06304 000364        RST37
06305 000172        NCBT6
06306 000243        CTAB6
06307 000066        66
06310 000036        36
06311 000404        RST36
06312 000207        NCBT5
06313 000245        CTAB5
06314 000065        65
06315 000035        35
06316 000424        RST35
06317 000224        NCBT4
06320 000247        CTAB4
06321 000264        264
06322 000034        34
06323 000444        RST34
              ;
06324 002135 MDCT:  EMBST
06325 002176        DOUT+1
06326 002200        DOUT+3
06327 002207        FOUT+3
06330 002211        FOUT+5
06331 002217        DFCLR+1
06332 002325        EIDLE
06333 002321        EDONE
06334 002370        CCON+1
06335 002373        CCOFF+1
06336 000373        EDSW9
06337 000374        EERR9
06340 000375        EDON9
06341 000376        EIDL9
06342 000377        EBUS9
06343 002450        ESTA9
              ;
06344 001745 ARGYS: HD3LD
06345 001726        EZERO
06346 001734        CCFLG
```

```
06347 001746      DHFLG
06350 001735      MODE
06351 001736      MODE1
06352 001737      MODE2
06353 001740      MODE3
06354 001744      MODE4
06355 001727      ECNTF
06356 001760      ECNTR
06357 001731      EOUTD
06360 002004      SAVHD
06361 002022      HEBUF
06362 002320      HECHS
06363 002160      DIREC
                  ;
06364 000000 RST37: 0
06365 000000      0
06366 000000      0
06367 000000      0
06370 000001      1
06371 000001      1
06372 000000      0
06373 000000      0
06374 000000      0
06375 000000      0
06376 000000      0
06377 000000      0
06400 000000      0
06401 000000      0
06402 000000      0
06403 000000      0
06404 000000 RST36: 0
06405 000000      0
06406 000000      0
06407 000000      0
06410 000001      1
06411 000001      1
06412 000000      0
06413 000000      0
06414 000000      0
06415 000000      0
06416 000000      0
06417 000000      0
06420 000000      0
06421 000000      0
06422 000000      0
06423 000000      0
06424 000000 RST35: 0
06425 000000      0
06426 000000      0
06427 000000      0
06430 000001      1
06431 000001      1
06432 000000      0
06433 000000      0
06434 000000      0
06435 000000      0
06436 000000      0
06437 000000      0
06440 000000      0
06441 000000      0
06442 000000      0
06443 000000      0
06444 000000 RST34: 0
06445 000000      0
06446 000000      0
06447 000000      0
06450 000001      1
06451 000001      1
06452 000000      0
```

```
06453 000000 0
06454 000000 0
06455 000000 0
06456 000000 0
06457 000000 0
06460 000000 0
06461 000000 0
06462 000000 0
06463 000000 0
                ;
                .EOT
        06460   .LOC 460
06400 060337 START:   NIOP    37
06401 060336          NIOP    36
06402 060335          NIOP    35
06403 060334          NIOP    34
06404 020252 BGRND:   LDA     0,RTCH      ;INIT CLOCK
06405 061014          DOA     0,11
06406 020126          LDA     0,ALIFO     ;GET ADDRESS OF LIFO TABLE
06407 040124          STA     0,RINLU     ;LIFO GET/RET ADDRESS CNTR
06410 040134          STA     0,RDECS     ;LIFO PUT ADDRESS
06411 102400          SUB     0,0
06412 040257          STA     0,LIFOC     ;ZERO OUT COUNTER
06413 040255          STA     0,DEVCD     ;       DEVICE CODE
06414 040253          STA     0,MSGWD     ;       MASC MSG WD
06415 020331          LDA     0,H1
06416 040256          STA     0,LIFOP     ;       LIFO PRIORITY
06417 060114          NIOS    14          ;START CLOCK
06420 020261          LDA     0,L1MSK
06421 046254          STA     0,CMASK
06422 062177          DOAS    0,77        ;ENABLE ALL
06423 020355          LDA     0,MSGFL
06424 101015          MOV#    0,0,SNR     ;ANY PRINT MSGS?
06425 000404          JMP     @WAIT       ;NO
06426 030156          LDA     2,MSGBF     ;YES, GET ADDRESS
06427 021000          LDA     0,0,2       ;GET DATA CH
06430 061111          DOAS    0,11
06431 000401 @WAIT:   JMP     .+1
06432 000777          JMP     @WAIT
                ;
06433 002403 EMDI:    EMWM
06434 006340 ALIFO:   LIFO
06435 000057 ACRTD:   TDVCD+2
06436 001014 AEMDP:   EMDP
06437 000722 AINTL:   INTLV
06440 001024 ATPIL:   TPILV
06441 000775 AOPCP:   OPCP
06442 000632 ACRTP:   CRTP
06443 001041 AMSCK:   MASC
                ;
06444 060277 INTH:    INTDS
06445 000523          JMP     PLIFO
06446 061477 IACK:    INTA    0
06447 040255          STA     0,DEVCD
06450 024342 FLDIN:   LDA     1,IDMSK
06451 030404          LDA     2,DCLER
06452 133400          AND     1,2
06453 113000          ADD     0,2
06454 050401          STA     2,DCLER
06455 060210 DCLER:   NIOC    10
06456 024055          LDA     1,TDVCD
06457 106414          SUB#    0,1,SZR     ;IS IT CLK?
06460 000404          JMP     CHKIL       ;NO
06461 024071          LDA     1,RTCP
06462 044256          STA     1,LIFOP
06463 002753          JMP     @MEMBF
06464 101212 CHKIL:   MOVR#   0,0,SZC     ;IS IT OUTPUT
06465 002752          JMP     @AINTL      ;YES
06466 024057          LDA     1,TDVCD+2
06467 106415          SUB#    0,1,SNR     ;IS IT TYPE
06470 002750          JMP     @ATPIL      ;YES
```

```
00471 024604        LDA   1,TDVCD+1
00472 106414        SUB#  0,1,SZR    ;IS IT TTY
00473 000404        JMP   CKCRT      ;NO
00474 024073        LDA   1,TTYP
00475 044256        STA   1,LIFOP
00476 002743        JMP   @HOPLP
00477 024074 CKCRT: LDA   1,CRTPR
00500 044256        STA   1,LIFOP
00501 024734        LDA   1,MCKID
00502 044021        STA   1,MINC2
00503 152400        SUB   2,2
00504 026021 LCCRT: LDA   1,@MINC2
00505 151400        INC   2,2
00506 125013        MOV#  1,1,SNR
00507 000104        JMP   CKINT      ;UNKNOWN INTERRUPT
00510 106414        SUB#  0,1,SZR
00511 000773        JMP   LCCRT
00512 002730        JMP   @HCKTP     ;R2 HAS INDEX C--S
;
;
;
00513 001477 CKINT: INTA  0
00514 040235        STA   0,DEVCD
00515 101015        MOV#  0,0,SNR
00516 000406        JMP   ENALL      ;NO
00517 036251        LDA   2,LASTP    ;GET LAST LIFO PRIORITY
00520 151112        MOVL# 2,2,SZC    ;HAS IT BGRND(NEG) ENTRY
00521 000727        JMP   FLDIN      ;YES, FIELD CURRENT
00522 112833        MOVZ# 0,2,SNC    ;NO, IS LIFO > CURRENT
00523 000725        JMP   FLDIN      ;NO, FIELD CURRENT
00524 026257 ENALL: LDA   0,LIFOC    ;YES, FIELD LIFO
00525 161224        MOVZR 0,0,SZR    ;MORE THAN BGRND ENTRY
00526 000405        JMP   RLIFO      ;YES, FIELD LAST
00527 024261        LDA   0,LIMSK    ;NO,ENABLE ALL &
00530 040254        STA   0,CMMSK
00531 062177        DOBS  0,77
00532 002711        JMP   @MASCH     ;INVOKE MASTER CONTROLLER
;
;
;RETURN TO LAST LIFO
00533 014257 RLIFO: DSZ   LIFOC
00534 000401        JMP   .+1        ;DSZ NO-OP
00535 014024        DSZ   MINCS      ;POSITION LIFO PNTR
00536 024335        LDA   1,M5
00537 010034 PDEC:  ISZ   ADECS
00540 125400        INC   1,1
00541 125014        MOV#  1,1,SZR
00542 000773        JMP   PDEC
00543 022024        LDA   0,@MINCS
00544 040256        STA   0,LIFOP
00545 022024        LDA   0,@MINCS
00546 040254        STA   0,CMMSK     ;RESTORE MMSK
00547 062077        MSKO  0           ;SET UP FOR INT
00550 022024        LDA   0,@MINCS
00551 040235        STA   0,DEVCD
00552 036024        LDA   3,@MINCS
00553 032024        LDA   2,@MINCS
00554 026024        LDA   1,@MINCS
00555 022024        LDA   0,@MINCS
00556 040260        STA   0,RETRN
00557 022024        LDA   0,@MINCS
00560 101200        MOVR  0,0
00561 022024        LDA   0,@MINCS
00562 040037        STA   0,MDECS     ;TEMP WORK
00563 022024        LDA   0,@MINCS    ;POS LIFO PNTR &
00564 040251        STA   0,LASTP     ;GET LAST LIFO PRI
00565 026037        LDA   0,MDECS
00566 060177        INTEN
00567 002260        JMP   @RETRN
```

```
                    ;PUT IN AS LAST LIFO
00570 010757 PLIFO:  ISZ    LIFCC       ;UPDATE COUNT
00571 042634        STA    0,@ADECS
00572 101100        MOVL   0,0         ;C
00573 042634        STA    0,@ADECS
00574 020000        LDA    0,0         ;PC
00575 042634        STA    0,@ADECS
00576 046034        STA    1,@ADECS
00577 052034        STA    2,@ADECS
00600 056034        STA    3,@ADECS
00601 034255        LDA    3,DEVCO
00602 056034        STA    3,@ADECS
00603 034254        LDA    3,CRTMSK
00604 056034        STA    3,@ADECS
00605 034256        LDA    3,LIFOP
00606 054251        STA    3,LASTP
00607 056034        STA    3,@ADECS
00610 024335        LDA    1,M9
00611 014024 PINC:  DSZ    MINCS
00612 125400        INC    1,1
00613 125014        MOV#   1,1,SZR
00614 000775        JMP    PINC
00615 063677        SKPDN  77          ;CHECK FOR POWER FAILURE
00616 000530        JMP    TRCK        ;NOT A POWER FAIL
00617 060337        NIOP   37          ;YES, CLEAR EMB'S
00620 060336        NIOP   36
00621 060335        NIOP   35
00622 060334        NIOP   34          ;AND
00623 020405        LDA    0,ADRST
00624 024405        LDA    1,JMPID
00625 123000        ADD    1,0
00626 040000        STA    0,0         ;SET UP AUTO RESTART
00627 063077        HALT
                ;
00630 002265 ADRST: AARST
00631 002000 JMPID: 002000
00632 034440 CRTP:  LDA    3,AMLRT
00633 157000        ADD    2,3         ;R2 HAS INDEX TO C--S
00634 031400        LDA    2,0,3       ;R2 HAS C--S ADDRESS
00635 050353        STA    2,ASTMB
00636 021000        LDA    0,0,2       ;R0 HAS C--S 1ST WD
00637 101112        MOVL# 0,0,SZC     ;IS CRT STARTED?
00640 000407        JMP    GETAG       ;YES
00641 041001        STA    0,1,2       ;SET BUF CHNT = BUF STRT
00642 024346        LDA    1,FULL
00643 167000        ADD    3,1
00644 045000        STA    1,0,2       ;FLAG CRT STRTED
00645 176520        SUBZL  3,3
00646 055005        STA    3,5,2       ;SET TO LINE 1
00647 021001 GETAG: LDA    0,1,2
00650 040354        STA    0,BUFIN
00651 021002        LDA    0,2,2
00652 004435        JSR    SWAP
00653 040344        STA    0,CHCNT
00654 044345        STA    1,CHCNT+1
00655 021003        LDA    0,3,2
00656 004431        JSR    SWAP
00657 040346        STA    0,CHCNT+2
00660 044347        STA    1,CHCNT+3
00661 021004        LDA    0,4,2
00662 004425        JSR    SWAP
00663 040350        STA    0,CHCNT+4
00664 044351        STA    1,CHCNT+5
00665 021005        LDA    0,5,2
00666 004421        JSR    SWAP
00667 040352        STA    0,HLFPT
```

```
00670 044343          STA    1,LINCT
00671 062402          JMP    @HCRTH
      ;
00672 000674 AHCRT:   HCRTS
00673 003066 HCRTH:   CRTH
00674 000000 HCRTS:   0
00675 000075          C30S
00676 000103          C40S
00677 000111          C42S
00700 000117          C44S
00701 000125          C46S
00702 000133          C50S
00703 000141          C52S
00704 000147          C54S
      ;
00705 000000 SWAPR:   0
00706 000000 SWAPH:   0
      ;
00707 054776 SWAP:    STA    2,SWAPR        ;R0 = C1C2
00710 040776          STA    0,SWAPH
00711 024337          LDA    1,LHH
00712 123700          ANDS   1,0
00713 024773          LDA    1,SWAPH
00714 034341          LDA    3,C377
00715 167400          AND    3,1            ;R0=C1, R1=C2
00716 002767          JMP    @SWAPR
      ;
      ;
00717 006857 HOCRT:   fDVCD+2
00720 000776 HCLFS:   CRTF1-3
00721 000000 STLHD:   0
      ;
00722 024056 INTLV:   LDA    1,fDVCD+1
00723 125400          INC    1,1
00724 166414          SUB#   0,1,SZR
00725 000404          JMP    CRTIL
00726 014350          DSZ    HSUPR
00727 014356          DSZ    HSUBR
00730 002263          JMP    @CKINR
00731 024766 CRTIL:   LDA    1,HOCRT
00732 044022          STA    1,HINES
00733 152400          SUB    2,2
00734 026022 ILLP:    LDA    1,@HINES
00735 151400          INC    2,2
00736 151400          INC    2,2
00737 151400          INC    2,2
00740 125400          INC    1,1
00741 166414          SUB#   0,1,SZR
00742 000772          JMP    ILLP
00743 024755          LDA    1,HCLFS
00744 133000          ADD    1,2
00745 035000          LDA    3,0,2
00746 056753          STA    2,STLHD        ;ADDR OF CRTF
00747 175015          MOV#   3,3,SNR        ;ANYTHING TO DO?
00750 002203          JMP    @CKINR         ;NO
00751 025000          LDA    1,0,2          ;GET CHCNT TO SEND
00752 034331          LDA    3,M1
00753 137000          ADD    1,3
00754 055000          STA    3,0,2
00755 175015          MOV#   3,3,SNR        ;IF CNT=1, DONE
00756 000413          JMP    LSTIL
00757 025001 LSTLR:   LDA    1,1,2
00760 035002          LDA    3,2,2
00761 055001          STA    3,1,2
00762 030342          LDA    2,IUMSK
00763 034404          LDA    3,COUT
00764 137400          AND    2,3
00765 163000          ADD    3,0
00766 040101          STA    0,COUT
```

```
00767 065131 COUT:    DOAS   1,31
00770 002263          JMP    @CKINR
00771 126400 LSTIL:   SUB    1,1
00772 036727          LDA    2,SILAD
00773 045006          STA    1,0,2
00774 002263          JMP    @CKINR
              ;
              ;OPS CONSOLE PROC
              ;
00775 066510 OPCP:    DIAS   0,10
00776 040306          STA    0,CMESS
00777 020261          LDA    0,LINSK
01000 040254          STA    0,CMMSK
01001 000401          JMP    .+1              ;DOAS 0,77  62177
01002 020335          LDA    0,MSGFL
01003 101014          MOV#   0,0,SZR
01004 002263          JMP    @CKINR
01005 024253          LDA    1,MSGHD
01006 125112          MOVL#  1,1,SZC          ;MSG WAITING?
01007 002263          JMP    @CKINR           ;YES
01010 035440          LDA    2,NULL           ;NO, BUT
01011 147000          ADD    2,1
01012 044253          STA    1,MSGHD          ;NOW THERE IS
01013 002263          JMP    @CKINR
              ;
              ;EMP PROCESSOR
              ;
01014 020202 EMP:     LDA    0,LAMSK
01015 040204          STA    0,CMMSK
01016 062177          DOAS   0,77
01017 006000          JSR    @MEMBM
01020 060110          NIOS   10
01021 060277          INTDS
01022 002263          JMP    @CKINR
01023 002103 MEMBM:   EMBM
              ;
              ;TAPE INTERRUPT LEVEL
              ;
01024 020072 TPILV:   LDA    0,INPTR
01025 010205          STA    0,LIPUP
01026 060422          DIA    0,22
01027 074122          DIA    3,22
01030 116414          SUB#   0,3,SZR
01031 000775          JMP    .-3
01032 176400          SUB    3,3
01033 050400          STA    3,@MPBPT         ;ZERO 1ST BUF-FOR THE
01034 020261          LDA    0,LINSK
01035 040254          STA    0,CMMSK
01036 000401          JMP    .+1              ;DOAS 0,77  62177
01037 002263          JMP    @CKINR
01040 002326 APEPT:   BPT
              .EOT
              ;
              ;MASTER CONTROLLER
              ;
01041 162400 MASC:    SUB    0,0
01042 040203          STA    0,DEVCO
01043 040206          STA    0,LIPUP
01044 034430 CKMSG:   LDA    3,MMENU
01045 055020          STA    3,MSHWD
01046 037025 CKMSN:   LDA    2,EMINUS
01047 151400          MOV    2,2,SNR
01048 000400          JMP    CKCMS
01050 023000          LDA    0,0,2            ;GET CONTENTS OF MPBT-
01051 101014          MOV#   0,0,SZR          ;ANY BUFFS READY?
01052 006447          JSR    MEMB             ;YES
01053 000772          JMP    CKMSN            ;NO, GET NXT MPBT-
01054 030411 CKCMS:   LDA    2,MOMSK
```

```
01056 056107        STH     2,CHSGM
01057 024253        LDH     1,MSGWD
01060 133414        AND#    1,2,SZR    ;OPC MSG WTG?
01061 000476        JMP     MOPC       ;YES
01062 060277 MDONE: INTDS
01063 002451        JMP     @BKGD
        ;
01064 000404 BKGD:  BGRND
01065 000000 CHSGM: 0
01066 100000 MCMSK: 100000     ;OPC
01067 000000        0
01070 000000        0
01071 000000        0
01072 000000        0
01073 000000 MCBTR: 0
01074 001074 MMEND: MEND-1
01075 001102 MEND:  E37
01076 001106        E36
01077 001112        E35
01100 001116        E34
01101 000000        0
01102 000155 E37:   MCBT7
01103 000241        CTMB7
01104 100037        100037
01105 000037        000037
01106 000172 E36:   MCBT6
01107 000243        CTMB6
01110 100036        100036
01111 000036        000036
01112 000207 E35:   MCBT5
01113 000245        CTMB5
01114 100035        100035
01115 000035        000035
01116 000224 E34:   MCBT4
01117 000247        CTMB4
01120 100034        100034
01121 000034        000034
        ;
01122 023601 MEMB:  LDH     0,@1,2     ;CTMB- CONTENTS
01123 025002        LDH     1,2,2      ;IDLE MASK
01124 122414        SUB#    1,0,SZR    ;EMB= IDLE
01125 001100        JMP     0,3        ;NO
01126 025003        LDH     1,3,2      ;BUSY MASK
01127 060277        INTDS              ;****************
01130 047602        STH     1,@1,2     ;CTMB- TO BUSY
01131 027602        LDH     1,@0,2     ;OF 1 BUFHD
01132 046401        STH     1,MCBTR
01133 025001        LDH     1,1,2      ;CTMB- HDFP
01134 175400        INC     3,3        ;CTMB- + 1 HDOR
01135 175000        MOV2L   3,3
01136 175000        MOV2R   3,3
01137 044603        STH     1,@0,3     ;EP HD TO CTMB- + 1
        ;UPDATE MCBT-
01140 025000        LDH     1,0,2      ;HDOR OF MCBT-
01141 021155        LDH     0,NCRD
01142 041156        STH     0,NCNTR
01143 175400 MCLPP: INC     3,3
01144 021400        LDH     0,0,3      ;I+1
01145 041777        STH     0,-1,3     ;TO I
01146 014156        DSZ     MCNTR
01147 000774        JMP     MCLPP
01150 102400        SUB     0,0
01151 041400        STH     0,0,3
01152 020204        LDH     0,CHMSK
01153 002177        DDBS    0,77       ;*****************
01154 002717        JMP     @MCBTR
        ;
01155 000015 NCRD:  15
01156 000000 MCNTR: 0
        ;
```

```
01157 026109  NOPC:   LDA     0,OMESS
01160 002105          JMP     @ACMSG
01161 026701  KNOPC:  LDA     0,CMSGA
01162 024253          LDA     1,MSGWD
01163 106400          SUB     0,1
01164 044253          STA     1,MSGWD
01165 000673          JMP     MDONE
01166 001167  MCMSG:  CMSG
        .EOT
;
;CONSOLE MESSAGES
;
01167 024717  CMSG:   LDA     0,MACC
01170 044050          STA     0,MACC1
01171 026206  MNEXT:  LDA     1,@MCLE+1     ;GET CMND TYPE FOR
01172 101113          MOVR    0,2,SNR       ;ZERO?
01173 000404          JMP     KEYST         ;YES, NOT A CMND
01174 027000          LDA     1,0,2         ;NO, GET CMND ADDRESS
01175 132415          SUB#    0,1,SZR       ;MATCH?
01176 000772          JMP     MNEX1         ;NO, CHECK NEXT
01177 002401          JMP     @1,2          ;YES, GO TO ROUTINE
01200 044006  KEYST:  STA     0,TEOF
01201 020005          LDA     0,MIBUF
01202 040035          STA     0,MSUBF
01203 167400          SUBZL   0,0
01204 040010          STA     0,MSUFL
01205 002601          JMP     @MOPCR
;
01206 001234  MACC:   MCCE+1
01207 000000  MCC:    0
01210 001206          C1: TEOF
01211 001200          C2: SYSI
01212 001202          C3
01213 001206          C4
01214 001272          C5
01215 001276          C6
01216 001302          C7
01217 001311          C12
01220 001317          C13
01221 001322          C14
01222 001325          C15
01223 001330          C16
01224 001334          C17
01225 001340          C18
01226 001344          C19
01227 001350          C20
01230 001354          C21
01231 001360          C22
01232 001364          C23
01233 001367  MCLE:   C24
;
01234 001240  MCH4:   CH4
01235 001244  MCH5:   CH5
01236 001242  MCH6:   CH6
01237 001246  MCH7:   CH7
;
01240 060207  CH7:    207
01241 000057          57
01242 060056  CH6:    66
01243 000056          56
01244 060065  CH5:    65
01245 000055          55
01246 060264  CH4:    264
01247 000054          54
;
01250 000303  MCHC:   303
01251 000313  MCHD:   313
01252 000322  MCHK:   322
01253 000311  MCHI:   311
```

```
01254 000000  C1:   0
01255 001575       TEMP ;T
01256 000011  C2:  11 ;J
01257 001574       SYST
01260 001251       MCH5
01261 001252       MCH6
01262 000237  C3:  237 ;Z
01263 001573       SYST
01264 001251       MCH5
01265 001251       MCH5
01266 000201  C4:  201 ;A
01267 001421       RESTR
01270 000241       CTAB7
01271 001257       MCH7
01272 000202  C5:  202 ;B
01273 001421       RESTR
01274 000243       CTAB6
01275 001256       MCH6
01276 000003  C6:  3 ;C
01277 001421       RESTR
01300 000245       CTAB5
01301 001255       MCH5
01302 000204  C7:  204 ;D
01303 001421       RESTR
01304 000247       CTAB4
01305 001254       MCH4
                    ;
01306 001161 MOPCR: RMOPC
01307 001310 ATBUF: ITBUF
01310 000000 ITBUF: 0
01311 000000       0
01312 000213       213
01313 000212       212
                    ;
01314 000213  C12: 213 ;K
01315 001400       CLEAR
01316 001257       MCH7
01317 000014  C13: 14 ;L
01320 001400       CLEAR
01321 001256       MCH6
01322 000017  C14: 17 ;O
01323 001400       CLEAR
01324 001255       MCH5
01325 000220  C15: 220 ;P
01326 001400       CLEAR
01327 001254       MCH4
01330 000041  C16: 41 ;SHIFT 1
01331 001406       STMIS
01332 000273       RCCNT+3 ;E
01333 000365       365
01334 000042  C17: 42 ;2
01335 001406       STMIS
01336 000274       RCCNT+6 ;O
01337 000317       317
01340 000243  C18: 243 ;S
01341 001406       STMIS
01342 000206       RCCNT ;B
01343 000102       102
01344 000014  C19: 14 ;4
01345 001406       STMIS
01346 000267       RCCNT+1 ;C
01347 000363       363
01350 000210  C20: 210 ;5
01351 001406       STMIS
01352 000270       RCCNT+2 ;D
01353 000104       104
01354 000246  C21: 246 ;6
01355 001406       STMIS
```

```
01356 000272           RGCNT+4
01357 000197           167
01360 000047    C22:   47 ;7
01361 001460           STATS
01362 000273           RGCNT+5
01363 000115           115 ;H
01364 000056    C23:   56 ;8
01365 001441           STOT
01366 000324           324 ;T
01367 000201    C24:   201 ;9
01370 001466           STATS
01371 000275           RGCNT+7
01372 000322           322; R
                ;
                ;
01373 002713 SYSST:    JMP     @MUPCR
01374 002712 SYSI:     JMP     @MUPCR
                ;
01375 034711 TEOF:     LDA     3, MUPCR
01376 002401           JMP     0, +1
01377 003015           TAPEW
                ;
01400 035002 CLEAR:    LDA     3, 2, 2
01401 027400           LDA     1, 00, 3
01402 033401           LDA     2, 01, 3
01403 044705           STA     1, TTBUF
01404 024614           LDA     1, ACHL
01405 044761           STA     3, TTBUF+1
01406 024342           LDA     1, IOMSK
01407 020461           LDA     0, ECLRD
01410 123466           AND     1, 0
01411 143000           ADD     2, 0
01412 040461           STA     0, ECLRD
01413 060357 ECLRD:    NIOP    37
01414 024673           LDA     1, ATBUF
01415 044356           STA     1, MSGBF
01416 020672           LDA     0, TAPEP    ;4
01417 040355           STA     0, MSGFL    ;CHARACTERS
01420 002666           JMP     @MUPCR
                ;
01421 035002 RESTR:    LDA     3, 2, 2     ;A(CTAB)
01422 025400           LDA     1, 0, 3     ;C(CTAB)
01423 020125           LDA     0, EEMOT
01424 107400           AND     0, 1
01425 045400           STA     1, 0, 3
01426 035403           LDA     3, 3, 2
01427 027400           LDA     1, 00, 3
01430 044000           STA     1, TTBUF
01431 024621           LDA     1, ACHR
01432 044657           STA     1, TTBUF+1
01433 024654           LDA     1, ATBUF
01434 044356           STA     1, MSGBF
01435 020672           LDA     0, TAPEP
01436 040355           STA     0, MSGFL
01437 002647           JMP     @MUPCR
01440 000077 EEMOT:    77
                ;
01441 035002 STOT:     LDA     3, 2, 2
01442 045002           STA     3, STBUF
01443 024266           LDA     1, RGCNT
01444 030267           LDA     2, RGCNT+1
01445 133000           ADD     1, 2
01446 024270           LDA     1, RGCNT+2
01447 133000           ADD     1, 2
01450 024271           LDA     1, RGCNT+3
01451 133000           ADD     1, 2
01452 024272           LDA     1, RGCNT+4
01453 133000           ADD     1, 2
01454 024273           LDA     1, RGCNT+5
```

```
01455 153000           ADD    3,2
01456 024274           LDA    1,RGCNT+6
01457 147000           ADD    2,1
01460 004420           JSR    .BIND
01461 024462           LDA    1,MSTBF
01462 044356           STA    1,MSGBF
01463 024474           LDA    1,STBFC
01464 044355           STA    1,MSGFL
01465 002621           JMP    @HOPCR
                ;
01466 025003 STATS:    LDA    1,3,2
01467 044455           STA    1,STBUF
01470 027002           LDA    1,02,2
01471 004407           JSR    .BIND
01472 024451           LDA    1,MSTBF
01473 044356           STA    1,MSGBF
01474 024463           LDA    1,STBFC
01475 044355           STA    1,MSGFL
01476 002616           JMP    @HOPCR
                ;
01477 001546 ASBP2:    STBUF+2
                ;
01500 030777 .BIND:    LDA    2,ASBP2
01501 054423           STA    3,.ED03
01502 034435           LDA    3,.ED30
01503 054430           STA    3,.ED10
01504 020431           LDA    0,.ED21
01505 044427 .ED97:    STA    1,.ED11
01506 004432           JSR    .STUF
01507 024425           LDA    1,.ED11
01510 036423           LDA    3,@.ED10
01511 010422           ISZ    .ED10
01512 161005           MOV    3,0,SNR
01513 000407           JMP    .ED98
01514 020422           LDA    0,.ED22
01515 166422 .ED99:    SUBZ   3,1,SZC
01516 101401           INC    0,0,SKP
01517 167001           ADD    3,1,SKP
01520 000775           JMP    .ED99
01521 000764           JMP    .ED97
01522 004416 .ED98:    JSR    .STUF
01523 002401           JMP    @.ED03
01525 023420 .ED05:    23420  ;POWER OF TEN TBL IN OCTAL
01526 001750           1750
01527 000144           144
01530 000012           12
01531 000001           1
01532 000000           0
01533 000000 .ED10:    0
01534 000000 .ED11:    0
01535 000010 .ED21:    40
01536 000060 .ED22:    60
01537 001525 .ED30:    .ED05
                ;
01540 042000 .STUF:    STA    0,0,2
01541 151400           INC    2,2
01542 001400           JMP    0,3
                ;
01543 001544 MSTBF:    STBUF
01544 000000 STBUF:    0   ;T
01545 000275           275 ;=
01546 000000           0
01547 000000           0
01550 000000           0
01551 000000           0
01552 000000           0
01553 000000           0
01554 000000           0
01555 000215           215
```

```
01556 000212         212
01557 000013 STBFC:  13
             ;
             .EOT
             ;THIS MODULE, EMBM DRIVES THE EMBOSSERS
             ;
01560 054552 EMBM1:  STA    3,EMBR
             ;
01561 024553 CKCTB:  LDA    0,CCFLG     ;CRD CLR ON?
01562 161014         MOV#   0,0,SZR
01563 006451         JSR    @MD4E       ;YES
01564 024513         LDA    1,ECNTF     ;YES, ARE WE COUNTING
01565 125014         MOV#   1,1,SZR
01566 002435         JMP    @TCNT       ;YES
01567 020537         LDA    0,EZERO
01570 161015         MOV#   0,0,SNR
01571 006424         JSR    @GDAT
01572 024513         LDA    1,MODE      ;NO, WHICH MODE
01573 030557         LDA    2,MMDTB
01574 133000         ADD    1,2
01575 035000         LDA    3,0,2       ;GET ADDRESS OF MODE LOGIC
01576 001400         JMP    0,3
             ;GENERAL MODE LOGIC
01577 024537 EMOD1:  LDA    1,MODE1     ;MODE=1=CHAR AFT CHAR
01600 152520         SUBZL  2,2
01601 132415         SUB#   1,2,SNR
01602 000421         JMP    EMD11       ;PH=1, CHK K1
01603 000427         JMP    EMD12       ;PH=2, CHK K69, ST TIM
             ;
01604 024533 EMOD2:  LDA    1,MODE2     ;MODE=2=FUNC AFT CHAR
01605 152520         SUBZL  2,2
01606 132415         SUB#   1,2,SNR
01607 000434         JMP    EMD21       ;PH=1
01610 000453         JMP    EMD22
             ;
01611 000461 EMOD3:  JMP    EMD31       ;MODE=3=CH/FNC AFT FUNC
             ;
01612 006402 EMOD4:  JSR    @MD4E       ;MODE=4=CRD CLR
01613 002517         JMP    @EMBR
01614 002254 MMD4E:  MOD4E
             ;
             ;EXTERNALS
01615 001761 GDAT:   EGETD
01616 002132 TCNT:   ECNTL
01617 002135 TST:    EMBST
01620 002161 TK1:    K1TST
01621 002165 TK9:    K9TST
01622 002173 TK169:  K189T
             ;
             ;MODE PHASE LOGIC
01623 006774 EMD11:  JSR    @TST
01624 006774         JSR    @TK1
01625 020504         LDA    0,EOUTD     ;GET DATA
01626 006413         JSR    @OUTD       ;AND SEND IT
01627 024530         LDA    1,EK2
01630 044066         STA    1,MODE1     ;SET FOR MODE1,PHASE 2
01631 002501         JMP    @EMBR
             ;
01632 006765 EMD12:  JSR    @TST
01633 006766         JSR    @TK9
01634 020515         LDA    0,EK5
01635 040523         STA    0,ECNTR     ;INIT 50MS TIMER
01636 024511         LDA    1,EK3
01637 044475         STA    1,ECNTF     ;SET FOR NXT PH
01640 002472         JMP    @EMBR
             ;
01641 002175 OUTD:   DOUT
01642 002204 OUTF:   FOUT
             ;
```

```
01643 006754 END21:  JSR   @TST
01644 006734        JSR   @TK1
01645 026454        LDA   0,EOUTD
01646 024465        LDA   1,CCFLG
01647 125055        MOV#  1,1,SNR     ;IS CRD CLR ON?
01650 000407        JMP   SNDF        ;NO
01651 024470        LDA   1,PDMSK     ;YES, IS THIS FNC A PD?
01652 106415        SUB#  0,1,SNR
01653 002457        JMP   @EMBR       ;YES, WAIT TILL CRD CLR DONE
01654 024454        LDA   1,CRMSK     ;NO, IS IT A CR?
01655 106415        SUB#  0,1,SNR
01656 002454        JMP   @EMBR       ;YES, WAIT TILL CC DONE
01657 006763 SNDF:  JSR   @OUTF       ;SEND FUNC
01660 024477        LDA   1,EK2
01661 044456        STA   1,MODE2     ;NOTIFY PH-2
01662 002450        JMP   @EMBR
                    ;
01663 006734 END22: JSR   @TST
01664 006735        JSR   @TK9
01665 026464        LDA   0,EK5
01666 046472        STA   0,ECNTR     ;INIT 50 MS TIMER
01667 024466        LDA   1,EK3
01670 044437        STA   1,ECNTF     ;SET FOR NXT PH
01671 002441        JMP   @EMBR
                    ;
01672 006725 END31: JSR   @TST
01673 006727        JSR   @TK189
01674 026435        LDA   0,EOUTD
01675 024430        LDA   1,EMSK7
01676 107414        AND#  0,1,SZR     ;CHAR OR FUNC
01677 000405        JMP   FAFTF
01700 006741 CAFTF: JSR   @OUTD
01701 102400        SUB   0,0
01702 040443        STA   0,MD3LD     ;MODE 3 LAST DATA = CH
01703 000413        JMP   CFRET
01704 024430 FAFTF: LDA   1,CCFLG
01705 125055        MOV#  1,1,SNR     ;IS CRD CLR ON?
01706 000407        JMP   SNDF1       ;NO
01707 024432        LDA   1,PDMSK     ;YES
01710 106415        SUB#  0,1,SNR     ;IS THIS FNC A PD?
01711 002421        JMP   @EMBR       ;YES, WAIT TO SEND PD
01712 024416        LDA   1,CRMSK     ;NO, IS IT A CR?
01713 106415        SUB#  0,1,SNR
01714 002416        JMP   @EMBR       ;YES, WAIT TILL CC DONE
01715 006725 SNDF1: JSR   @OUTF
01716 102520        SUBZL 0,0
01717 040426        STA   0,MD3LD     ;MODE 3 LAST DATA = FN
01720 026431 CFRET: LDA   0,EK5
01721 046437        STA   0,ECNTR     ;INIT 50 MS CLOCK
01722 024425        LDA   1,EK3
01723 044404        STA   1,ECNTF     ;SET FOR NXT PH
01724 002406        JMP   @EMBR
                    ;
                    ;ERAM DATA
                    ;
01725 000200 EMSK7: 200            ;FUNC FLAG
01726 000000 EZERO: 0
01727 000000 ECNTF: 0
01730 000210 CRMSK: 210
                    ;
01731 000000 EOUTD: 0
01732 000000 EMSK:  0
01733 000000 EGETM: 0
01734 000000 CCFLG: 0
01735 000000 MODE:  0
01736 000000 MODE1: 0
01737 000000 MODE2: 0
01740 000000 MODE3: 0
01741 000202 PDMSK: 202
```

```
01742 000200  FNMSK: 200
01743 000001  CCMSK: 1
01744 000000  MODE4: 0
01745 000000  MD3LD: 0
01746 000000  DHFLG: 0
01747 000003  EK3:   3
01750 000004  EK4:   4
01751 000005  EK5:   5
              ;
01752 001752  AHDTB: HDTBL-1
01753 001577  HDTBL: EHOD1    ;CH AFT CH
01754 001604         EHOD2    ;FN AFT CH
01755 001611         EHOD3    ;AFT A FN
01756 001612         EHOD4    ;CRD CLR
01757 000002  EK2:   2
01760 000000  ECNTR: 0
              ;
              ;
              ;GET DATA FROM EMB BUFF
01761 054752  EGETD: STA    3,EGETR
01762 024744         LDA    1,EZERO
01763 125015         MOV#   1,1,SNR   ;IS IT 1ST ENT FOR THIS CH
01764 000421         JMP    ENT1      ;YES
01765 020761  NENT1: LDA    0,DHFLG   ;NO GET WHICH HALF OF HD
01766 101015         MOV#   0,0,SNR
01767 000434         JMP    GETD      ;GET DATA ON ZERO VAL
01770 102400         SUB    0,0
01771 040755         STA    0,DHFLG   ;SET UP TO GET NEW ON NXT
01772 024412         LDA    1,SAVWD
01773 030341         LDA    2,C377
01774 133405         AND    1,2,SNR
01775 000426         JMP    GETD
01776 006442         JSR    @TRAN     ;GETD IF NULL IN RT HLF
01777 050732  GOTD:  STA    2,EOUTD
02000 024742         LDA    1,FNMSK
02001 133415         AND#   1,2,SNR   ;CHAR OR FUNC
02002 000437         JMP    ECHAR
02003 000466         JMP    EFUNC
              ;
02004 000000  SAVWD: 0
              ;
02005 030372  ENT1:  LDA    2,CTAB+1
02006 050414         STA    2,WEBUF   ;1ST ENT, SAVE BUF ADDR
02007 052411         STA    2,@TBFAD
02010 006411         JSR    @TPWRT
02011 126520         SUBZL  1,1
02012 044714         STA    1,EZERO
02013 102400         SUB    0,0
02014 040732         STA    0,DHFLG
02015 040712         STA    0,ECNTR
02016 040727         STA    0,MD3LD
02017 000404         JMP    GETD
02020 003062  TBFAD: TALDR
02021 003067  TPWRT: TAPEM
02022 000000  WEBUF: 0
              ;
02023 030777  GETD:  LDA    2,WEBUF
02024 025000         LDA    1,0,2
02025 151400         INC    2,2
02026 050774         STA    2,WEBUF
02027 044755         STA    1,SAVWD
02030 020537         LDA    0,LHM
02031 107700         ANDS   0,1
02032 131000         MOV    1,2
02033 006405         JSR    @TRAN
02034 126520         SUBZL  1,1
02035 044711         STA    1,DHFLG
02036 000741         JMP    GOTD
              ;EMB RETURN
```

```
02037 062673 ERET:   JMP    @EMBR
02040 062711 TRAN:   TRANM
        ;
02041 024674 ECHAR:  LDA    1,MODE     ;NOW IN CHAR MODE, FIND
02042 152520         SUBZL  2,2        ;OUT WHAT PREV MODE WAS.
02043 132415         SUB#   1,2,SNR
02044 000405         JMP    PMOD1
02045 036712         LDA    2,EK2
02046 132415         SUB#   1,2,SNR
02047 000406         JMP    PMOD2
02050 000412         JMP    PMOD3
        ;
02051 102520 PMOD1:  SUBZL  0,0        ;CHAR AFT CHAR
02052 040663         STA    0,MODE
02053 040663         STA    0,MODE1
02054 062657         JMP    @EGETR
02055 020672 PMOD2:  LDA    0,EK3
02056 040657         STA    0,MODE     ;AFT A FUNC
02057 102520         SUBZL  0,0
02060 040660         STA    0,MODE3
02061 062652         JMP    @EGETR
02062 020663 PMOD3:  LDA    0,MDSLD     ;FIND OUT ABOUT LAST MODE
02063 101015         MOV#   0,0,SNR
02064 000765         JMP    PMOD1
02065 000770         JMP    PMOD2
             .EOT                      ;END OF EMBM1 TAPE 1
        ;EMBM1 -- TAPE NUMBER 2 .......
        ;
02066 001726 MEZER:  EZERO
02067 001733 MMODE:  MODE
02070 001736 MMOD1:  MODE1
        ;
02071 024644 EFUNC:  LDA    1,MODE     ;NOW IN FUNC MODE, FIND
02072 152520         SUBZL  2,2        ;OUT WHAT PREV WAS
02073 132415         SUB#   1,2,SNR
02074 000405         JMP    F1MOD
02075 036662         LDA    2,EK2
02076 132415         SUB#   1,2,SNR
02077 000406         JMP    PMOD2
02100 000406         JMP    F3MOD
        ;
02101 020656 F1MOD:  LDA    0,EK2      ;FN AFT CH
02102 040633         STA    0,MODE
02103 102520         SUBZL  0,0
02104 040633         STA    0,MODE2
02105 062626         JMP    @EGETR
02106 020637 F3MOD:  LDA    0,MDSLD
02107 101015         MOV#   0,0,SNR
02110 000771         JMP    F1MOD
02111 000744         JMP    PMOD2
        ;
        ;COUNTER LOGIC
02112 014646 ECHTL:  DSZ    ECNTR
02113 000724         JMP    ERET
02114 064502         JSR    DFCLR
02115 162400         SUB    0,0
02116 040611         STA    0,ECNTF
02117 020612         LDA    0,EOUTD
02120 024621         LDA    1,PDMSK
02121 106415         SUB#   0,1,SNR
02122 000403         JMP    PDLOG
02123 004536         JSR    EGETD      ;NOT A PD, GET NXT
02124 002407         JMP    @HCKCT
02125 020623 PDLOG:  LDA    0,EK4
02126 040667         STA    0,MODE
02127 102520         SUBZL  0,0
02130 040614         STA    0,MODE4
02131 002401         JMP    @H4CC
        ;
```

```
02132 001612 R4CC: ER004
02133 001561 ACKCT: CKCTB
02134 000014 EERCT: 14
                ;
                ;READ EMB STATUS
02135 060437 EMBST:  DIH    0,37
02136 101112         MOVL#  0,0,SZC    ;IS THERE AN ERROR?
02137 000410         JMP    EERSZ      ;YES
02140 024774         LDA    1,EERCT
02141 127000         ADD    1,1
02142 044416         STA    1,DIREC    ;RESET DIH ERROR CNTR
02143 024562         LDA    1,EMSK1
02144 107415         AND#   0,1,SNR
02145 000672         JMP    ERET       ;NO BITS ON
02146 001400         JMP    0,3
02147 014411 EERSZ:  DSZ    DIREC
02150 000667         JMP    ERET       ;WAIT 240 MS AFTER DWN/ER--
02151 024477         LDA    1,EMSK4
02152 107414         AND#   0,1,SZR    ;ERROR LITE ON
02153 000436         JMP    ELTE
02154 024475         LDA    1,EMSK5    ;NO, IS DN/SW ON
02155 107414         AND#   0,1,SZR
02156 000445         JMP    FIXDWN     ;YES
02157 001400         JMP    0,3        ;NO, RET-STAT IN R0
02160 000000 DIREC:  0
                ;TEST FOR K1 POS
02161 024466 K1TST:  LDA    1,EMSK3
02162 107415         AND#   0,1,SNR
02163 000654         JMP    ERET       ;NOT IN K1
02164 001400         JMP    0,3        ;K1 READY
                ;TEST FOR K89 POS
02165 024461 K9TST:  LDA    1,EMSK2
02166 107415         AND#   0,1,SNR
02167 000650         JMP    ERET       ;NOT IN K89
02170 001400         JMP    0,3        ;K89 RDY
                ;TEST FOR BOTH K1 & K89
02171 024461 K189T:  LDA    1,EMSK6
02172 106414         SUB#   0,1,SZR
02173 000644         JMP    ERET       ;NOT IN BOTH 1 & 89
02174 001400         JMP    0,3        ;RDY
                ;SEND DATA OUT
02175 060277 DOUT:   INTDS
02176 061037         DOA    0,37
02177 102520         SUBZL  0,0
02200 063037         DOC    0,37
02201 020254         LDA    0,CMASK
02202 062177         DOBS   0,77
02203 001400         JMP    0,3
                ;SEND FUNCTION OUT
02204 060277 FOUT:   INTDS
02205 024416         LDA    1,B8MSK
02206 123400         AND    1,0
02207 062037         DOB    0,37
02210 102520         SUBZL  0,0
02211 063037         DOC    0,37
02212 020254         LDA    0,CMASK
02213 062177         DOBS   0,77
02214 001400         JMP    0,3
                ;
02215 002037 RMD4:   ERET
                ;
                ;CLEAR ALL LINES
02216 060277 DFCLR:  INTDS
02217 060337         NIOP   37
02220 020254         LDA    0,CMASK
02221 062177         DOBS   0,77
02222 001400         JMP    0,3
                ;EMB DOWN SW ON
```

```
02223 024502 EDOWN:   LDA    0,EIDLE
02224 030425          LDA    2,EMSK5
02225 133000          ADD    1,2
02226 050371          STA    2,CTAB
02227 004767          JSR    DFCLR          ;******** NEW IN THIS ********
02230 000667          JMP    ERET
              ;EMB ERROR LIGHT ON
02231 126400 ELTE:    SUB    1,1
02232 046634          STA    1,@MEZER
02233 046474          STA    1,@CFLG
02234 004762          JSR    DFCLR          ;******** NEW IN THIS ********
02235 126520          SUBZL  1,1
02236 046631          STA    1,@MMODE
02237 046631          STA    1,@MMOD1
02240 024465          LDA    0,EIDLE
02241 030467          LDA    2,EMSK4
02242 133000          ADD    1,2
02243 050371          STA    2,CTAB
02244 002466          JMP    @EBRET
              ;
              ;MASKS
02245 000001 EMSK1:   1      ;BIT 15
02246 000001 EMSK2:   1      ;K89
02247 000002 EMSK3:   2      ;K1
02250 000400 EMSK4:   400    ;ERROR LIGHT
02251 002000 EMSK5:   2000   ;DOWN SWITCH
02252 000003 EMSK6:   3      ;K1 & K89
02253 000177 BMSK:    177    ;FUNC BIT OUT
              ;
              ;CARD CLEAR LOGIC
              ;
02254 026453 MOD4E:   LDA    1,@CFLG
02255 125014          MOV#   1,1,SZR
02256 000405          JMP    MOD4S
02257 030443          LDA    2,ADNBE
02260 021000          LDA    0,0,2
02261 101014          MOV#   0,0,SZR
02262 000474          JMP    CCDN           ;ANY BUF'S WAITING?
                                            ;YES, SKP CRD CLR
02263 026427 MOD4S:   LDA    1,@AMD4
02264 152526          SUBZL  2,2
02265 132415          SUB#   1,2,SNR
02266 000447          JMP    CCINT
02267 030424          LDA    2,EK2R
02270 132415          SUB#   1,2,SNR
02271 000454          JMP    SNDCC
02272 030422          LDA    2,EK3R
02273 132415          SUB#   1,2,SNR
02274 000456          JMP    TCCOF
02275 030421          LDA    2,EK4R
02276 132415          SUB#   1,2,SNR
02277 000446          JMP    SNDCC
02300 030417          LDA    2,EK5R
02301 132415          SUB#   1,2,SNR
02302 000450          JMP    TCCOF
02303 030412          LDA    2,EK6R
02304 132415          SUB#   1,2,SNR
02305 000440          JMP    SNDCC
02306 030425          LDA    2,EK7R
02307 132415          SUB#   1,2,SNR
02310 000442          JMP    TCCOF
02311 000414          JMP    CCDON
              ;
02312 001744 AMD4:    MODE4
02313 000002 EK2R:    2
02314 000003 EK3R:    3
02315 000006 EK6R:    6
02316 000004 EK4R:    4
```

```
02317 000005  EK5R:  5
02320 000000  WECHS: 0
02321 140037  EDONE: 140037
02322 000000  RUNBE: 0
02323 000005  W50:   5     ;50 MSEC
02324 000050  W400:  50    ;400 MSEC
02325 100037  EIDLE: 100037
02326 000000  BFT:   0
02327 001734  CFLG:  CCFLG
02330 001735  HMD:   MODE
02331 001726  HEZE:  EZERO
02332 002637  EBRET: ERET
02333 000007  EK7R:  7
02334 000010  EK8R:  10
              ;
              ;
02335 126520  CCINT: SUBZL  1,1
02336 046773         STA    1,@CFLG
02337 046753         STA    1,@HMD4
02340 006442         JSR    @LARRY
02341 004624         JSR    K9TST
02342 012750  WT400: ISZ    @HMD4
02343 030761         LDA    2,W400
02344 000431         JMP    SWAIT
02345 004432  SNDCC: JSR    WAITR
02346 004421         JSR    CCON
02347 012743         ISZ    @HMD4
02350 030753         LDA    2,W50
02351 000424         JMP    SWAIT
02352 004425  TCCOF: JSR    WAITR
02353 004417         JSR    CCOFF
02354 000766         JMP    WT400
02355 004422  CCDON: JSR    WAITR
02356 024735  CCDN:  LDA    1,EK2R
02357 046751         STA    1,@HMD
02360 126400         SUB    1,1
02361 046750         STA    1,@HEZE
02362 046745         STA    1,@CFLG
02363 004633         JSR    DFCLR
02364 024735         LDA    1,EDONE
02365 044371         STA    1,CTAB
02366 002744         JMP    @EBRET
              ;
02367 126520  CCON:  SUBZL  1,1
02370 066037         DOB    1,37
02371 001400         JMP    0,3
02372 102400  CCOFF: SUB    0,0
02373 062037         DOB    0,37
02374 001400         JMP    0,3
02375 050723  SWAIT: STA    2,WECHS
02376 002734         JMP    @EBRET
02377 014721  WAITR: DSZ    WECHS
02400 002732         JMP    @EBRET
02401 001400         JMP    0,3
              ;
02402 002135  LARRY: EMBST
              ;
              .EOT
              ;
              ;EMBOSSER DRIVER
              ;
02403 054456  EMBK:  STA    3,RERB
02404 020072         LDA    0,TMPEP
02405 040451         STA    0,ESKNT    ;CNT FOR 4 EMB'S
02406 030455         LDA    2,AEMBT    ;ADDR OF EMB DRV TBL
02407 050451         STA    2,CTBAD
02410 030450  EMBLP: LDA    2,CTBAD
02411 021000         LDA    0,0,2      ;1ST WD
02412 040563         STA    0,ADBT     ;ADDR OF NCBT-
```

```
02413 035001            LDA     3,1,2       ;2ND IS ADDR OF CTAB-.
02414 021400            LDA     0,0,3
02415 040371            STA     0,CTAB
02416 021401            LDA     0,1,3
02417 040372            STA     0,CTAB+1
02420 021003            LDA     0,3,2
02421 040476            STA     0,CEDC       ;DEV CD
02422 021004            LDA     0,4,2
02423 040434            STA     0,ARSTB      ;ADDR OF RESTART VBLS
02424 000411            JMP     CHKDO
02425 014431   CKMOR:   DSZ     ESKNT        ;MORE EMB'S
02426 000402            JMP     SETHE        ;YES
02427 002432            JMP     WREHB        ;NO
02430 030430   SETHE:   LDA     2,CTBAD      ;CURRENT DEV TBL ADDR
02431 034431            LDA     3,BADIC
02432 173000            ADD     3,2
02433 050425            STA     2,CTBAD
02434 000754            JMP     EMBLP
                    ;
02435 004505   CHKDO:   JSR     DCHSK
02436 020371            LDA     0,CTAB
02437 024376            LDA     1,EIDL9
02440 106415            SUB#    0,1,SNR      ;SKP IF NOT EIDLE
02441 000764            JMP     CKMOR
02442 024377            LDA     1,EBUS9
02443 106415            SUB#    0,1,SNR      ;SKP IF NOT BUSY
02444 000423            JMP     ESULG
02445 024373            LDA     1,EDSW9
02446 106414            SUB#    0,1,SZR      ;SKP IF DWN SW ON
02447 000756            JMP     CKMOR
02450 060437   ESTA9:   DIA     0,37
02451 024404            LDA     1,MYMSK
02452 107404            AND     0,1,SZR      ;SKP IF SW NOW OFF
02453 000752            JMP     CKMOR
02454 000415            JMP     ESULG
                    ;
02455 002000   MYMSK:   2000
02456 000000   ESKNT:   0
02457 000000   ARSTB:   0
02460 000000   CTBAD:   0
02461 000000   KEMB:    0
02462 000005   BADIC:   5
02463 006300   HEMBT:   EMBT
02464 002322   XMD:     MUMBE
02465 006344   MMPGT:   ARGVS
02466 000305   CHE:     305
02467 000311   CHI:     311
02470 001560   EMBRO:   EMBM1
                    ;
02471 036766   ESULG:   LDA     2,ARSTB
02472 020773            LDA     0,MMRGT
02473 004474            JSR     GETRS        ;GET RESTART VBLS
02474 020421            LDA     0,ADBT
02475 042767            STA     0,@XMD
02476 006772            JSR     @EMBRO
02477 030766            LDA     2,MMRGT
02500 020757            LDA     0,ARSTB
02501 004475            JSR     GETVB        ;PUT REST VBLS
02502 020371            LDA     0,CTAB
02503 034755            LDA     3,CTBAD
02504 043401            STA     0,01,3       ;UPDATE C(CTAB-)
02505 024375            LDA     1,EDON9
02506 106414            SUB#    0,1,SZR      ;SKP IF EMB- DONE
02507 000413            JMP     CKFUR
02510 004534            JSR     EDCCB        ;RESET PROPER CCB
02511 020376            LDA     0,EIDL9
02512 034746            LDA     3,CTBAD
02513 043401            STA     0,01,3
02514 000711            JMP     CKMOR
```

```
02515 000000  ADBT: 0
02516 000020  CON20: 20
02517 000000  CEDC: 0
02520 000000  DCCNT: 0
02521 006324  AMDCT: MDCT
              ;
02522 024374  CKFUR:  LDA    1,EERR9
02523 106414          SUB#   0,1,SZR   ;SKP IF ERROR
02524 000406          JMP    CKFR1
02525 034733          LDA    3,CTBAD
02526 031402          LDA    2,2,3
02527 024737          LDA    1,CHE
02530 004533          JSR    EBMSG
02531 000674          JMP    CKMUR
02532 024373  CKFR1:  LDA    1,EDSW9
02533 106414          SUB#   0,1,SZR   ;SKP IF DWN SW ON
02534 000671          JMP    CKMUR
02535 034723          LDA    3,CTBAD
02536 031402          LDA    2,2,3
02537 024730          LDA    1,CHI
02540 004523          JSR    EBMSG
02541 000664          JMP    CKMUR
              ;
              ;MASK IN DEVICE CODES
02542 024412  DCMSK:  LDA    1,GETDC
02543 036357          LDA    2,LMM
02544 147400          AND    2,1      ;MSK OUT DSP
02545 044467          STA    1,GETDC
02546 024413          LDA    1,PUTDC
02547 147400          AND    2,1
02550 044411          STA    1,PUTDC
02551 024745          LDA    1,CON20
02552 044746          STA    1,DCCNT
02553 036746          LDA    2,AMDCT
02554 023000  GETDC:  LDA    0,00,2
02555 024542          LDA    1,IOMSK
02556 123400          AND    1,0
02557 024740          LDA    1,CEDC
02560 123000          ADD    1,0
02561 043000  PUTDC:  STA    0,00,2
02562 010772          ISZ    GETDC
02563 010776          ISZ    PUTDC
02564 014734          DSZ    DCCNT
02565 000767          JMP    GETDC
02566 001400          JMP    0,3
              ;
              ;GET/PUT RESTORE VBLS
              ;
              ;   R2=GET ADDR
              ;   R0=PUT ADDR(MOV TO 3)
              ;
              ;GET RESTORE VBLS ENTRY
02567 054451  GETRS:  STA    3,GPRVR
02570 115000          MOV    0,3
02571 020424          LDA    0,GETDA
02572 024447          LDA    1,BOOTM
02573 107400          AND    0,1
02574 044421          STA    1,GETDA   ;GET FROM 2, PUT #3
02575 000407          JMP    SGPCT
              ;PUT RESTORE VBLS
02576 054442  GETVB:  STA    3,GPRVR
02577 115000          MOV    0,3
02600 020415          LDA    0,PUTDA
02601 024446          LDA    1,BOOTM
02602 107400          AND    0,1
02603 044413          STA    1,PUTDA
02604 024411  SGPCT:  LDA    1,GETDA
02605 020337          LDA    0,LMM
```

```
02606 107400          AND   0,1      ;MSK OUT DSP
02607 044406          STA   1,GETDA
02610 024406          LDA   1,PUTDA
02611 107400          AND   0,1
02612 044404          STA   1,PUTDA
02613 024763          LDA   1,CON20
02614 044704          STA   1,DCCNT
02615 023006 GETDA:   LDA   0,00,2   ;THESE INST
02616 043406 PUTDA:   STA   0,00,3   ;ARE MODIFIED
02617 010776          ISZ   GETDA
02620 010776          ISZ   PUTDA
02621 014677          DSZ   DCCNT
02622 000773          JMP   GETDA
02623 020772          LDA   0,GETDA  ;SET IND BIT BACK
02624 024415          LDA   1,BSOTM
02625 123400          AND   1,0
02626 024414          LDA   1,BSIN
02627 123000          ADD   1,0
02630 040765          STA   0,GETDA
02631 020763          LDA   0,PUTDA
02632 024407          LDA   1,BSOTM
02633 123400          AND   1,0
02634 024406          LDA   1,BSIN
02635 123000          ADD   1,0
02636 040760          STA   0,PUTDA
02637 002401          JMP   @GPRVK
                      ;
02640 000000  GPRVK:  0
02641 175777  BSOTM:  175777
02642 002000  BSIN:   002000
02643 000040  HCCB:   CC8
                      ;
                      ;CLEAR CCB ENTRY
02644 024372 EDCCB:   LDA   1,CTAB+1
02645 125120          MOVZL 1,1
02646 125220          MOVZR 1,1
02647 010774          LDA   2,HCCB
02650 021000 EDCCL:   LDA   0,0,2
02651 101120          MOVZL 0,0
02652 101220          MOVZR 0,0
02653 101015          MOV#  0,0,SNR
02654 000400          JMP   0,3
02655 106415          SUB#  0,1,SNR
02656 000403          JMP   EDCLB
02657 151400          INC   2,2
02660 000770          JMP   EDCCL
02661 041000 EDCLB:   STA   0,0,2
02662 001400          JMP   0,3
                      ;
                      ;EMBOSSER MESSAGES
                      ; R1 HAS ER CODE
                      ; R2 HAS EMB #
02663 020155 EBMSG:   LDA   0,MSGFL
02664 102414          SUB#  0,0,SZR
02665 000776          JMP   EBMSG
02666 060277          INTDS
02667 050415          STA   2,EMBUF+2
02670 044415          STA   1,EMBUF+3
02671 024407          LDA   1,EBCCT
02672 044355          STA   1,MSGFL
02673 024406          LDA   1,MEMBF
02674 044356          STA   1,MSGBF
02675 020254          LDA   0,CMASK
02676 062177          DOBS  0,77
02677 001400          JMP   0,3
02700 000007 EBCCT:   7
02701 002702 MEMBF:   EMBUF
02702 000215 EMBUF:   215
02703 000212          212
```

```
02704 000000          0
02705 000000          0
02706 000207          207
02707 000215          215
02710 000212          212
                ;
                .EOT
                ;
                ; TRANSFORM FROM 8 BIT ASCII TO 6 BIT EMB
                ;    ON INPUT, R2 HAS CHARACTER TO TRANSFORM
                ;    ON OUTPUT, R2 HAS TRANSFORMED CHARACTER.
                ;
02711 054416 TRANM:  STA    3,TRANR
02712 024416         LDA    1,ATTAB
02713 044026         STA    1,HINC7
02714 026026 LP1:    LDA    1,@HINC7
02715 125015         MOV#   1,1,SNR
02716 034341         LDA    3,C377
02717 167400         AND    3,1
02720 146414         SUB#   2,1,SZR    ;MATCH
02721 000773         JMP    LP1        ;NO
02722 014026         DSZ    HINC7      ;
02723 036026         LDA    3,@HINC7
02724 030337         LDA    2,LHM
02725 173760         ANDS   3,2
02726 002401         JMP    @TRANR
                ;
02727 000000 TRANR:0
                ;
                ;  ASCII TO EMB-CODE TRANSFORM TABLE
                ;    LFT HLF = EMB CODE(6)
                ;    RT  HLF = ASCII CODE(8)
                ;
02730 002730 ATTAB: TTAB-1
02731 110240 TTAB:   110240    ;BLANK
02732 104215         104215    ;CR
02733 101233         101233    ;FD
02734 102211         102211    ;TAB
02735 002305         002305    ;E
02736 001324         001324    ;T
02737 010301         010301    ;A
02740 005717         005717    ;O
02741 011316         011316    ;N
02742 005322         005322    ;R
02743 001711         001711    ;I
02744 015723         015723    ;S
02745 011710         011710    ;H
02746 013304         013304    ;D
02747 020314         020314    ;L
02750 031706         031706    ;F
02751 032303         032303    ;C
02752 012315         012315    ;M
02753 007325         007325    ;U
02754 031307         031307    ;G
02755 003331         003331    ;Y
02756 004320         004320    ;P
02757 006327         006327    ;W
02760 033302         033302    ;B
02761 016326         016326    ;V
02762 015313         015313    ;K
02763 030330         030330    ;X
02764 014312         014312    ;J
02765 040321         040321    ;Q
02766 017332         017332    ;Z
02767 024260         024260    ;0
02770 017661         017661    ;1
02771 026262         026262    ;2
```

```
02772 022203          022203    ;3
02773 025204          025204    ;4
02774 021205          021205    ;5
02775 023206          023206    ;6
02776 027207          027207    ;7
02777 021670          021670    ;8
03000 025671          025671    ;9
03001 003606          003606    ;.
03002 025607          025607    ;,
03003 013604          013604    ;;
03004 033647          033647    ;
03005 027655          027655    ;-
03006 000000          000000    ; END-OF-TABLE
                ;
                ;
                ;
                ;
                ;
                ; TAPE MONITOR
                ;
03007 054450  TAPEM:  STA       3,TAPER    ;WRITE ENTRY
03010 034455          LDA       3,TWRT
03011 054445  TCOM:   STA       3,TOPT     ;COMMON FROM HERE ON !
03012 175400          INC       3,3
03013 054450          STA       3,TSTAT
03014 000404          JMP       TAPEL
03015 054442  TAPEW:  STA       3,TAPER    ;EOF ENTRY
03016 034443          LDA       3,TUEOF
03017 000772          JMP       TCOM
03020 063522  TAPEL:  SKPBZ     22
03021 002436          JMP       @TAPER     ;JMP .-1 TO WAIT*********
03022 020441          LDA       0,TSTAT
03023 061022          DOA       0,22
03024 060422          DIA       0,22
03025 064422          DIA       1,22
03026 106414          SUB#      0,1,SZR
03027 000775          JMP       .-3
03030 101213          MOVR#     0,0,SNC
03031 000773          JMP       .-5
03032 024432          LDA       1,TEOTM
03033 107415          AND#      0,1,SNR
03034 000402          JMP       NPAST
03035 063077          HALT                 ; PAST END
03036 024422  NPAST:  LDA       1,WRMSK
03037 107414          AND#      0,1,SZR
03040 063077          HALT                 ; NO RING
03041 024415  RNGOK:  LDA       1,TOPT
03042 030417          LDA       2,TUEOF
03043 132415          SUB#      1,2,SNR
03044 000406          JMP       STCMD      ; YES
03045 020415          LDA       0,TADDR
03046 062022          DOB       0,22
03047 020406          LDA       0,TWDCT
03050 100400          NEG       0,0
03051 063022          DOC       0,22
03052 020411  STCMD:  LDA       0,TSTAT
03053 061122          DOAS      0,22
03054 002403          JMP       @TAPER
                ;
03055 000026  TWDCT:126
03056 000000  TOPT:0
03057 000000  TAPER:0
03060 000001  WRMSK:4
03061 000000  TUEOF:00
03062 000000  TADDR: 0
03063 000000  TSTAT:0
03064 001000  TEOTM:1000
03065 000050  TWRT:50
          .EOT
```

```
              ; THIS MODULE, CRTH CONTROLS THE I/O FOR THE CR
              ; AND VALIDATES ITS CONTENTS.
02466 036342  CRTH:   LDA    2,IOMSK    ;MSK IN DEVCD
03067 034255          LDA    3,DEVCD
03070 024404          LDA    1,CIN
03071 147400          AND    2,1
03072 167000          ADD    3,1
03073 044401          STA    1,CIN
03074 060416  CIN:    DIAS   0,40
03075 024541          LDA    1,C377
03076 123400          AND    1,0
03077 040537          STA    0,ICHAR
03100 175400          INC    3,3
03101 024533          LDA    1,CHOUT
03102 147400          AND    2,3
03103 16 000          ADD    3,1
03104 044530          STA    1,CHOUT
              ;CHECK TO SEE IF THIS CRT BUSY AT OUT LEVEL
03105 020255          LDA    0,DEVCD
03106 024531          LDA    1,CFADD
03107 044622          STA    1,AINC3
03110 152400          SUB    2,2
03111 026622  CFLP:   LDA    1,@AINC3
03112 151400          INC    2,2
03113 151400          INC    2,2
03114 151400          INC    2,2
03115 106414          SUB#   0,1,SZR
03116 000773          JMP    CFLP
03117 024521          LDA    1,CFLFA
03120 133000          ADD    1,2
03121 035000          LDA    3,0,2
03122 175014          MOV#   3,3,SZR   ;CRT WAITING OUT LVL?
03123 002263          JMP    @CKINR    ;YES
              ;GET AND DECODE INPUT CHAR
03124 020512          LDA    0,ICHAR
              ;ENTER TEST
03125 024516          LDA    1,CENTR
03126 106415          SUB#   0,1,SNR
03127 002524          JMP    @EXSCC
              ;ERASE SCREEN TEST
03130 024515          LDA    1,CERAS
03131 106415          SUB#   0,1,SNR
03132 002522          JMP    @ERAS
              ;CURSOR HOME TEST
03133 024511          LDA    1,HOME
03134 106415          SUB#   0,1,SNR
03135 002520          JMP    @CHOM
              ;CURSOR RIGHT TEST
03136 024510          LDA    1,CRIT
03137 106415          SUB#   0,1,SNR
03140 002516          JMP    @CRTE
              ;CURSOR LEFT(BACKSPACE) TEST
03141 024506          LDA    1,CLFT
03142 106415          SUB#   0,1,SNR
03143 002514          JMP    @BKSPC
              ;CURSOR UP TEST
03144 024505          LDA    1,CUP
03145 106415          SUB#   0,1,SNR
03146 002512          JMP    @CRSU
              ;CURSOR DOWN TEST
03147 024561          LDA    1,CDWN
03150 106415          SUB#   0,1,SNR
03151 002510          JMP    @CDWN
              ;CARRIAGE RETURN TEST
03152 024470          LDA    1,C215
03153 106415          SUB#   0,1,SNR
03154 002506          JMP    @CRETC
              ;TOO MANY CHAR TEST
```

```
03155 024473        LDA    1,ANOCH
03156 030343        LDA    2,LINCT
03157 147000        ADD    2,1
03160 044561        STA    1,ACMAX
03161 030556        LDA    3,@ACMAX
03162 024336        LDA    1,ACHCT
03163 133000        ADD    1,2
03164 025000        LDA    1,0,2
03165 125400        INC    1,1
03166 136405        SUB    1,3,SNR
03167 002263        JMP    @CKINR
           ;LINE NUMBER 1 TEST
03170 024343        LDA    1,LINCT
03171 125235        MOVZR# 1,1,SNR
03172 006471        JSR    @CHKN
           ;BAD (UNEMBOSSABLE) CHAR TEST
03173 006471        JSR    @CKBD
           ;CHARACTER OK, UPDATE & OUTPUT
03174 030343        LDA    2,LINCT
03175 024336        LDA    1,ACHCT
03176 133000        ADD    1,2
03177 025000        LDA    1,0,2
03200 125400        INC    1,1
03201 045000        STA    1,0,2
03202 006463        JSR    @PUTD
           ;RETURN FOR ANOTHER INTERRUPT
03203 034353 CDONE: LDA    3,HSTAB
03204 175120        MOVZL  3,3
03205 175220        MOVZR  3,3
03206 030354        LDA    2,BUFIN
03207 051401        STA    2,1,3
03210 024344        LDA    1,CHCNT
03211 125300        MOVS   1,1
03212 030345        LDA    2,CHCNT+1
03213 133000        ADD    1,2
03214 051402        STA    2,2,3
03215 024346        LDA    1,CHCNT+2
03216 125300        MOVS   1,1
03217 030347        LDA    2,CHCNT+3
03220 133000        ADD    1,2
03221 051403        STA    2,3,3
03222 024350        LDA    1,CHCNT+4
03223 125300        MOVS   1,1
03224 030351        LDA    2,CHCNT+5
03225 133000        ADD    1,2
03226 051404        STA    2,4,3
03227 024352        LDA    1,HLFPT
03230 125300        MOVS   1,1
03231 030343        LDA    2,LINCT
03232 133000        ADD    1,2
03233 051405        STA    2,5,3
03234 061114 CHOUT: DOAS   0,41
03235 002263        JMP    @CKINR
           ;
           ;CRTM DATA
           ;
03236 000000 ICHAR: 0
03237 000000 CFAGD: TDVCD+2
03240 000276 CFLFM: CRTF1-3
03241 000000 ACMAX: 0
03242 000215 C215:  215
03243 000233 CEMTR: 233
03244 000210 HOME:  210
03245 000214 CERAS: 214
03246 000231 CRIT:  231
03247 000232 CLFT:  232
03250 000235 CDWN:  235
03251 000234 CUP:   234
03252 003302 ANOCH: NOCH-1
```

```
03253 044016 EXSCC:  EXSC
03254 004135 ERAS:   ERASE
03255 003513 CHUM:   CHUME
03256 003631 CRTE:   CRITE
03257 003523 BKSPC:  BKSP
03260 003676 CRSU:   CRSUP
03261 003765 CDWNC:  CDOWN
03262 003314 CRETC:  CRET
03263 003267 CHKN:   CHKNN
03264 003404 CKBD:   CKBRD
03265 003414 PUTD:   PUT
03266 003203 CDON:   CDONE
        ;
        ;
        ;CHECK FOR NUM IN LINE 1
03267 024412 CHKNN:  LDA    1,NCNT
03270 044412         STA    1,TNCNT
03271 024407         LDA    1,NUMTB
03272 125406 NXTNU:  INC    1,1
03273 106415         SUB#   0,1,SNR
03274 002263         JMP    @CKINR
03275 014405         DSZ    TNCNT
03276 000774         JMP    NXTNU
03277 001400         JMP    0,3
03300 000257 NUMTB:  257
03301 000012 NCNT:   12
03302 000000 TNCNT:  0
        ;
03303 000025 NUCH.   25
03304 000035         35
03305 000035         35
03306 000035         35
03307 000025         25
03310 000025         25
03311 000233 CHESC:  233
03312 000017 K17:    17
03313 000013 K13:    13
        ;
        ;CARRIAGE RETURN
        ;
03314 024343 CRET:   LDA    1,LINCT
03315 030461         LDA    2,FIVE
03316 132415         SUB#   1,2,SNR
03317 024772         LDA    0,CHESC
03320 006745         JSR    @PUTD
03321 030353         LDA    2,ASTRB
03322 030000         LDA    3,0,2
03323 175120         MOVZL  3,3
03324 175220         MOVZR  3,3
03325 024765         LDA    0,K17
03326 024343         LDA    1,LINCT
03327 030456         LDA    2,SIX
03330 132415         SUB#   1,2,SNR
03331 002724         JMP    @CNUM
03332 152320         SUBZL  2,2
03333 132415         SUB#   1,2,SNR
03334 000416         JMP    LINE1
03335 151400         INC    2,2
03336 132415         SUB#   1,2,SNR
03337 000412         JMP    LINE2
03340 151400         INC    2,2
03341 132415         SUB#   1,2,SNR
03342 000406         JMP    LINES
03343 151400         INC    2,2
03344 132415         SUB#   1,2,SNR
03345 000402         JMP    LINE4
03346 117000 LINE5:  ADD    0,3
03347 117000 LINE4:  ADD    0,3
03350 117000 LINE3:  ADD    0,3
```

```
03351 117000 LINE2:   ADD    0,3
03352 020741 LINE1:   LDA    0,K13
03353 117000          ADD    0,3
03354 054354          STA    3,BUFIN
03355 125400          INC    1,1
03356 044343          STA    1,LINCT
03357 030336          LDA    2,HCHCT
03360 133000          ADD    1,2
03361 126400          SUB    1,1
03362 045000          STA    1,0,2
03363 044352          STA    1,HLFPT
03364 006411          JSR    @RSETC
03365 024414          LDA    1,CRD
03366 045000          STA    1,0,2
03367 024413          LDA    1,CRD+1
03370 045001          STA    1,1,2
03371 024412          LDA    1,CRD+2
03372 045002          STA    1,2,2
03373 020405          LDA    0,CRSYM
03374 002672          JMP    @CDON
03375 003351 RSETC:   SETCL
03376 000005 FIVE:    5
03377 000006 SIX:     6
03400 000336 CRSYM:   336
03401 000003 CRD:     3
03402 000215          215
03403 000235          235
                      ;
                      ;
                      ;CHECK FOR BAD CHARACTER
03404 030445 CKBAD:   LDA    2,BADTB
03405 025000          LDA    1,0,2
03406 125015          MOV#   1,1,SNR
03407 001400          JMP    0,3
03410 106415          SUB#   0,1,SNR
03411 002263          JMP    @CKINK
03412 151400          INC    2,2
03413 000772          JMP    CKBAD+1
                      ;PUT DATA
03414 030352 PUT:     LDA    2,HLFPT
03415 151015          MOV#   2,2,SZR
03416 000415          JMP    PUT2
03417 030354          LDA    2,BUFIN
03420 025000          LDA    1,0,2         ;GET BUFIN WD
03421 030241          LDA    2,C377
03422 147400          AND    2,1
03423 101300          MOVS   0,0
03424 123000          ADD    1,0
03425 030354          LDA    2,BUFIN
03426 041000          STA    0,0,2         ;NEW C1, OLD C2
03427 152520          SUBZL  2,2
03430 050352          STA    2,HLFPT
03431 101300          MOVS   0,0
03432 001400          JMP    0,3
03433 152400 PUT2:    SUB    2,2
03434 050352          STA    2,HLFPT
03435 030354          LDA    2,BUFIN
03436 025000          LDA    1,0,2
03437 030337          LDA    2,LHM
03440 147400          AND    2,1
03441 030341          LDA    2,C377
03442 143400          AND    2,0
03443 123000          ADD    1,0
03444 030354          LDA    2,BUFIN
03445 041000          STA    0,0,2         ;OLD C1, NEW C2
03446 151400          INC    2,2
03447 050354          STA    2,BUFIN
03450 001400          JMP    0,3
                      ;
                      ;
                      ;
```

```
                    ; TABLE OF BAD CHAR
03451  003452  BDTB:   BADTB
03452  000237  BADTB:  237
03453  000241          241
03454  000242          242
03455  000243          243
03456  000244          244
03457  000245          245
03460  000246          246
03461  000250          250
03462  000251          251
03463  000252          252
03464  000253          253
03465  000272          272
03466  000273          273
03467  000274          274
03470  000275          275
03471  000276          276
03472  000277          277
03473  000300          300
03474  000333          333
03475  000334          334
03476  000335          335
03477  000336          336
03500  000204          204
03501  000205          205
03502  000206          206
03503  000207          207
03504  000212          212
03505  000375          375
03506  000337          337
03507  000377          377
03510  000217          217
03511  000374          374
03512  000000          0
                    ;
                    ; CURSOR HOME
                    ;
03513  126520  CHOME:  SUBZL   1,1
03514  044343          STA     1,LINCT
03515  126400          SUB     1,1
03516  044344          STA     1,CHCNT
03517  044352          STA     1,HLPPT
03520  030353          LDA     2,ASTHM
03521  025000          LDA     1,0,2
03522  044354          STA     1,BUFIN
03523  020537          LDA     0,CHOMC
03524  002535          JMP     @CDON1
                    ;
                    ; BACKSPACE
                    ;
03525  036343  BKSP:   LDA     2,LINCT
03526  024336          LDA     1,ACHCT
03527  133000          ADD     1,2
03530  025000          LDA     1,0,2
03531  125014          MOV#    1,1,SZR     ; IS CHCNT > 0
03532  000402          JMP     NCH1        ; YES
03533  002263          JMP     @CKINR
03534  034331  NCH1:   LDA     3,M1
03535  167000          ADD     3,1         ; DEC CH CNT
03536  045000          STA     1,0,2       ; AND STORE
03537  024352          LDA     1,HLPPT
03540  125014          MOV#    1,1,SZR
03541  000405          JMP     BCH2
03542  014354          DSZ     BUFIN
03543  126520          SUBZL   1,1
03544  044352          STA     1,HLPPT
03545  002514          JMP     @CDON1
03546  126400  BCH2:   SUB     1,1
```

```
03547 044352            STA     1,HLFPT
03550 002511            JMP     @CCON1
                ;
                ;
03551 054447   SETCL:    STA     3,STCLR
03552 036255            LDA     2,DEVCD
03553 034060            LDA     3,TDVCD+3
03554 156415            SUB#    2,3,SNR
03555 000425            JMP     SET1
03556 034061            LDA     3,TDVCD+4
03557 156415            SUB#    2,3,SNR
03560 000424            JMP     SET2
03561 034062            LDA     3,TDVCD+5
03562 156415            SUB#    2,3,SNR
03563 000423            JMP     SET3
03564 034063            LDA     3,TDVCD+6
03565 156415            SUB#    2,3,SNR
03566 000422            JMP     SET4
03567 034064            LDA     3,TDVCD+7
03570 156415            SUB#    2,3,SNR
03571 000421            JMP     SET5
03572 034065            LDA     3,TDVCD+10
03573 156415            SUB#    2,3,SNR
03574 000420            JMP     SET6
03575 034066            LDA     3,TDVCD+11
03576 156415            SUB#    2,3,SNR
03577 000417            JMP     SET7
03600 036430            LDA     2,ACRT8
03601 002417            JMP     @STCLR
03602 036417   SET1:    LDA     2,ACRT1
03603 002415            JMP     @STCLR
03604 036416   SET2:    LDA     2,ACRT2
03605 002413            JMP     @STCLR
03606 036415   SET3:    LDA     2,ACRT3
03607 002411            JMP     @STCLR
03610 036414   SET4:    LDA     2,ACRT4
03611 002407            JMP     @STCLR
03612 036413   SET5:    LDA     2,ACRT5
03613 002405            JMP     @STCLR
03614 036412   SET6:    LDA     2,ACRT6
03615 002403            JMP     @STCLR
03616 036411   SET7:    LDA     2,ACRT7
03617 002401            JMP     @STCLR
03620 000000   STCLR:   0
03621 000301   ACRT1:   CRTF1
03622 000304   ACRT2:   CRTF2
03623 000307   ACRT3:   CRTF3
03624 000312   ACRT4:   CRTF4
03625 000315   ACRT5:   CRTF5
03626 000320   ACRT6:   CRTF6
03627 000323   ACRT7:   CRTF7
03630 000326   ACRT8:   CRTF8
                ;
                ;END OF TAPE 1 OF CRTH.............
                ;
                .EOT
                ;
                ;CRTH -- TAPE 2.............
                ;
                ;CURSOR RIGHT
                ;
03631 032427   CRITE:   LDA     2,@NOCH1
03632 024343            LDA     1,LINCT
03633 133000            ADD     1,2
03634 035000            LDA     3,0,2
03635 036336            LDA     2,HCRCT
03636 133000            ADD     1,2
03637 025000            LDA     1,0,2
03640 125400            INC     1,1
```

```
03641  126415            SUB#   1,3,SNR       ;NEW CHCNT = CHMX
03642  002263            JMP    @CKINR        ;YES
03643  045000            STA    1,0,2
03644  024352            LDA    1,HLFPT
03645  125014            MOV#   1,1,SZR
03646  000404            JMP    CRC2
03647  125520            SUBZL  1,1
03650  044352            STA    1,HLFPT
03651  002410            JMP    @CDON1
03652  126400  CRC2:     SUB    1,1
03653  044352            STA    1,HLFPT
03654  024354            LDA    1,BUFIN
03655  125400            INC    1,1
03656  044354            STA    1,BUFIN
03657  002402            JMP    @CDON1
                         ;
03660  003252  NOCH1:    ANUCH
03661  003203  CDON1:    CDONE
03662  000210  CHUMC:    210
03663  000006  CON6:     6
03664  000000  OCHCT:    0
03665  000000  OUTCH:    0
                         ;
                         ;
                         ;CURSOR UP
                         ;
03666  000005  CCON5:    5
03667  000024  SLMAX:    24
                         ;
03670  004512  CRSUP:    JSR    GLCCC         ;R2=LC, R1=CHC
03671  176520            SUBZL  3,3
03672  172415            SUB#   3,2,SNR       ;LINE 1
03673  002263            JMP    @CKINR        ;YES
03674  175400            INC    3,3
03675  172414            SUB#   3,2,SZR       ;LINE 2
03676  000405            JMP    DECLC         ;NO
03677  034770            LDA    3,SLMAX       ;YES CHK IF CHC IS
03700  166033            ADCZ#  3,1,SNC       ;>CHMX
03701  000402            JMP    DECLC         ;NO
03702  002263            JMP    @CKINR
03703  014343  DECLC:    DSZ    LINCT         ;ALL OK, DEC LINCT
03704  000417            JMP    COKM
                         ;
                         ;CURSOR DOWN
                         ;
03705  004475  CDOWN:    JSR    GLCCC         ;R2=LC, R1=CH C
03706  034755            LDA    3,CON6
03707  172415            SUB#   3,2,SNR       ;LINE 6?
03710  002263            JMP    @CKINR        ;YES
03711  034755            LDA    3,CCON5
03712  172414            SUB#   3,2,SZR       ;LINE 5?
03713  000405            JMP    INCLC         ;NO
03714  034753            LDA    3,SLMAX
03715  166033            ADCZ#  3,1,SNC       ;CH C > CHMX?
03716  000402            JMP    INCLC         ;NO
03717  002263            JMP    @CKINR
03720  151400  INCLC:    INC    2,2
03721  050343            STA    2,LINCT       ;ALL OK, INC LC
03722  000401            JMP    COKM
                         ;
03723  040742  COKM:     STA    0,OUTCH
03724  030343            LDA    2,LINCT
03725  020336            LDA    0,HCHCT
03726  113000            ADD    0,2
03727  045000            STA    1,0,2
03730  044442            STA    1,SVCHC
03731  030353            LDA    2,ASTAB
03732  035000            LDA    3,0,2
03733  024343            LDA    1,LINCT
```

```
03734 026437           LDA    0,DC17
03735 036446           LDA    2,DC6
03736 132415           SUB#   1,2,SNR
03737 000416           JMP    IBLE
03740 036436           LDA    2,DC5
03741 132415           SUB#   1,2,SNR
03742 000414           JMP.   IBL5
03743 036434           LDA    2,DC4
03744 132415           SUB#   1,2,SNR
03745 000412           JMP    IBL4
03746 036432           LDA    2,DC3
03747 132415           SUB#   1,2,SNR
03750 000410           JMP    IBL3
03751 036430           LDA    2,DC2
03752 132415           SUB#   1,2,SNR
03753 000406           JMP    IBL2
03754 000407           JMP    IBL1
03755 117000   IBLE:   ADD    0,3         ;BSTRT+17
03756 117000   IBL5:   ADD    0,3         ;+17
03757 117000   IBL4:   ADD    0,3         ;+17
03760 117000   IBL3:   ADD    0,3         ;+17
03761 026413   IBL2:   LDA    0,DC13
03762 117000           ADD    0,3         ;+13
03763 020407   IBL1:   LDA    0,SVCHC
03764 101222           MOVZR  0,0,SZC     ;DIV BY 2
03765 000401           JMP    .+1         ;INC 0,0 101400(ADD 1 IF ODD)
03766 117000           ADD    0,3         ;+0+CHCNT
03767 054354           STA    3,BUFIN
03770 020675           LDA    0,OUTCH
03771 002670           JMP    @CDON1
                   ;
03772 000000   SVCHC:  0
03773 000017   DC17:   17
03774 000013   DC13:   13
03775 000006   DC6:    6
03776 000005   DC5:    5
03777 000004   DC4:    4
04000 000003   DC3:    3
04001 000002   DC2:    2
                   ;
                   ;GET LINECT AND CH CNT
                   ;
04002 036343   GLCCC:  LDA    2,LINCT
04003 024326           LDA    1,HCHCT
04004 132400           ADD    1,2
04005 020000           LDA    0,0,2       ;CHCNT
04006 020343           LDA    2,LINCT
04007 001400           JMP    0,3
                   ;
                   ;ENTER
                   ;
04010 024066   EXSC:   LDA    1,HCBFI
04011 044020           STA    1,HINC1
04012 025020   NXTBF:  LDA    1,@HINC1
04013 125015           MOV#   1,1,SNR
04014 002263           JMP    @LNINR
04015 125112           MOVL#  1,1,SZC
04016 000774           JMP    NXTBF
04017 036346           LDA    2,NULL
04020 133000           ADD    1,2
04021 014020           DSZ    HINC1
04022 052020           STA    2,@HINC1
04023 036353           LDA    2,HSTAB
04024 021000           LDA    0,0,2
04025 101120           MOVZL  0,0
04026 101220           MOVZR  0,0
04027 044470           STA    1,SHVBF     ;R1 HAS 'TO', R0 HAS 'FROM'
04030 036331           LDA    2,M1
04031 143000           ADD    2,0
```

```
04032 147000           ADD     2,1
04033 046026           STA     0,HINC1         ;FROM
04034 044023           STA     1,HINC4         ;TO
04035 002401           JMP     @PAKD
04036 004171  PAKD:    PAK
                ;NOTIFY PROPER NCBT-
04037 020255  PAKK:    LDA     0,DEVCD
04040 024453           LDA     1,C42
04041 122433           SUBZ#   1,0,SNC
04042 000415           JMP     CE7
04043 024451           LDA     1,C46
04044 122433           SUBZ#   1,0,SNC
04045 000410           JMP     CE6
04046 024447           LDA     1,C52
04047 122433           SUBZ#   1,0,SNC
04050 000403           JMP     CE5
04051 020452           LDA     0,ANCB4
04052 000406           JMP     SETNC
04053 020447  CE5:     LDA     0,ANCB5
04054 000404           JMP     SETNC
04055 020444  CE6:     LDA     0,ANCB6
04056 000402           JMP     SETNC
04057 020441  CE7:     LDA     0,ANCB7
04060 046020  SETNC:   STA     0,HINC1
04061 022020  STNCL:   LDA     0,@HINC1
04062 101014           MOVO    0,0,SZR
04063 000776           JMP     STNCL
04064 014020           DSZ     HINC1
04065 020412           LDA     0,SAVBF
04066 042020           STA     0,@HINC1        ;PUT BUFR IN NCBT- SLOT
04067 126400           SUB     1,1
04070 044344           STA     1,CHCNT
04071 044352           STA     1,HLFPT
04072 126520           SUBZL   1,1
04073 044343           STA     1,LINCT
04074 030303           LDA     2,ASTRB
04075 151120           MOVZL   2,2
04076 151220           MOVZR   2,2
04077 025400           LDA     1,0,2
04100 045001           STA     1,1,2
04101 044354           STA     1,BUFIN
04102 006432           JSR     @CLSET
04103 024424           LDA     1,ESCD
04104 045000           STA     1,0,2
04105 024423           LDA     1,ESCD+1
04106 045001           STA     1,1,2
04107 024422           LDA     1,ESCD+2
04110 045002           STA     1,2,2
04111 022421           LDA     0,@HUMEC
04112 002421           JMP     @CDON2
                ;
04113 000042  C42:     42
04114 000046  C46:     46
04115 000052  C52:     52
04116 000037  ACBFL:   CCB-1
04117 000000  SAVBF:   0
04120 000154  ANCB7:   NCBT7-1
04121 000171  ANCB6:   NCBT6-1
04122 000206  ANCB5:   NCBT5-1
04123 000223  ANCB4:   NCBT4-1
04124 000233  ESCCH:   233
04125 000037  STBLK:   37
04126 000215  CHCR:    215
04127 000003  ESCD:    3
04130 000037           37
04131 000215           215
04132 003244  HUMEC:   HUME
04133 003203  CDON2:   CDONE
04134 003551  CLSET:   SETCL
```

```
; ERASE SCREEN
;
04135 034353 ERASE:  LDA   3,ASTAB
04136 025400         LDA   1,0,3
04137 125120         MOVZL 1,1
04140 125220         MOVZR 1,1
04141 045400         STA   1,0,3
04142 044354         STA   1,BUFIN
04143 126400         SUB   1,1
04144 044344         STA   1,CHCNT
04145 044345         STA   1,CHCNT+1
04146 044346         STA   1,CHCNT+2
04147 044347         STA   1,CHCNT+3
04150 044350         STA   1,CHCNT+4
04151 044351         STA   1,CHCNT+5
04152 044352         STA   1,HLFPT
04153 126520         SUBZL 1,1
04154 044343         STA   1,LINCT
04155 031400         LDA   2,0,3
04156 024411         LDA   1,CRNL
04157 045600         STA   1,0,2
04160 045013         STA   1,13,2
04161 045032         STA   1,32,2
04162 045051         STA   1,51,2
04163 045107         STA   1,107,2
04164 024404         LDA   1,ESCNL
04165 045076         STA   1,76,2
04166 002745         JMP   @CDONZ
04167 106400 CRNL:   106400
04170 115400 ESCNL:  115400
;
04171 126400 PAK:    SUB   1,1
04172 044155         STA   1,NOCR
04173 040435         STA   0,SAVBA
04174 022020 PAKL:   LDA   0,@AINC1
04175 126400         SUB   1,1
04176 044425         STA   1,PTHLF
04177 024337         LDA   1,LMM
04200 107400         AND   0,1
04201 036425 CKLOP:  LDA   2,CARG
04202 132415         SUB#  1,2,SNR
04203 000426         JMP   CRBT
04204 036421         LDA   2,ESCA
04205 132415         SUB#  1,2,SNR
04206 000413         JMP   ESCBT
04207 024414         LDA   1,PTHLF
04210 125014         MOV#  1,1,SZR
04211 000406         JMP   STCHA
04212 024341         LDA   1,C377
04213 107400         AND   0,1
04214 152520         SUBZL 2,2
04215 050406         STA   2,PTHLF
04216 000763         JMP   CKLOP
04217 042023 STCHA:  STA   0,@AINC4
04220 000754         JMP   PAKL
04221 042023 ESCBT:  STA   0,@AINC4
04222 002404         JMP   @APAKR
;
04223 000000 PTHLF:  0
04224 000215 CARG:   215
04225 000233 ESCA:   233
04226 004037 APAKR:  PAKR
04227 000000 NOCR:   0
04230 000000 SAVBA:  0
;
04231 010776 CRBT:   ISZ   NOCR
04232 176520         SUBZL 3,3
04233 024774         LDA   1,NOCR
```

```
04234 136415            SUB#    1,3,SNR
04235 000410            JMP     CRBT1
04236 175400            INC     3,3
04237 136415            SUB#    1,3,SNR
04240 000410            JMP     CRBT2
04241 175400            INC     3,3
04242 136415            SUB#    1,3,SNR
04243 000432            JMP     CRBT3
04244 000434            JMP     CRBT4
                    ;
04245 004442    CRBT1:  JSR     LDR0
04246 034451            LDA     3,L1INC
04247 000433            JMP     NXTLN
04250 004466    CRBT2:  JSR     PTAB
04251 030455            LDA     2,SAVRT
04252 024337            LDA     1,ARCTB
04253 044627            STA     1,AINC0
04254 026027    CNTLP:  LDA     1,@AINC0
04255 125015            MOV#    1,1,SNR
04256 000413            JMP     CRT21           ;NO CODE ENTERED
04257 034341            LDA     3,C377
04260 137400            AND     1,3
04261 156414            SUB#    2,3,SZR
04262 000772            JMP     CNTLP
04263 034337            LDA     3,LHM
04264 137700            ANDS    1,3
04265 025400            LDA     1,0,3
04266 125400            INC     1,1
04267 045400            STA     1,0,3
04270 000402            JMP     CRT22
04271 010274    CRT21:  ISZ     RGCNT+6
04272 004415    CRT22:  JSR     LDR0
04273 034425            LDA     3,L2INC
04274 000405            JMP     NXTLN
04275 004412    CRBT3:  JSR     LDR0
04276 034423            LDA     3,L3INC
04277 000403            JMP     NXTLN
04300 004407    CRBT4:  JSR     LDR0
04301 034421            LDA     3,L4INC
04302 042023    NXTLN:  STA     0,@AINC4
04303 024725            LDA     1,SAVBH
04304 167000            ADD     3,1
04305 044620            STA     1,AINC1
04306 000666            JMP     PAKL
04307 024714    LDR0:   LDA     1,PTHLF
04310 125014            MOV#    1,1,SZR
04311 001400            JMP     0,3
04312 024337            LDA     1,LHM
04313 123400            AND     1,0
04314 024407            LDA     1,NLHLF
04315 123000            ADD     1,0
04316 001400            JMP     0,3
                    ;
04317 000013    L1INC:  13
04320 000032    L2INC:  32
04321 000051    L3INC:  51
04322 000070    L4INC:  70
04323 000000    NLHLF:  0
04324 000211    TABCH:  211
04325 000215    CARTC:  215
04326 000000    SAVRT:  0
04327 000317    ACHTV:  317    ;DEFAULT ATTENDEE TYPE, 'O' ACE=WEST
                    ;
04330 036700    PTAB:   LDA     2,SAVBH
04331 025110            LDA     1,110,2
04332 030337            LDA     2,LHM
04333 147700            ANDS    2,1
04334 030771            LDA     2,CARTC
04335 146415            SUB#    2,1,SNR
```

```
04336 024771        LDA   1, ACHTV
04337 044767        STA   1, SAVRT
04340 030663        LDA   2, PTHLP1
04341 151614        MOV#  2, 2, SZR
04342 000400        JMP   PTH01
04343 030761        LDA   2, THBLH
04344 151400        MOV#S 2, 2
04345 147000        ADD   2, 1
04346 046623        STA   1, BHINC4
04347 001400        JMP   0, 3
04350 030337  PTH01: LDA  2, LHM
04351 143400        AND   2, 0
04352 030752        LDA   2, THBLH
04353 143000        ADD   2, 0
04354 042623        STA   0, BHINC4
04355 125300        MOVS  1, 1
04356 020747        LDA   0, CHRTC
04357 123000        ADD   1, 0
04360 001400        JMP   0, 3
       ,
       . EOT
```

We claim:

1. A method of obtaining and processing information on a multiplicity of registrants to be registered and generating an embossed identification card therefrom comprising the steps of:
 intermittently receiving a set of inputted registration data associated with a signal registration from at least one input means;
 editing the inputted registration data according to the substeps of:
  comparing the format of the inputted data against a predefined format,
  observing the stored registration data and replacing the stored registration data which is incorrect with new registration data for obtaining a set of correct registration data;
 generating a flag signal when a complete set of correct registration data is stored in the editing means;
 utilizing a controller means for:
  storing a plurality of sets of correct registrtion data in a first data storage means;
  intermittently selecting a set of correct registration data and enabling the transfer of that selected set of correct registration data between the controller means and the editing means;
  intermittently selecting one of a plurality of embossing means and enabling the transfer of a first selected portion of a selected set of the correct registration data to the selected embossing means;
  intermittently enabling the transfer of the second selected portion of a selected set of correct registration data to a second storage means, all of said transfers occurring according to a programmed priority schedule.

2. A registration system for obtaining and processing information on a multiplicity of registrants to be registered and generating an embossed identification card therefor comprising:
 at least one input means, each adapted for intermittently receiving a set of inputted registration data associated with a single registrant;
 editing means coupled to each input means for testing the format of the inputted data against a predefined format, storing only registration data having the predefined format, and revising incorrect stored registration data with new registration data for obtaining a set of correct registration data;
 means for generating a flag signal when a complete set of correct registration data is stored in the editing means;
 at least one embossing means each adapted for intermittently embossing an indentification card with a first selected portion of a set of correct registration data associated with one of the registrants;
 first data storage means for storing a second selected portion of the set of correct registration data;
 controller means comprising:
  second data storage means for storing a plurality of sets of correct registration data;
  processing means for defining the first and second selected portions of each set of correct registration data;
 interrupt means for:
  intermittently selecting a set of correct registration data and enabling the transfer of that selected set of correct registration data between the controller means and the editing means;
  intermittently selecting one of the embossing means and enabling the transfer of a first selected portion of a selected set of the correct registration data to the selected embossing means; and
  intermittently enabling the transfer of the second selected portion of a selected set of correct registration data to the first storage means, the interrupt means enabling all of said transfers occurring according to a programmed priority schedule.

3. The registration system of claim 2 wherein the controller means further comprises a programmable processor for processing the second selected portion of the plurality of sets of registration data for obtaining statistical summaries from the plurality of set of inputted registration data.

* * * * *